United States Patent
Wang et al.

(10) Patent No.: US 10,801,688 B2
(45) Date of Patent: *Oct. 13, 2020

(54) VEHICLE LAMP DEVICE AND HIGH-SPEED LIGHTING VEHICLE LAMP MODULE

(71) Applicant: CHIAN YIH OPTOTECH CO., LTD., Mial-Li, Hsien (TW)

(72) Inventors: Cheng Wang, Taipei (TW); Ming-Feng Kuo, New Taipei (TW); Jyun-Lin Lai, Hsinchu County (TW); Yu-Kai Chen, Hsinchu (TW)

(73) Assignee: CHIAN YIH OPTOTECH CO., LTD., Mial-Li, Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,601

(22) Filed: Nov. 15, 2019

(65) Prior Publication Data
US 2020/0156528 A1    May 21, 2020

Related U.S. Application Data

(60) Provisional application No. 62/768,159, filed on Nov. 16, 2018.

(51) Int. Cl.
*F21S 41/43* (2018.01)
*F21S 41/32* (2018.01)
*F21S 45/47* (2018.01)
*F21S 41/24* (2018.01)
*F21S 41/675* (2018.01)
(Continued)

(52) U.S. Cl.
CPC .............. *F21S 41/43* (2018.01); *B60Q 1/085* (2013.01); *B60Q 1/124* (2013.01); *F21S 41/147* (2018.01); *F21S 41/148* (2018.01); *F21S 41/24* (2018.01); *F21S 41/255* (2018.01); *F21S 41/321* (2018.01); *F21S 41/36* (2018.01); *F21S 41/62* (2018.01); *F21S 41/675* (2018.01); *F21S 41/695* (2018.01); *F21S 45/47* (2018.01);
(Continued)

(58) Field of Classification Search
CPC ....... B60Q 1/124; B60Q 1/085; F21S 41/675; F21S 41/695; F21S 41/255; F21S 41/62; F21S 41/43; F21S 41/24; F21S 41/147; F21S 41/36; F21S 41/148; F21S 41/321; F21S 45/47; F21W 2102/14; F21W 2102/155
See application file for complete search history.

(56) References Cited

U.S. PATENT DOCUMENTS

2008/0007961 A1* 1/2008 Mochizuki ............... B60Q 1/10
                                                  362/465
2013/0039080 A1* 2/2013 Yamazaki ............. F21S 41/698
                                                  362/465
(Continued)

*Primary Examiner* — Alan B Cariaso
(74) *Attorney, Agent, or Firm* — Li & Cai Intellectual Property Office

(57) ABSTRACT

A headlight device is provided. The headlight device includes a main headlight module and a high-speed headlight module. The main headlight module is capable of generating a first lighting area having a light pattern that complies with the regulations of low beam headlamps. In addition, the main headlight module includes a main optical axis, and the main headlight module defines a horizontal plane and a vertical plane perpendicular to the horizontal plane, and the main optical axis is parallel to the horizontal plane and the vertical plane.

30 Claims, 75 Drawing Sheets

(51) Int. Cl.
*F21S 41/695* (2018.01)
*F21S 41/62* (2018.01)
*B60Q 1/08* (2006.01)
*B60Q 1/124* (2006.01)
*F21S 41/255* (2018.01)
*F21S 41/147* (2018.01)
*F21S 41/36* (2018.01)
*F21S 41/148* (2018.01)
*F21Y 115/10* (2016.01)
*F21W 102/155* (2018.01)
*F21W 102/14* (2018.01)

(52) U.S. Cl.
CPC ... *F21W 2102/14* (2018.01); *F21W 2102/155* (2018.01); *F21Y 2115/10* (2016.08)

(56) References Cited

U.S. PATENT DOCUMENTS

| | | | |
|---|---|---|---|
| 2016/0167566 A1* | 6/2016 | Tanaka | B60Q 1/143 315/82 |
| 2016/0377251 A1* | 12/2016 | Kim | B60Q 1/14 362/466 |
| 2018/0038568 A1* | 2/2018 | Sawada | B60Q 1/085 |
| 2019/0093848 A1* | 3/2019 | Yagi | F21S 41/00 |
| 2020/0158306 A1* | 5/2020 | Wang | F21S 41/148 |

* cited by examiner

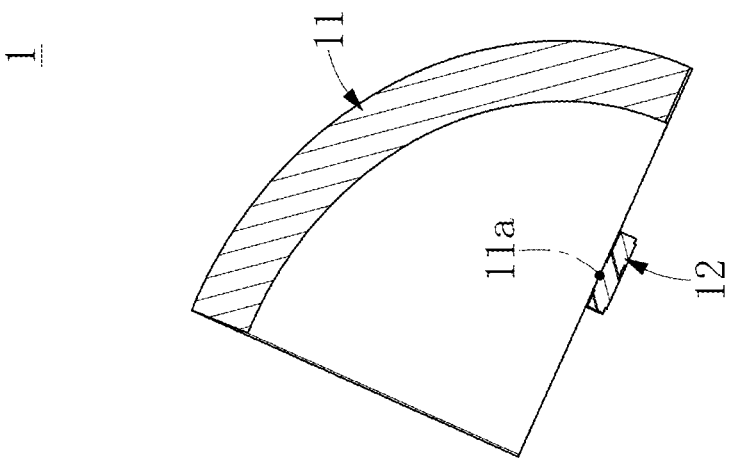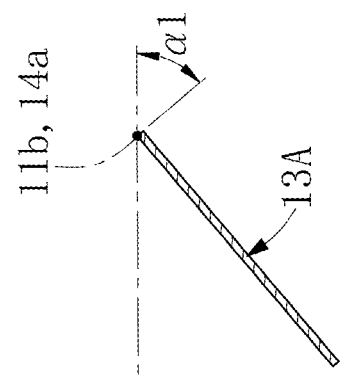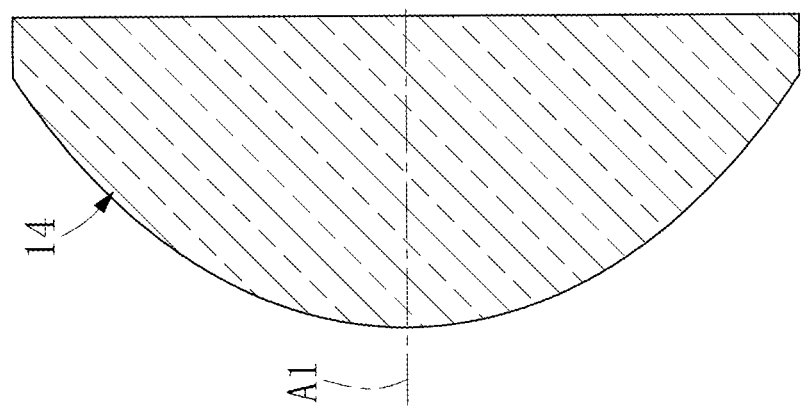
FIG. 17

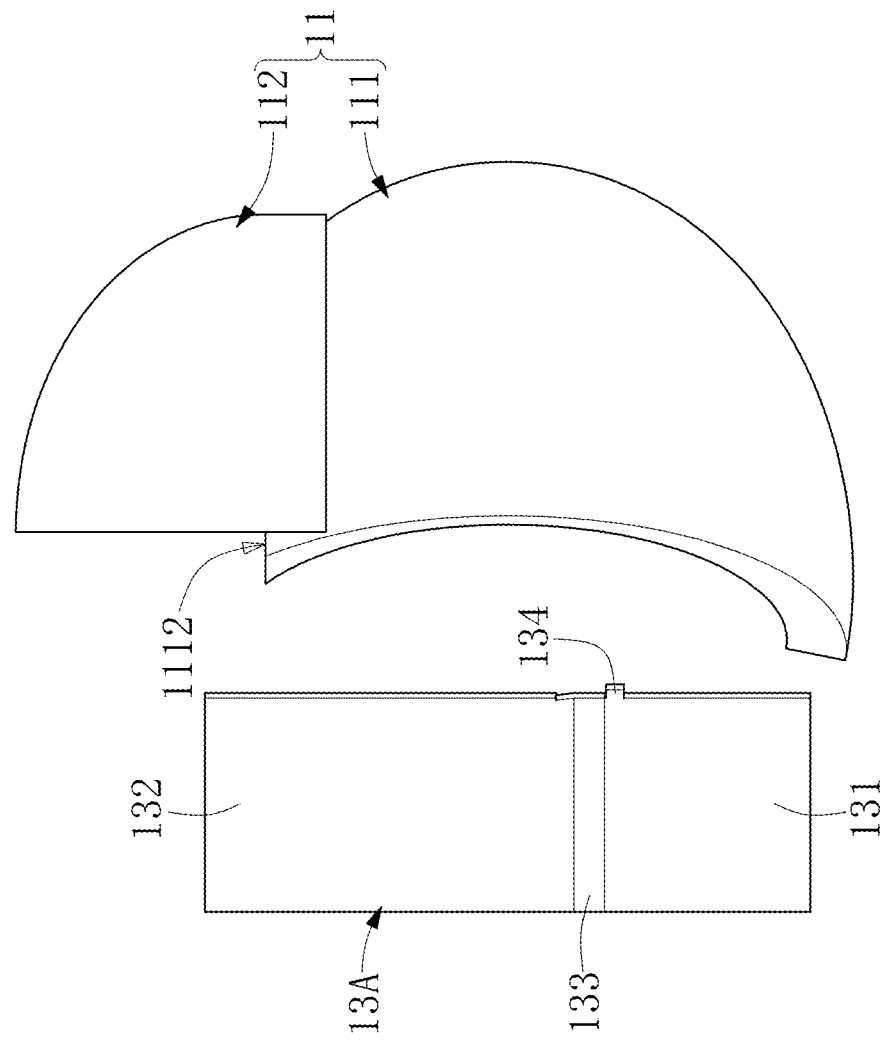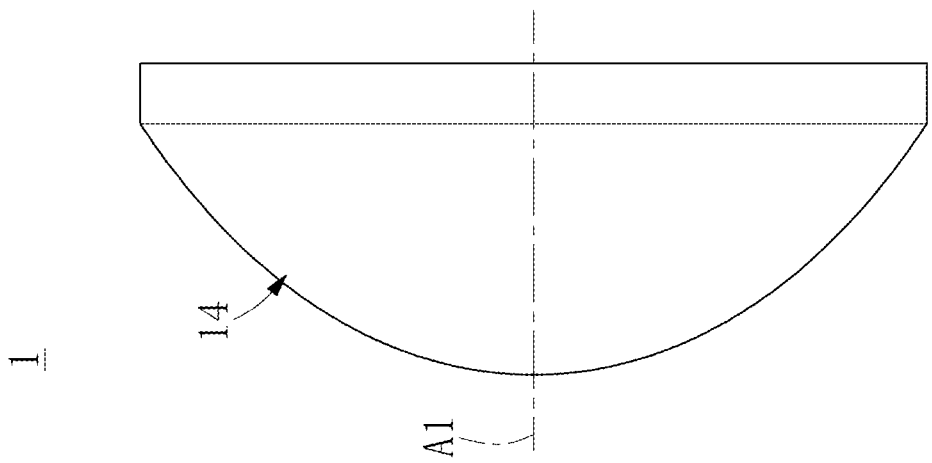
FIG. 71

VEHICLE LAMP DEVICE AND HIGH-SPEED LIGHTING VEHICLE LAMP MODULE

CROSS-REFERENCE TO RELATED PATENT APPLICATION

This application claims priority from the U.S. Provisional Patent Application Ser. No. 62/768,159 filed Nov. 16, 2018, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a headlight, and more particularly to a headlight device and a high-speed headlight module.

BACKGROUND OF THE DISCLOSURE

Firstly, because conventional headlights of a car have no turn-by-turn lighting, when performing a left turn, there will be poor illumination at the centerline of the lane in front of the car and the left edge of the lane; and when performing a right turn, there will be poor illumination at the right edge of the lane ahead of the car.

In order to solve the above-mentioned problems, most of the conventional technology uses a headlight device capable of turning with the degree of the turn of the car to produce an effect of an adaptive front-lighting system (AFS). However, the mechanism of the headlight device with a turning function in the conventional technology is complicated and costly. Therefore, how to improve on the structural design to produce the effect of having a simple structural and low cost adaptive front-lighting system (AFS) is an important issue yet to be solved in this field.

BRIEF DESCRIPTION OF THE DRAWINGS

The present disclosure will become more fully understood from the following detailed description and accompanying drawings.

FIG. 17 is a sectional view of the XVII-XVII section in FIG. 15.

FIG. 71 is a top view of the bending headlight module of the headlight device according to the third embodiment of the present disclosure.

DETAILED DESCRIPTION OF THE EXEMPLARY EMBODIMENTS

Figure 1:
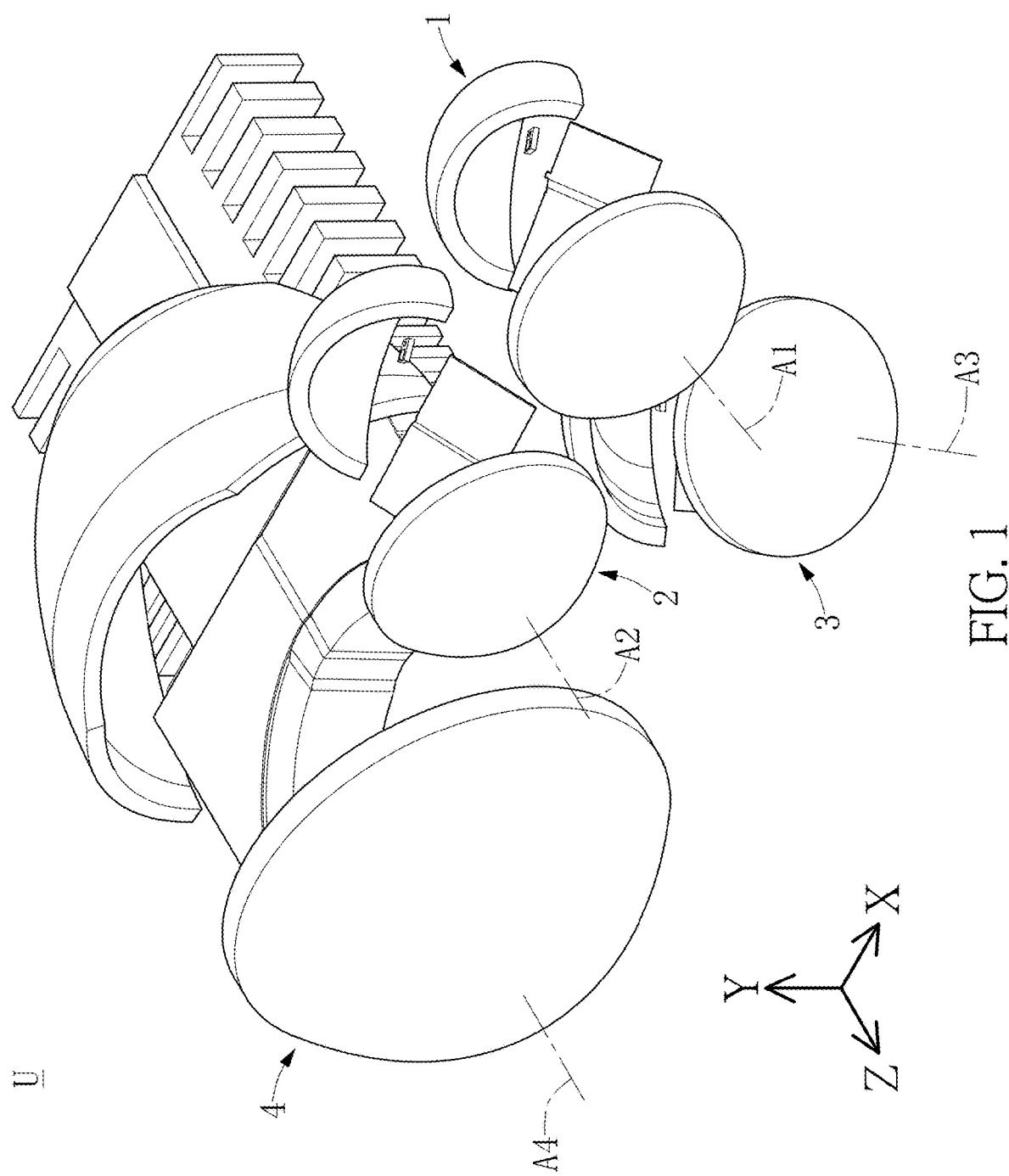
FIG. 1 is a perspective view of a headlight device according to a first embodiment of the present disclosure.
Figure 2:
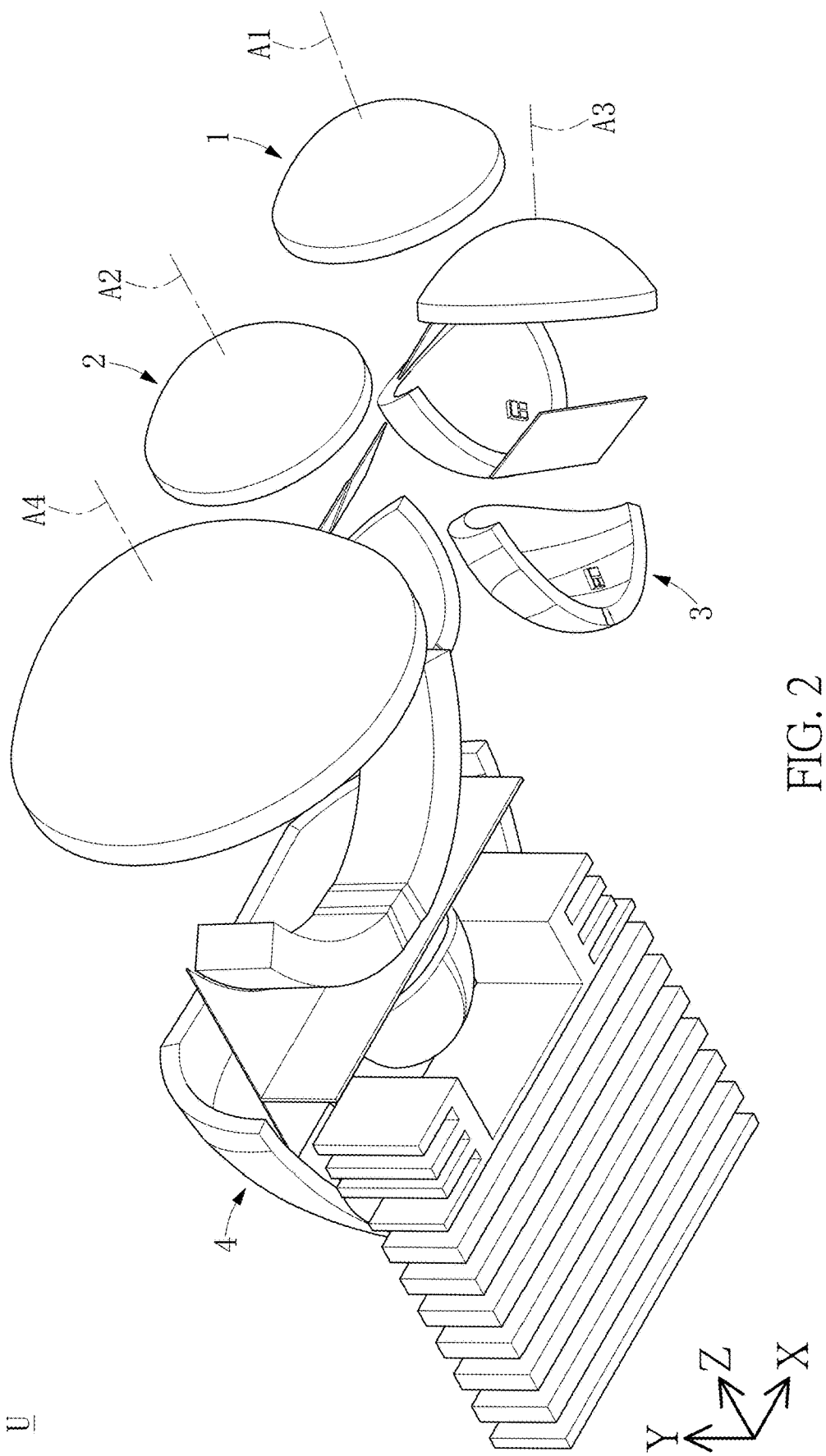
FIG. 2 is another of perspective view of the headlight device according to the first embodiment of the present disclosure.
Figure 3:
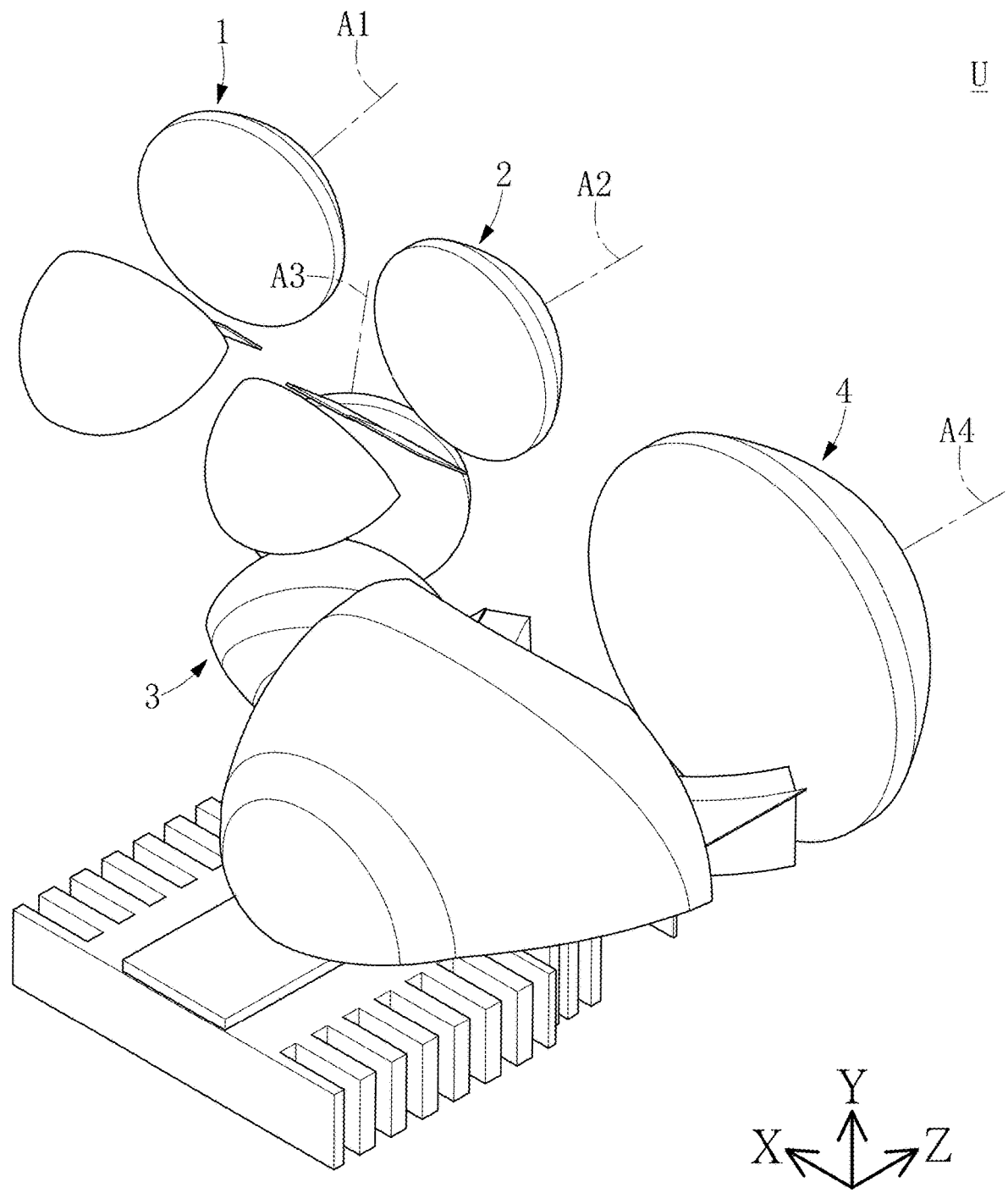
FIG. 3 is yet another of perspective view of the headlight device according to the first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 5, a first embodiment of the present disclosure provides a headlight device U and a bending headlight module 1 thereof. In the following, the main structure of the headlight device U will be described first, and the detailed structure of each headlight module of the headlight device U will be described. For instance, the headlight device U includes a main headlight module 4, and the main headlight module 4 is capable of generating a first lighting area which is a light pattern that complies with the regulations of low beam headlamps. In other embodiments, the main headlight module 4 is also capable of generating a second lighting area which is a light pattern that complies with the regulations of low beam headlamps. In other words, main headlight module 4 is the headlight of the car. It is worth mentioning that, the above regulations can be in compliance with relevant regulations such as ECE R112 or R123 in the Regulations of the United Nations Economic Commission for Europe (ECE regulations), or in compliance with the Light standard of the Regulations of the Society of Automotive Engineers (SAE), but is not limited to thereto.

Figure 12:
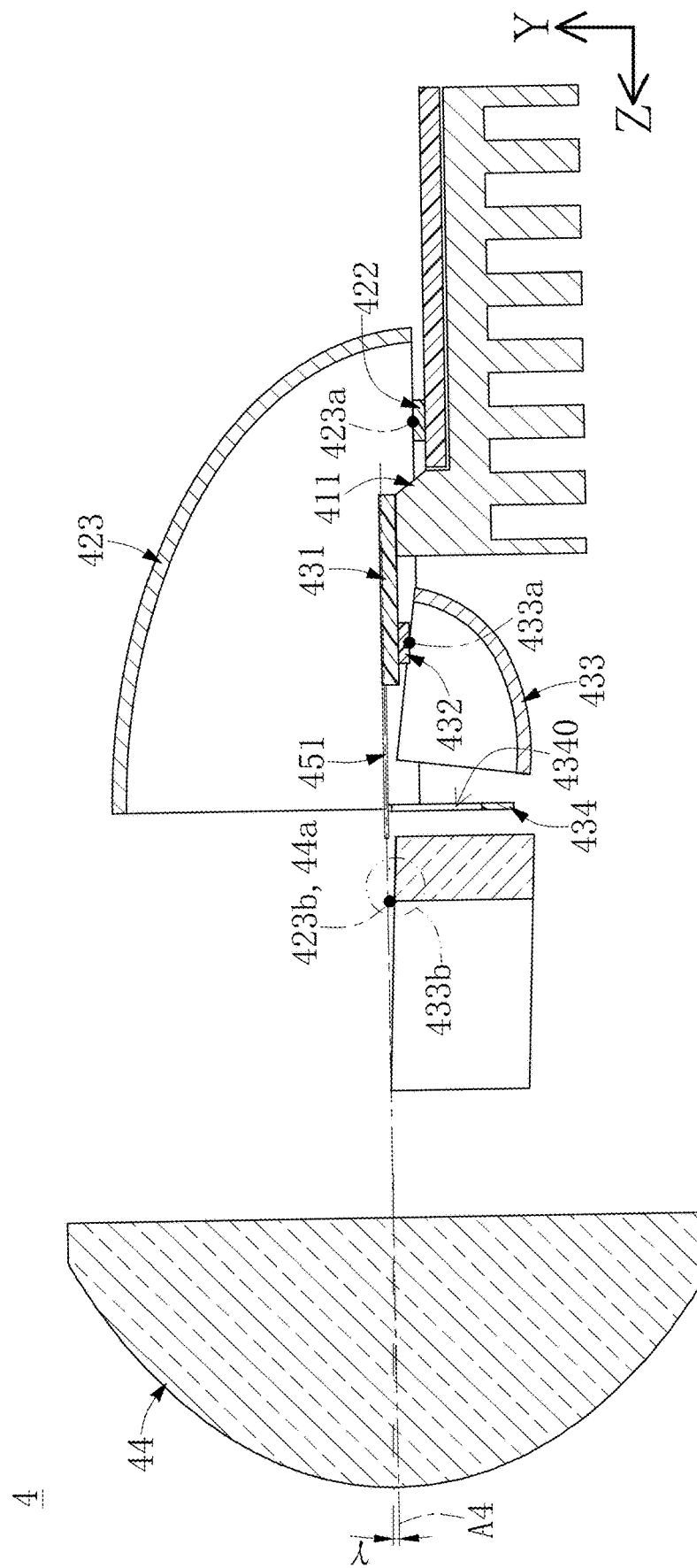
FIG. 12 is a sectional view of the XII-XII section in FIG. 6.

Referring to FIG. 1 to FIG. 5 again, in addition to the main headlight module 4 for generating the light pattern of a basic lighting mode (C mode), the headlight device U can also include other headlight modules to provide an auxiliary light pattern when the car is on a curve, when turning, when turning on the direction light, or when driving at high speed, so as to increase the lighting range and brightness of the headlight device U. In other words, the main headlight module 4 can be any kind of light structure that can produce a light type that complies with the regulations of low beam headlamps. In addition, the main headlight module 4 includes a main optical axis A4, and the main headlight module 4 defines a horizontal plane SH and a vertical plane SV perpendicular to the horizontal plane SH, and the main optical axis A4 is parallel to the horizontal plane SH and the vertical plane SV. Further, for instance, the main optical axis A4 can be a line segment at the intersection of the horizontal plane SH and the vertical plane SV, but is not limited thereto. In other embodiments, the main optical axis A4 can also be parallel to the vertical plane SV and inclined at a predetermined tilted angle γ (as shown in FIG. 12) that is between positive and negative 1 degree with the horizontal plane SH, that is, the main headlight module 4 can relatively rotate upward or downward to the horizontal plane SH. In the figures of the present disclosure, the normal projection of the main optical axis A4 on the horizontal plane SH and the normal projection of the vertical plane SV on the horizontal plane SH are parallel to each other, and as an exemplary illustration, the predetermined tilted angle γ between the normal projection of the main optical axis A4 on the vertical plane SV and the normal projection of the horizontal plane SH on the vertical plane SV is 0.57 degrees. That is, the main headlight module 4 is relatively rotate downward to the horizon plane SH. It should be noted that, the present disclosure is not limited by the examples given above. Furthermore, it should be noted that, the horizontal plane SH and the vertical plane SV of the present disclosure are respectively virtual planes, which are mainly used to explain the configuration relationship of other vehicle headlight modules relative to the main headlight module 4. In addition, according to the present disclosure, the horizontal plane SH can be parallel to the XY plane, and the vertical plane SV can be parallel to the YZ plane, that is, the horizontal plane SH may be a ground plane.

For instance, the headlight device U can utilize the cooperation of the main headlight module 4 and other vehicle headlight modules to generate different lighting modes, such as but not limited to, a basic lighting mode (C mode), a town road lighting mode (V mode), a high-speed road lighting mode (E mode), a bad weather lighting mode (W mode), or a curve lighting mode (T mode). In addition, the above-mentioned lighting modes can be a plurality of low-beam or high-beam lighting modes (or "light pattern") of the adaptive front-lighting system (AFS) regulated by the European Economic Commission Regulations (ECE), but is not limited to thereto. It is worth mentioning that, the high-speed road lighting mode (E mode) can be divided into a high-speed road lighting mode 1 (E1 mode, such as but not limited to, the speed of cars exceeding 110 km/hour), a high-speed road lighting mode 2 (e, such as but not limited to, the speed of the car exceeding 100 km/hour), and/or the highway lighting mode 3 (E3 mode, such as but not limited to, the speed of the car exceeds 80 km/hour) according to speed.

For instance, in addition to the main headlight module 4, the headlight device U can also include a bending headlight module 1, a high-speed headlight module 2 and/or a turning headlight module 3, so as to select the relative headlight module according to the needs of the lighting mode. For instance, when the car enters a curve, the bending headlight module 1 can be used to generate a curve lighting mode (T mode); when the car is driving at a high speed, the high-speed headlight module 2 can be used to generate a high-speed road lighting mode (E mode); when the car turns at a crossroad, the turning headlight module 3 can be used in the basic lighting mode (C mode) or the town road lighting mode (V mode), and produces a lighting mode facing left or right.

In addition, the bending headlight module 1, the high-speed headlight module 2, and/or the turning headlight module 3 can be disposed adjacent to the main headlight module 4. It should be noted that, the "disposed adjacent to the main headlight module 4" described herein represents that the bending headlight module 1, the high-speed headlight module 2, and/or the turning headlight module 3 are only required to be set adjacent to the main headlight module 4, and is not limited to be placed on the upper side, the lower side, or the left and right sides of the main headlight module 4.

It should be noted that, the headlight device U provided in the first embodiment of the present disclosure is preferably applicable to left headlight on a left-hand drive car, but is not limited to thereto. It should be noted that, the structure of the headlight device U shown in FIG. 1 to FIG. 5 are exemplary illustrations of the left headlight applied to the left-hand drive car. The following will firstly illustrate the structure of the main headlight module 4, the bending headlight module 1, the high-speed headlight module 2, and the turning headlight module 3 when applied to the left headlight of left-hand drive car, and the subsequent embodiments will further illustrate the structure when the bending headlight module 1, the high-speed headlight module 2, the turning headlight module 3, and the main headlight module 4 are applied to the right headlight of a left-hand drive car.

Referring to FIG. 1 to FIG. 5, which are to be read in conjunction with FIG. 6 to FIG. 12, the main headlight module 4 applied to the left-hand drive car will being illustrate as follow. It should be noted that, the main headlight module 4 can be applied to left headlight or right headlight. Specifically speaking, the main headlight module 4 mainly includes a base 41, a first optical module 42, a second optical module 43, a light distribution lens 44, and an optical module 45. The first optical module 42 and the second optical module 43 are disposed on the base 1 and are disposed correspondingly to each other, and the position of the light distribution lens 44 corresponds to the first optical module 42 and the second optical module 43, and the optical module 45 is disposed between the base 41 and the light distribution lens 44. For instance, when the first optical module 42 cooperates with the light distribution lens 44 and the optical module 45, a low beam light pattern can be generated. When the first optical module 42 and/or the second optical module 43 cooperates with the light distribution lens 44 and the optical module 45, a high beam light pattern can be generated. However, the above-mentioned example is only one of the feasible embodiments and is not intended to limit the present disclosure.

The optical module 45 can include a first light guide 451 that is close to the base 41 and a second light guide 452 that is far from the base 41. The first light guide 451 is an opaque material and the second light guide 452 is a light transmitting material. An upper surface 4510 of the first light guide 451 and an upper surface 4520 of the second light guide 452 are located near the main optical axis A4. Further, the base 41 can be used as the base of the entire main headlight module 4, which has a bearing surface 4100 and a positioning structure 411 extending from the bearing surface 4100. The first optical module 42 includes a first circuit board 421, a first lighting element 422, and a first reflecting element 423. The first circuit board 421 is disposed on the bearing surface 4100, the first lighting element 422 is electrically connected to the first circuit board 421, and the position of the first reflecting element 423 corresponds to the first lighting element 422 to reflect the light that the first lighting element 422 emitted. The second optical module 43 includes a second circuit board 431, a second lighting element 432, and a second reflecting unit 433. The second circuit board 431 is fixedly connected to the positioning structure 411, the second lighting element 432 is electrically connected to the second circuit board 431, and the position of the second reflecting unit 433 corresponds to the second lighting element 432 to reflect the light that the second lighting element 432 emitted. In an unillustrated embodiment, the base 41 may not include the positioning structure 411, and the second circuit board 431 is also disposed on the bearing surface 4100 and staggered from the position of the first circuit board 421.

For instance, the positioning structure 411 is a protrusion. The second circuit board 431 includes a central area 4311 for setting the second lighting element 432 and at least one surrounding area 4312 on a side of the central area 4311. The at least one surrounding area 4312 is fixedly connected to the upper surface (not labeled) of the positioning structure 411, and the central area 4311 is exposed from the positioning structure 411. In addition, the first circuit board 421 and the second circuit board 431 are substantially horizontally arranged, and the light output direction of the first lighting element 422 is different from the light output direction of the second lighting element 432 of the second optical module 43. For instance, the light output direction of the first lighting element 422 is opposite to that of the second lighting element 432. However, the detail of the above-mentioned example is only one of the feasible embodiments and is not intended to limit the present disclosure. Preferably, the base 41 can have a good heat conduction and heat dissipation capabilities to effectively remove the heat generated by the first lighting element 422 and the second lighting element 432, thereby improving the reliability and service life of the first lighting element 422 and the second lighting element 432. For instance, the material of the base 41 can be a highly thermally conductive metal (such as but not limited to, aluminum), and the base 41 can include multiple cooling structures 412. In addition, the number, shape, and distribution of the cooling structures 412 can be changed according to the heat dissipation requirements, and is not particularly limited.

The first reflecting element 423 of the first optical module 42 is a reflecting cup and has a reflecting surface, which is a multi-curvature composite surface that is exemplified as an ellipsoid in this embodiment. The first reflecting element 423 includes a first focal point 423*a* and a second focal point 423*b*. The first lighting element 422 can correspond to the first focal point 423*a* and the second focal point 423*b* can correspond to the optical module 45, for instance, the second focal point 423*b* may be located on the upper surface 4520 of the second light guide 452. In addition, the light distribution lens 441 includes a main optical axis A4 and a light distribution lens focal point 44*a* located on the main optical axis A4. The second focal point 423*b* of the first reflecting element 423 can be located on the main optical axis A4 and communicate with the light distribution lens focal point 44*a*, or the second focal point 423*b* of the first reflecting element 423 can deviate from the main optical axis A4 and be located near the light distribution lens focal point 44*a*. However, the detail of the above-mentioned example is only one of the feasible embodiments and is not intended to limit the present disclosure.

For instance, the first lighting element 422 of the first optical module 42 can be a light emitting diode (LED) or a light emitting diode package structure (LED package structure). For instance, the first lighting element 422 is a light emitting diode package structure and includes one or more light-emitting diodes. In addition, the first lighting element 422 can be disposed on or near the first focal point 423a of the first reflecting element 423. The first circuit board 421 of the first optical module 42 can be a metal-based printed circuit board (MCPCB). However, the detail of the above-mentioned example is only one of the feasible embodiments and is not intended to limit the present disclosure.

The second reflecting unit 423 of the second optical module 42 is a reflecting cup and has a reflecting surface, which is a multi-curvature composite surface that can be generated by using optical simulation design. For instance, the second reflecting unit 433 can define at least two optical axes (not shown) near the light concentration area 433b, and these optical axes can pass through the second lighting element 432, making the second reflecting unit more effective so that it meets the regulations of automotive lamp. It should be noted that, the two optical axes can be parallel or non-parallel to each other, or at least one optical axis is parallel to the main optical axis A4. In other embodiments, the second reflecting unit 433 can have only one optical axis.

The second reflecting unit 433 has a first focal point 433a, and a light concentration area 433b can be defined. The first focal point 433a is located in the coverage area of the second reflecting unit 433 and the light concentration area 433b is located outside the coverage area of the second reflecting unit 433. Further, the position of the light concentration area 433b corresponds to the optical module 45, for instance, the light concentration area 433b may be located on the upper surface 4520 of the second light guide 452 or near the upper surface 4520 of the second light guide 452. In addition, the main optical axis A4 can pass through the light concentration area 433b, and the light distribution lens focal point 44a can be located within the light concentration area 433b, or the main optical axis A4 can deviate from the light concentration area 433b, and the light distribution lens focal point 44a can be located near the light concentration area 433b. However, the detail of the above-mentioned example is only one of the feasible embodiments and is not intended to limit the present disclosure.

For instance, the second lighting element 432 of the second optical module 43 can be a light emitting diode (LED) or a light emitting diode package structure (LED package structure). For instance, the second lighting element 432 is a light emitting diode package structure and includes one or more light-emitting diodes. In addition, the second lighting element 432 can be disposed on or near the first focal point 433a of the second reflecting unit 433. The second circuit board 431 of the second optical module 43 can be a metal-based printed circuit board (MCPCB). However, the detail of the above-mentioned example is only one of the feasible embodiments and is not intended to limit the present disclosure.

Figure 13:
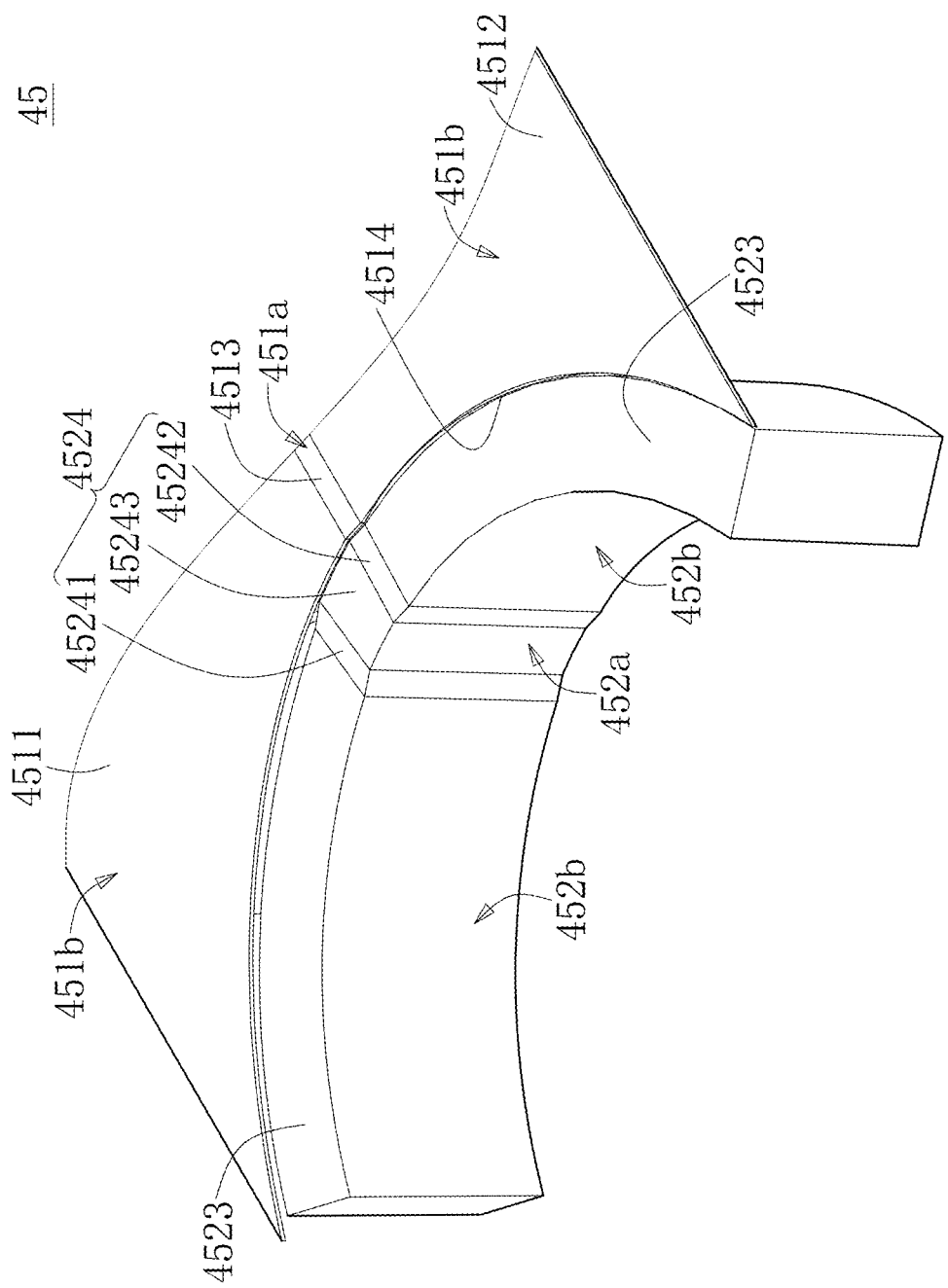
FIG. 13 is a perspective view of an optical module of the main headlight module of the headlight device according to the first embodiment of the present disclosure.

Referring to FIG. 6 to FIG. 12, which are to be read in conjunction with FIG. 13, the first light guide 451 and the second light guide 452 of the optical module 45 are separately disposed, the first light guide 451 is substantially horizontal, and a part of the first light guide 451 is located in the coverage area of the first reflecting unit 11. For instance, according to actual needs, the upper surface 4510 of the first light guide 451 can have reflective or extinction characteristics. The second light guide 452 of the optical module 45 is in a standing state, and the second light guide 452 is located outside of the coverage area of the first reflecting element 423. It is worth mentioning that, the second light guide 452 can be in a vertical standing state or an inclined standing state. However, the detail of the above-mentioned example is only one of the feasible embodiments and is not intended to limit the present disclosure.

For instance, the first light guide 451 is a reflective plate, which is next to the second circuit board 431 and extends in a direction to the light distribution lens 44, and the first light guide 451 includes a notch 4514. The second light guide 452 is a light guide being disposed at notch 4514 of the first light guide 451, and the position of the second light guide 452 corresponds to the second optical module 43. Preferably, the upper surface 4510 of the first light guide 451 and the board surface (not labeled) of the second circuit board 431 are substantially flush.

Further, the material of the second light guide 452 can be, but is not limited to being, polymethyl methacrylate (PMMA) or silicone rubber. The shape and size of the second light guide 452 and the notch 4514 of the first light guide 451 roughly match, the notch 4514 of the first light guide 451 is exemplified as an arc notch and the second light guide 452 is exemplified as an arc, but is not limited thereto.

It is worth mentioning that, the upper surface 451 of the first light guide 451 is higher than the upper surface 4520 of the second light guide 452, and the normal projection of the upper surface 4510 of the first light guide 451 and the upper surface 4520 of the second light guide 452 partially overlap, and the upper surface 4520 of the second light guide 452 can be a plane or inclined plane.

The second optical module 43 can further include a shading element 434, which is disposed between the second reflecting unit 433 and the second light guide 452, and the shading element 434 has an opening 4340 that allows only effective light emitted by the second lighting element 432 to pass through. Further, the shading element 434 can be a cut-off plate and can stand perpendicularly, but is not limited thereto. Thereby, the light emitted by the second optical module 43 can be prevented from being emitted outward according to the planned light path, which would result in stray light to occur outside of the required lighting pattern. The term "effective light" herein refers to light that can contribute to a desired lighting pattern (or lighting type).

Referring to FIG. 13, the optical design of the first light guide 451 and the second light guide 452 of the optical module 45 is described below. The optical design can generate a cut-off line for the low beam of the low-beam lamp that complies with the ECE R123 specification of the vehicle lamp regulations. The first light guide 451 has two external optical areas 451b and a central optical area 451a located between the two external optical areas 451b. In addition, the upper surface 4510 of the first light guide 451 includes a first reflecting plane 4511, a second reflecting plane 4512, and a reflecting bevel plane 4513 connected between the first reflecting plane 4511 and the second reflecting plane 4512. The first reflecting plane 4511 and the second reflecting plane 4512 are respectively located in two external optical areas 451b, and the position of the first reflecting plane 4511 is higher than the second reflecting plane 4512, and the reflecting bevel plane 4513 is located in the central optical area 451a.

The second light guide 452 also includes two external optical areas 452b and a central optical area 452a located between the two external optical areas 452b. In addition, the upper surface 4520 of the second light guide 452 includes two first optical planes 4523 and a stepped convex structure 4524 disposed between the two first optical planes 4523. The two first optical planes 4523 are located in two external optical areas 452b, and the two first optical planes 4523 are approximately flush, and the stepped convex structure 4524 is located in the central optical area 452*a*.

It is worth mentioning that, the stepped convex structure 4524 can include a first optical bevel plane 45241, a second optical bevel plane 45242, and a second optical plane 45243. The first optical bevel plane 45241 is connected to one of the two first optical plane 4523, the second optical bevel plane 45242 is connected to the other one of the two first optical planes 4523, the second optical plane 45243 is connected between the first optical bevel plane 45241 and the second optical bevel plane 45242, and the second optical plane 45243 is higher than the first optical plane 4523. Further, the first optical bevel plane 45241 and the second optical bevel plane 45242 are inclined in different directions. The area of the second optical bevel plane 45242 is smaller than the area of the first optical bevel plane 45241, and the slope (or inclined angle) of the second optical bevel plane 45242 is greater than the slope of the first optical bevel plane 45241 (or inclined angle). In addition, the light emitted by the second optical bevel plane 45242 is close to the perpendicular centerline of the low beam light pattern.

Figure 14:
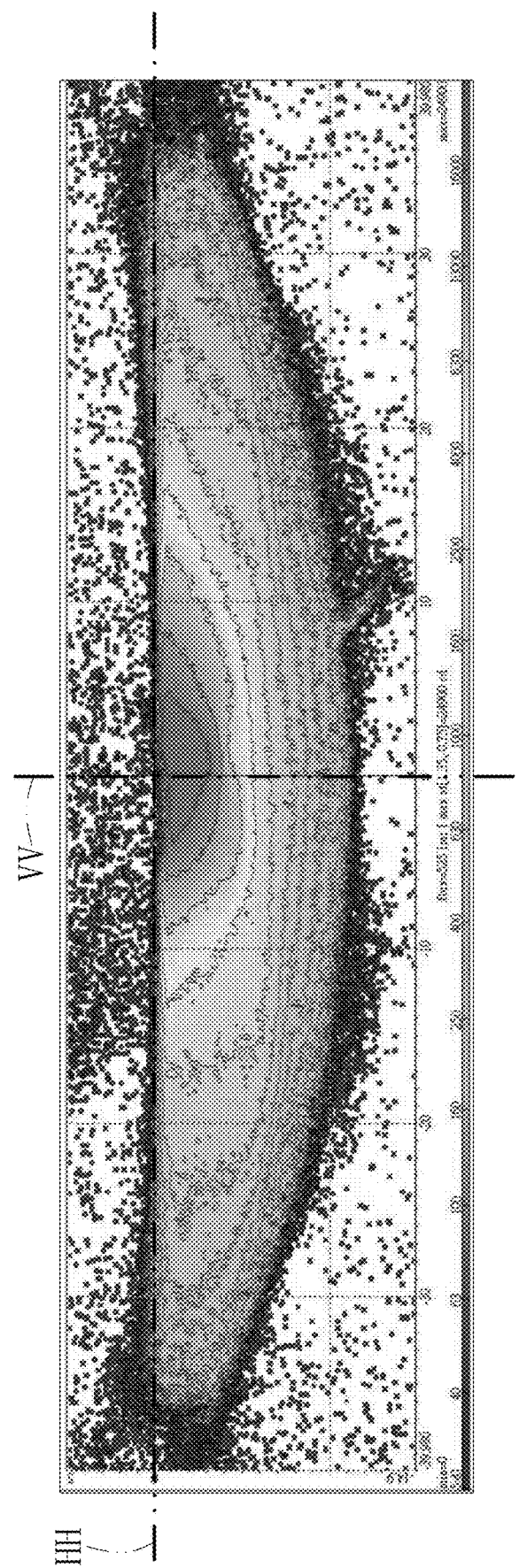
FIG. 14 is a light pattern diagram generated by the main headlight module of the headlight device according to the first embodiment of the present disclosure.

Referring to FIG. 14, the emitted light generated by the first lighting element 422 can be emitted onto the first reflecting element 423, and the emitted light can be emitted toward the light distribution lens 44 through the reflection of the first reflecting element 423. In addition, the light emitted in the direction of the light distribution lens 44 can be blocked by the optical module 45, so that the emitted first lighting area generates a cut-off line. Simultaneously, the emitted first lighting area is a light pattern that complies with the regulations of low beam headlamps. However, it should be noted that, the structure of the main headlight module 4 provided by the present disclosure is merely an example. In other embodiments, the main headlight module 4 can also be an architecture that can produce a light pattern that complies with the regulations of low beam headlamps.

Figure 15:
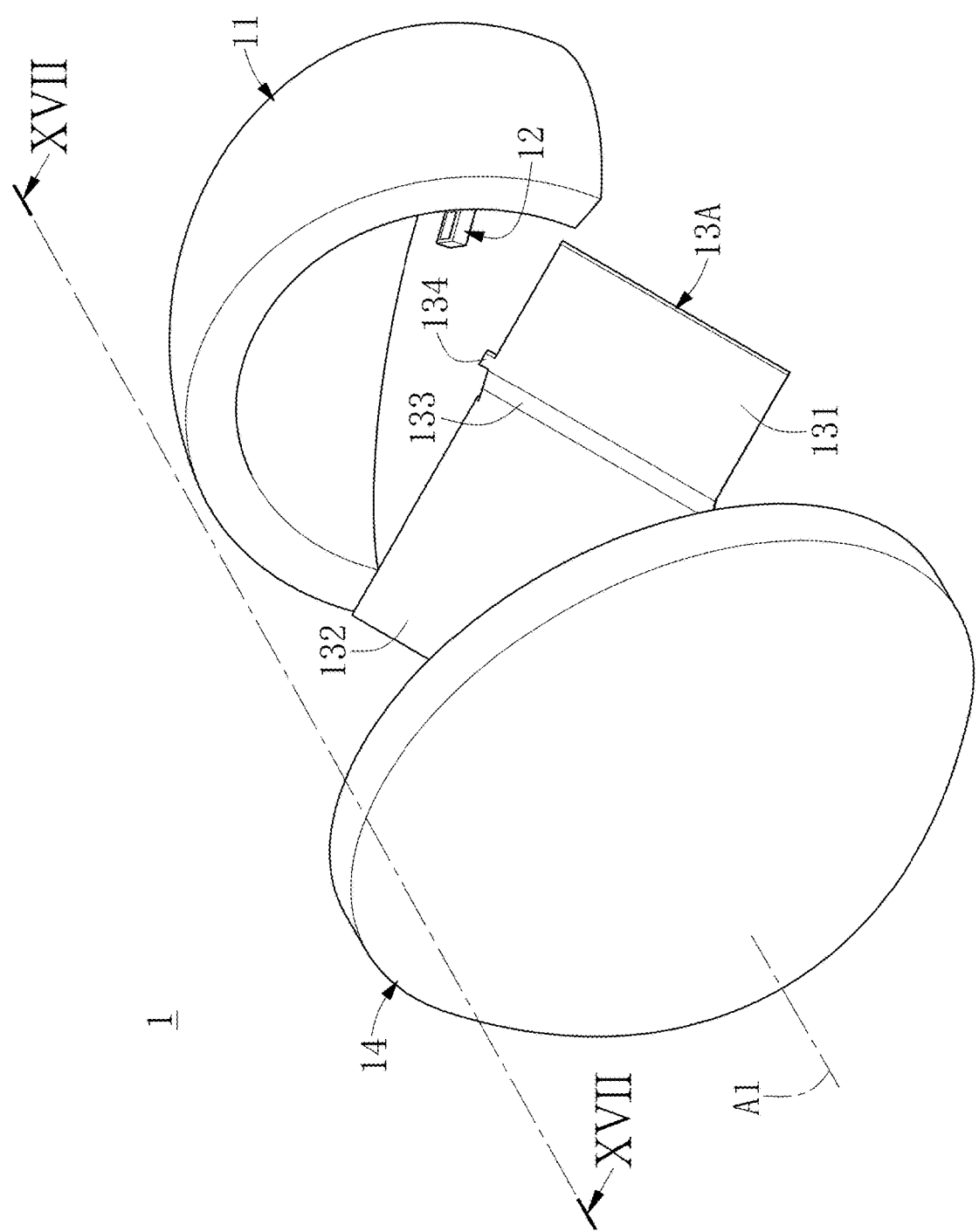
FIG. 15 is a perspective view of a bending headlight module of the headlight device according to the first embodiment of the present disclosure.
Figure 16:
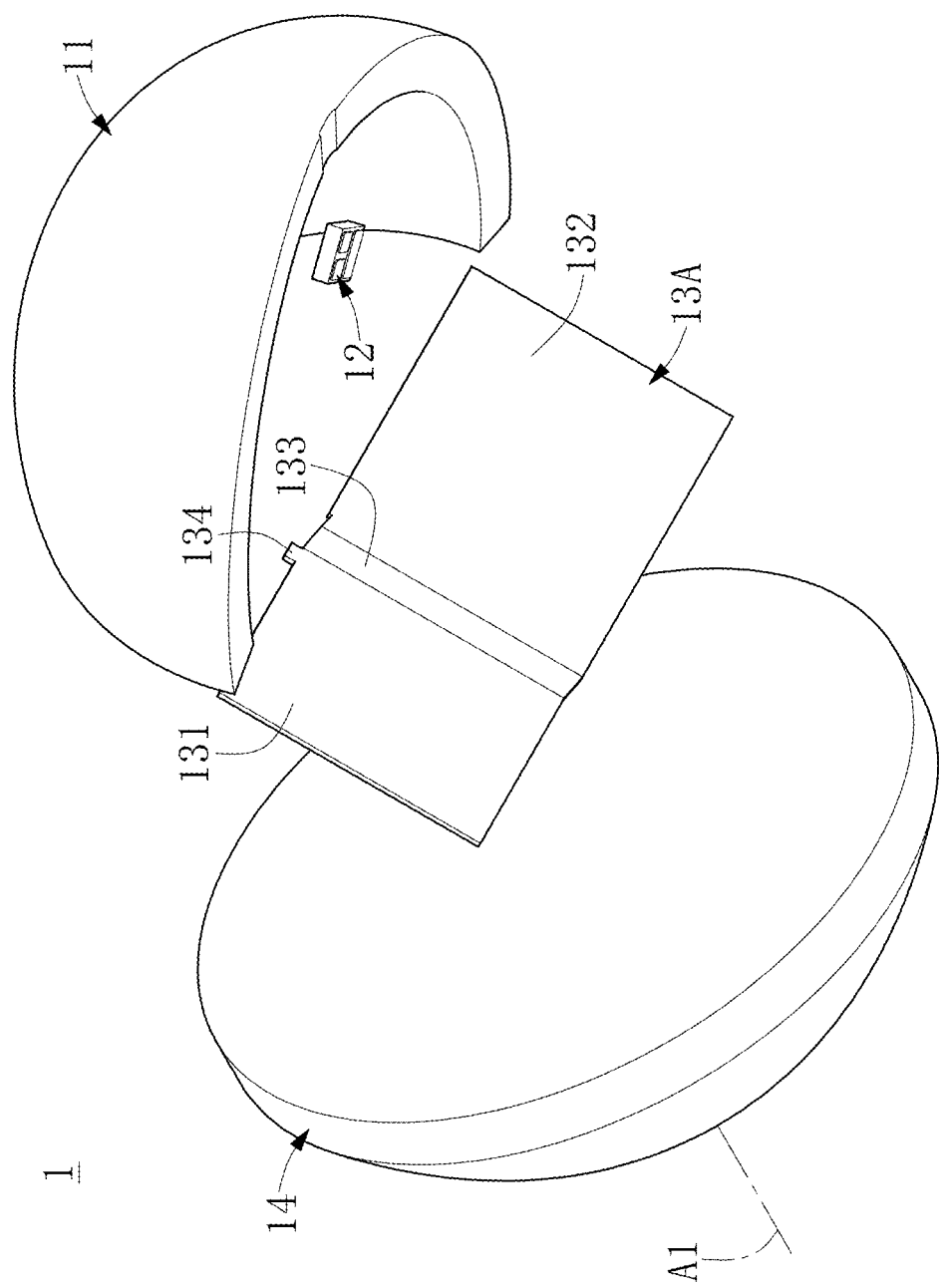
FIG. 16 is another perspective view of the bending headlight module of the headlight device according to the first embodiment of the present disclosure.
Figure 18:
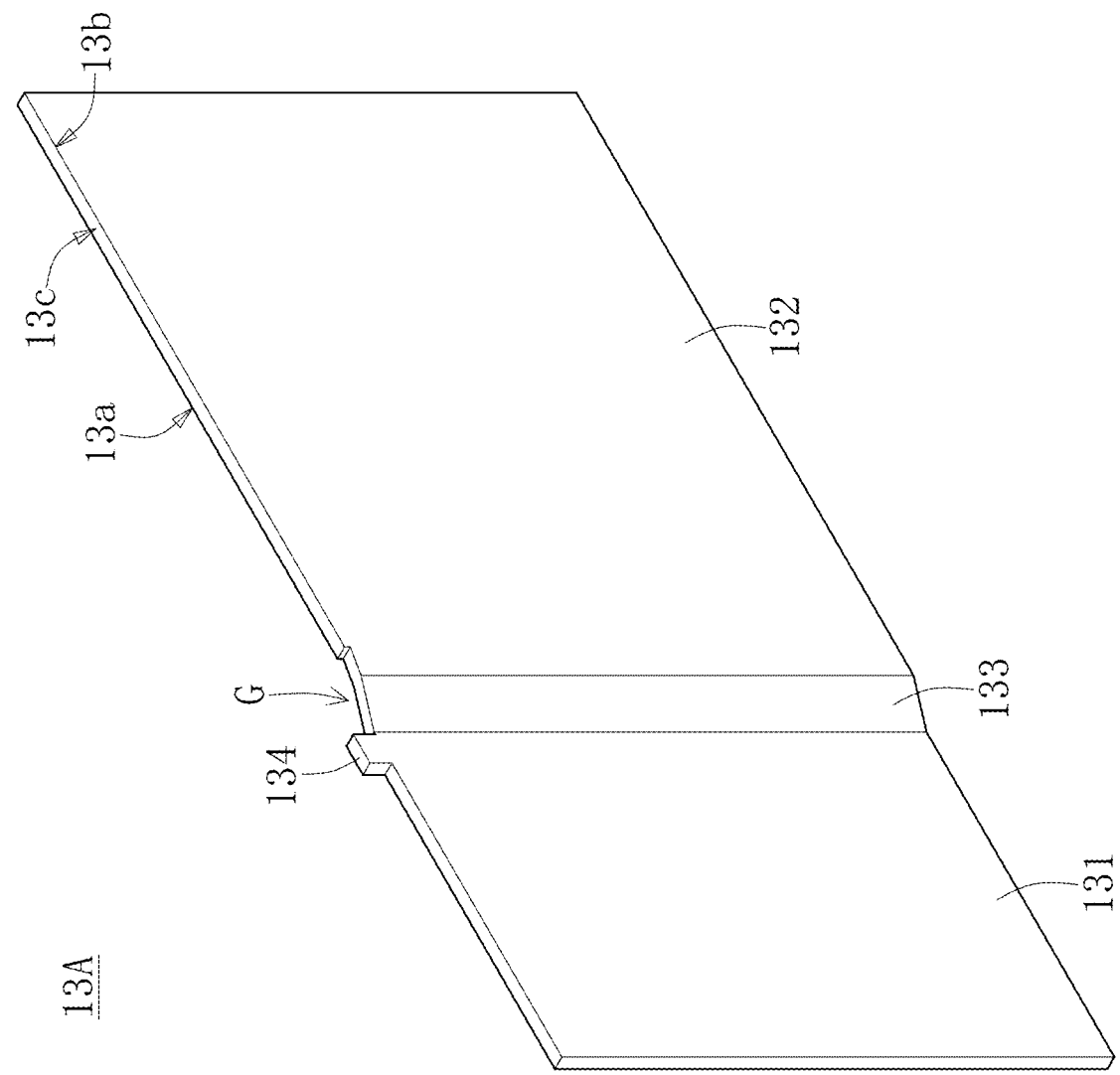
FIG. 18 is a perspective view of a first cut-off plate unit of the bending headlight module of the headlight device according to the first embodiment of the present disclosure.

Referring to FIG. 1 to FIG. 5, which are to be read in conjunction with FIG. 15 to FIG. 17, the following will first describe the structure when the headlight device U is the left headlight on a left-hand drive car and the structure of the bending headlight module 1 of the left headlight on the left-hand drive car.

Specifically speaking, the bending headlight module 1 can be disposed adjacent to the main headlight module 4, and the bending headlight module 1 can include a first reflecting unit 11, a first lighting unit 12, a first cut-off plate unit 13A, and a first lens unit 14. The first lighting unit 12 can be disposed corresponding to the first reflecting unit 11, the first cut-off plate unit 13A can be disposed corresponding to the first reflecting unit 11, and the first lens unit 14 can be disposed corresponding to the first reflecting unit 11.

The bending headlight module 1 can have a first optical axis A1, and the first optical axis A1 can be the optical axis of the first lens unit 14. A first predetermined angle $\theta1$ between 7 degrees and 15 degrees is defined between the normal projection of the first optical axis A1 on the horizontal plane SH and the normal projection of the main optical axis A4 on the horizontal plane SH, or is defined between the normal projection of the first optical axis A1 on the horizontal plane SH and the normal projection of the vertical plane SV on the horizontal plane SH. Preferably, the first predetermined angle $\theta1$ can be between 8 degrees and 14 degrees, and more preferably, the first predetermined angle $\theta1$ can be between 9 degrees and 13 degrees. In the present disclosure, as an exemplary description, the first predetermined angle $\theta1$ between the normal projection of the first optical axis A1 on the horizontal plane SH and the normal projection of the vertical plane SV on the horizontal plane SH is 11.3 degrees. It should be noted that, in order to better explain the figure, the first predetermined angle $\theta1$ between the normal projection of the first optical axis A1 on the horizontal plane SH and the normal projection of the main optical axis A4 on the horizontal plane SH or between the normal projection of the first optical axis A1 on the horizontal plane SH and normal projection of the vertical plane SV on the horizontal plane SH is marked with a line segment parallel to the main optical axis A4. For instance, the first reflecting unit 11 can be a reflecting surface having an elliptic curvature, and the first lighting unit 12 can be, but is not limited to being, a light emitting diode (LED) or a light emitting diode package structure (LED package structure).

Figure 4:
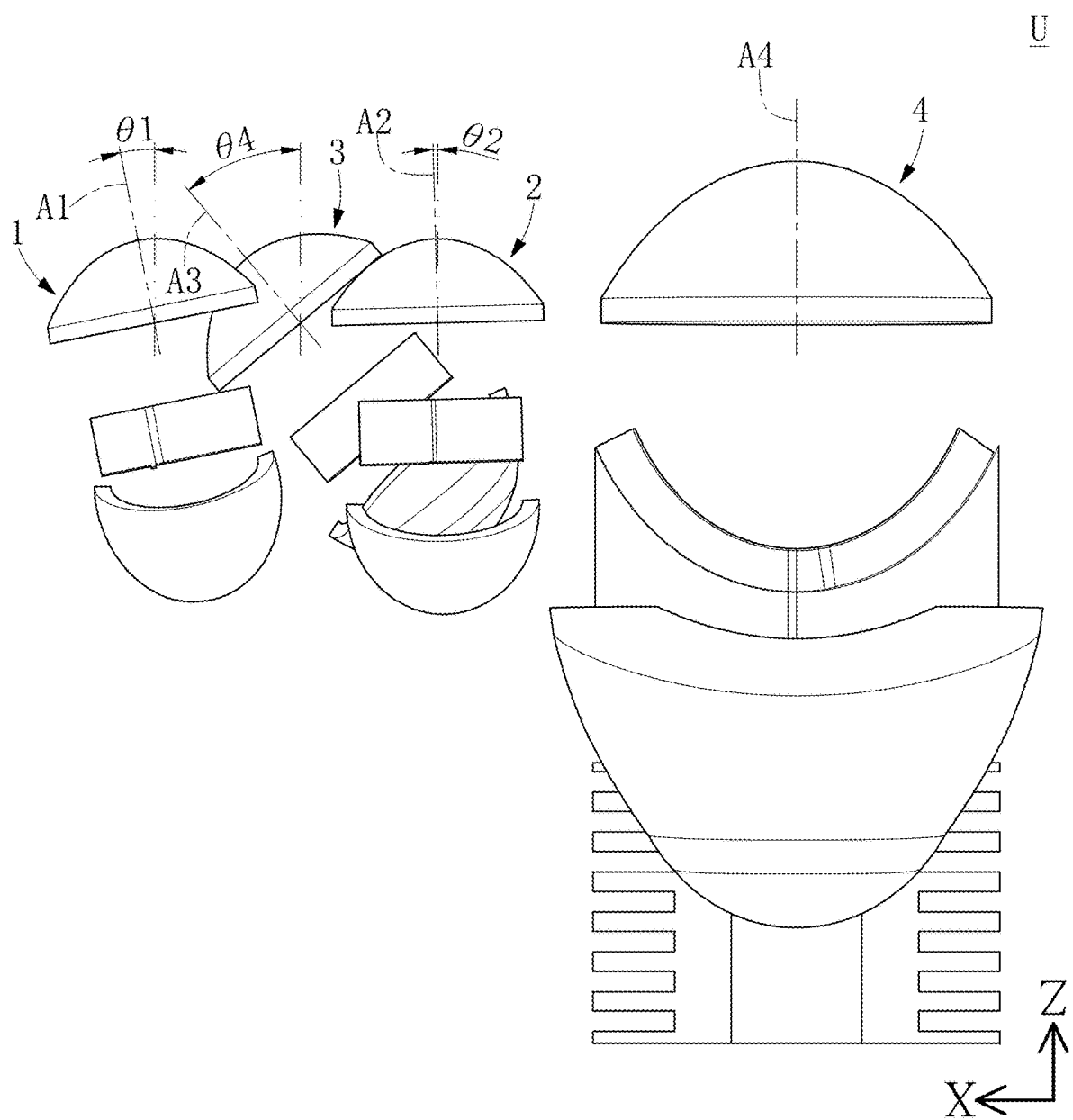
FIG. 4 is a top view of the headlight device according to the first embodiment of the present disclosure.
Figure 5:
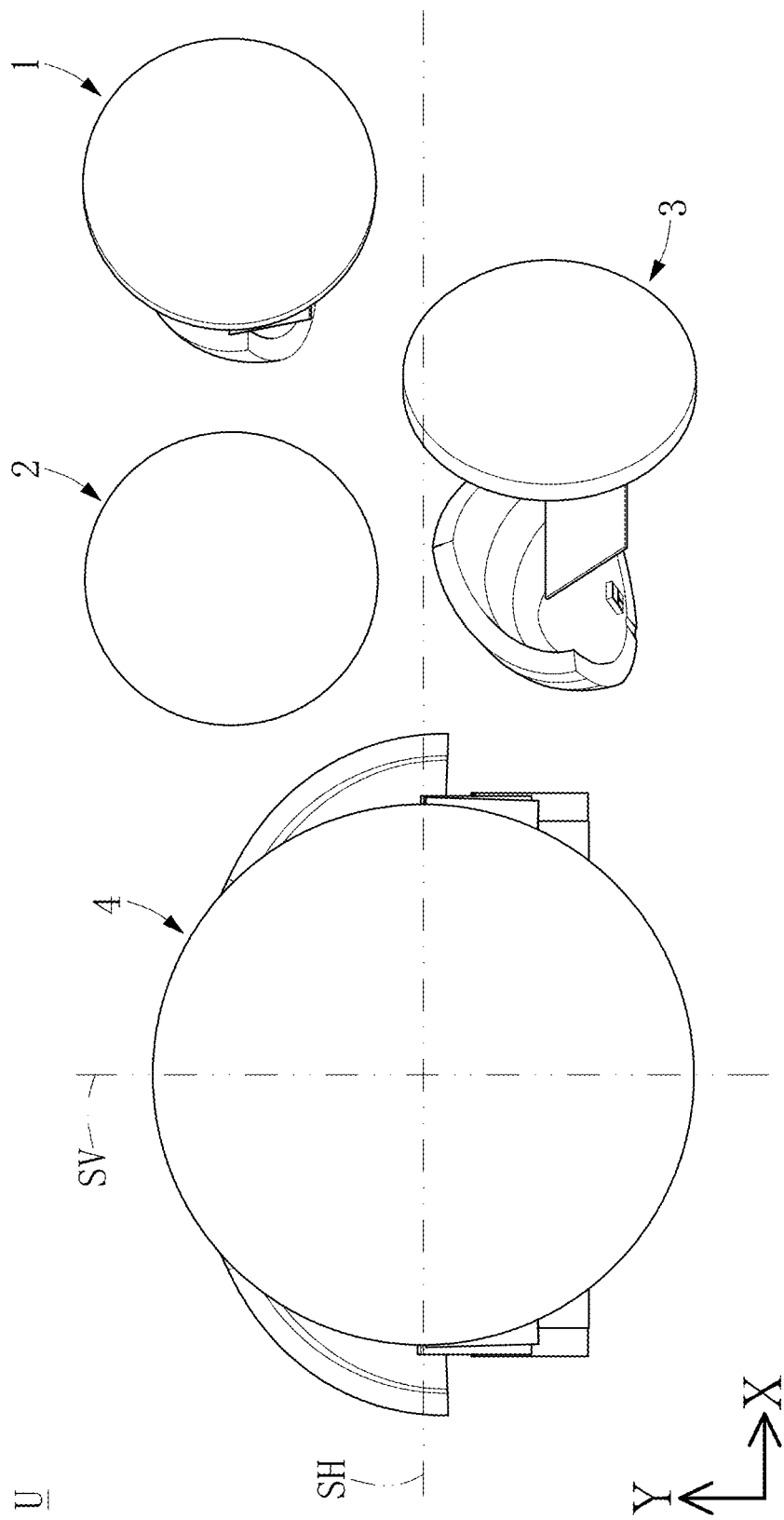
FIG. 5 is a front view of the headlight device according to the first embodiment of the present disclosure.
Figure 6:
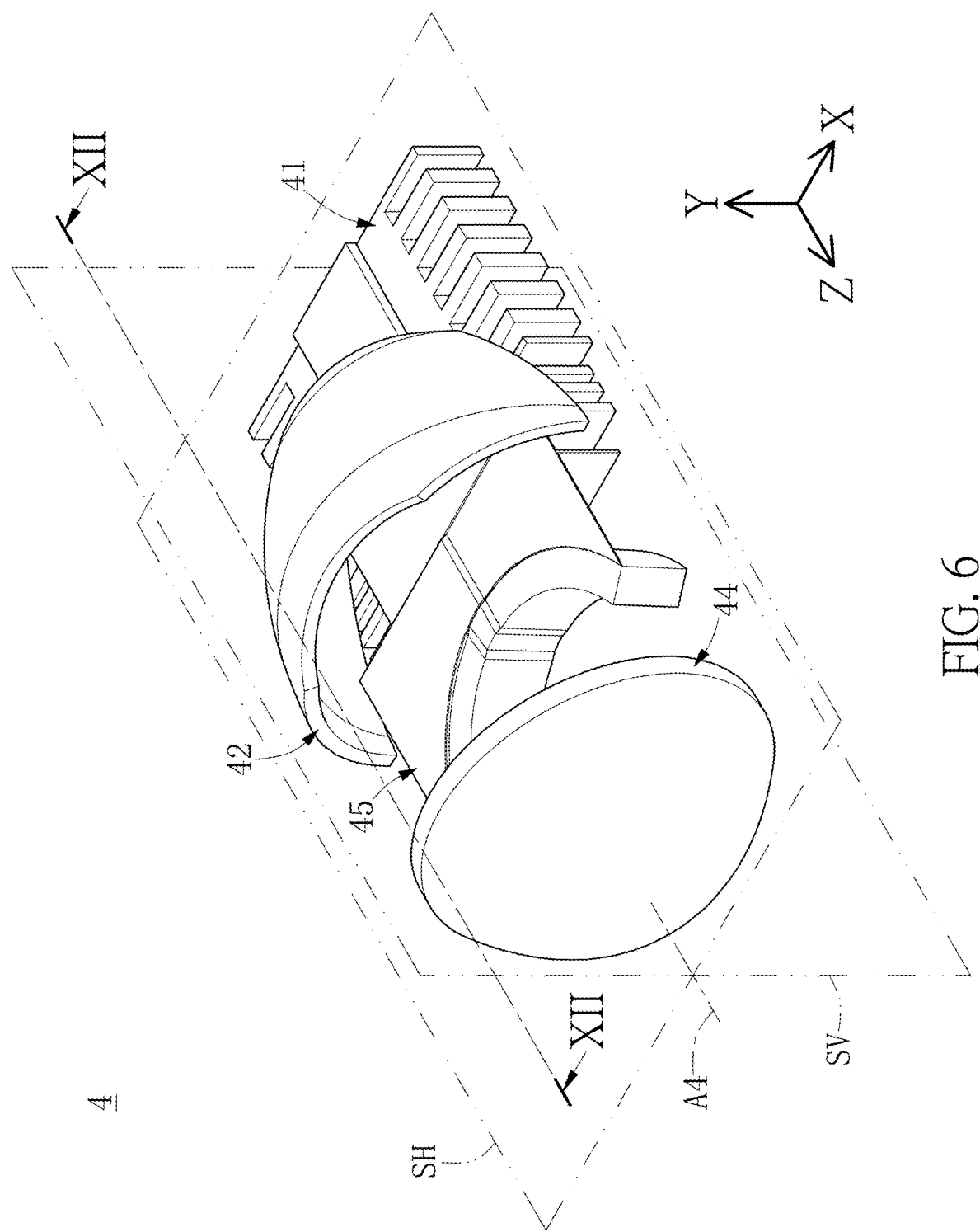
FIG. 6 is an assembled view of a main headlight module of the headlight device according to the first embodiment of the present disclosure.
Figure 7:
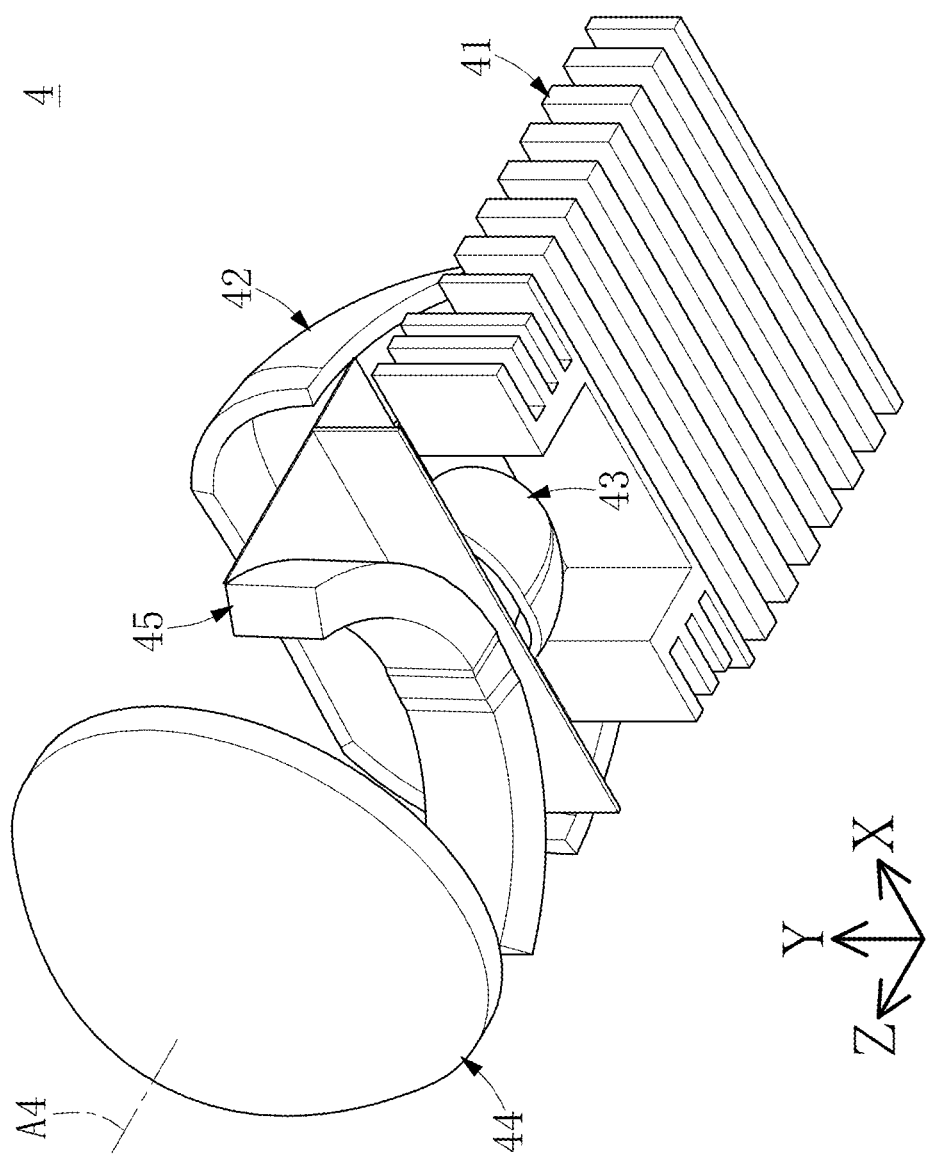
FIG. 7 is another assembled view of the main headlight module of the headlight device according to the first embodiment of the present disclosure.
Figure 8:
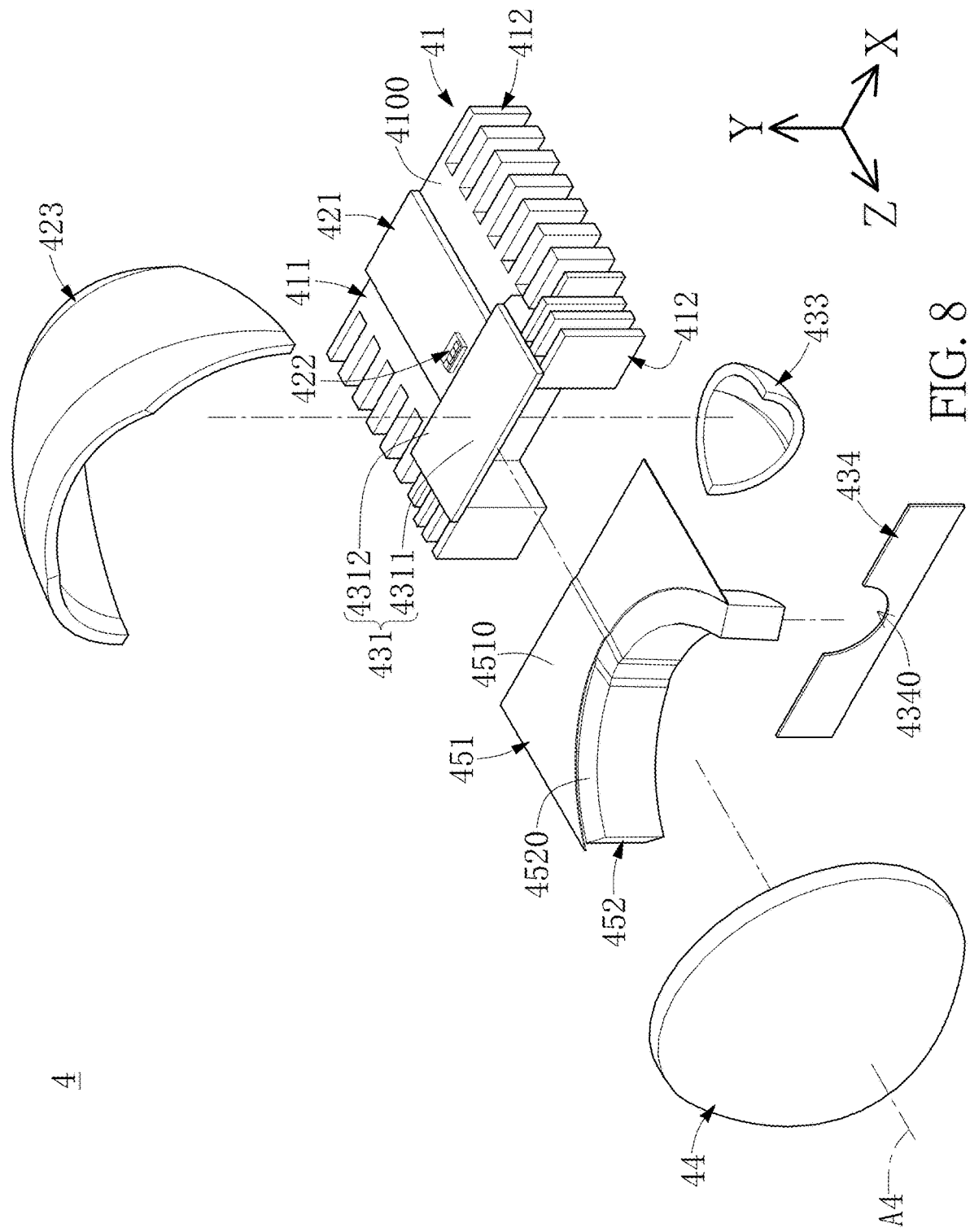
FIG. 8 is an exploded view of the main headlight module of the headlight device according to the first embodiment of the present disclosure.
Figure 9:
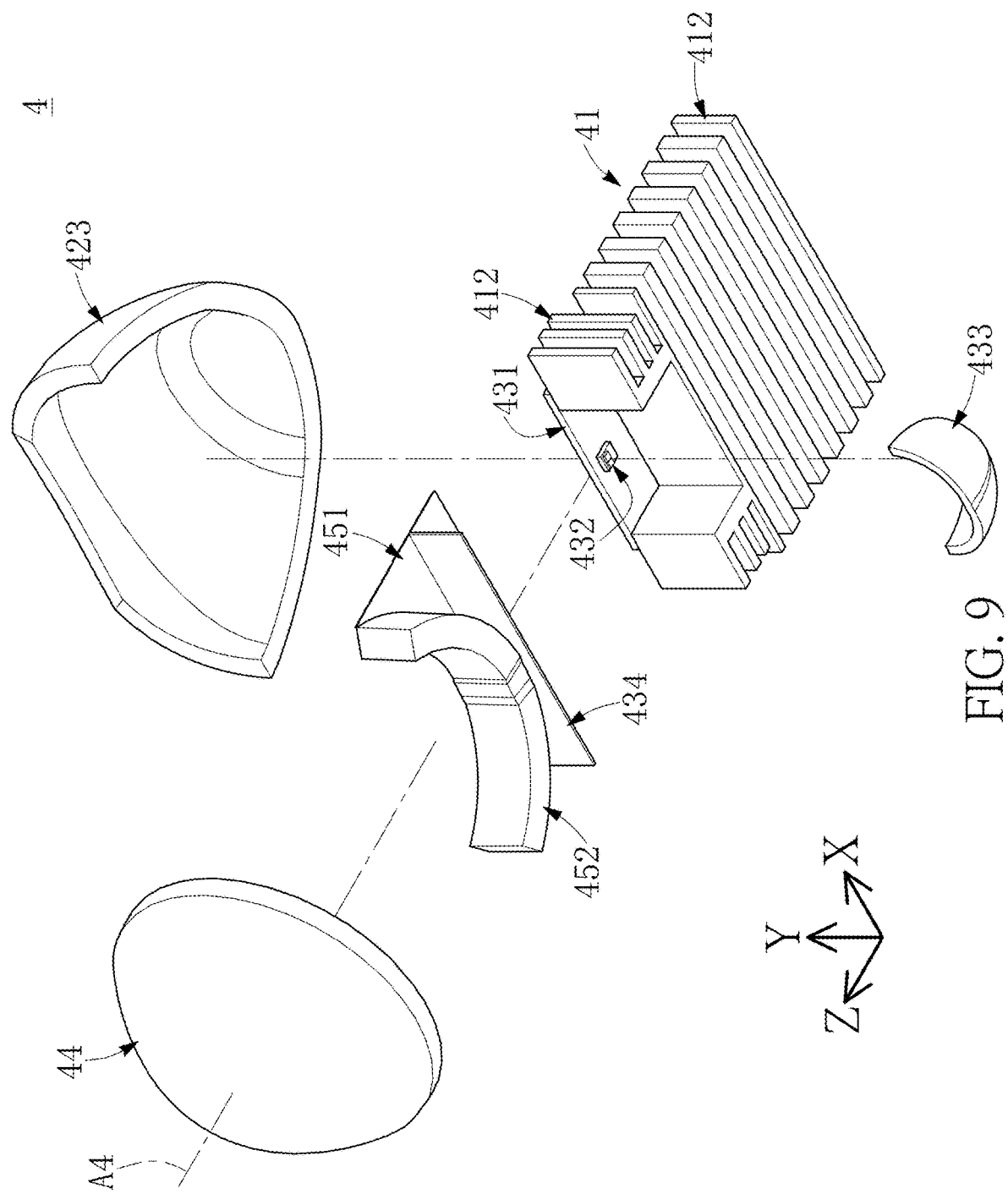
FIG. 9 is another exploded view of the main headlight module of the headlight device according to the first embodiment of the present disclosure.
Figure 10:
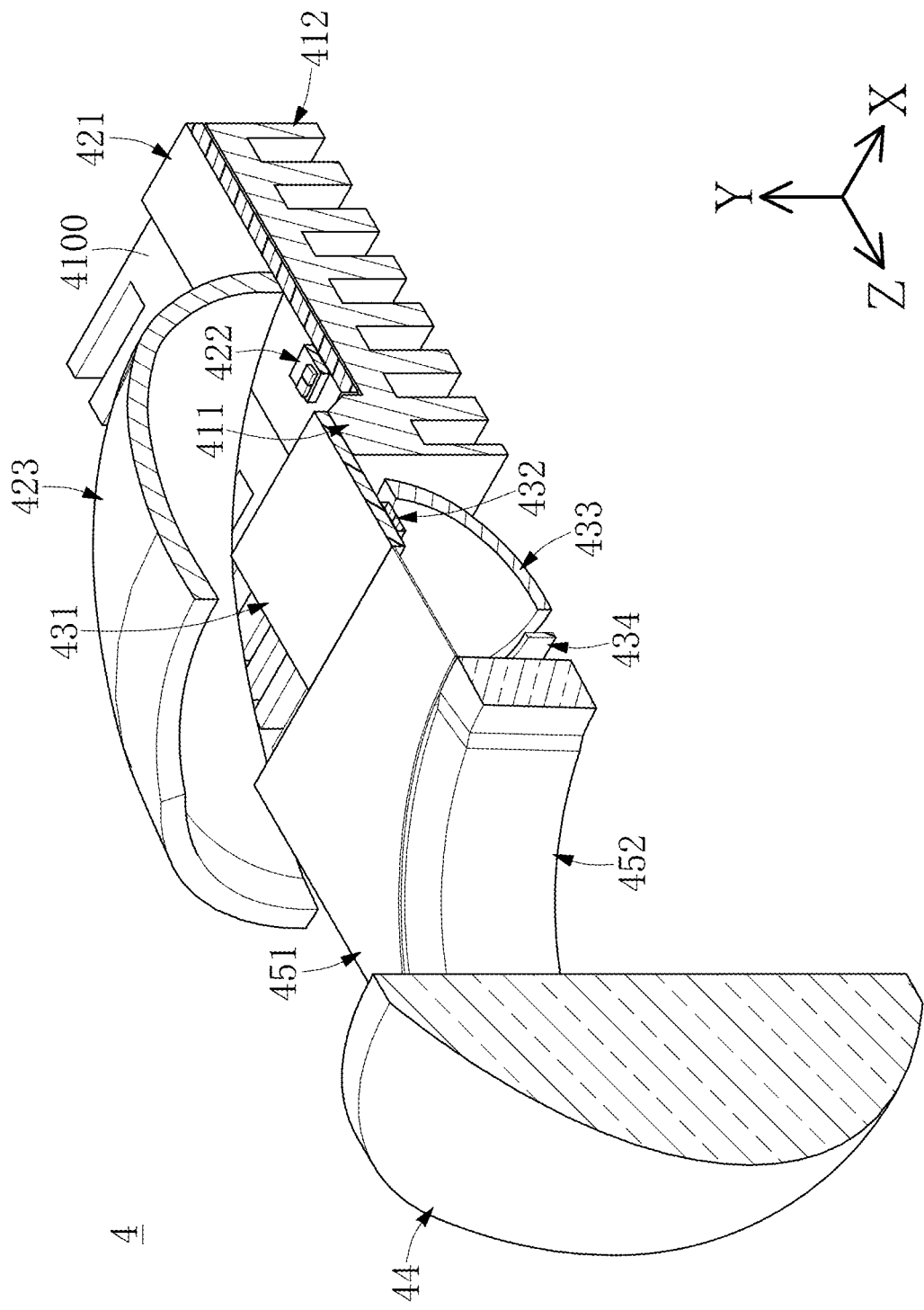
FIG. 10 is a sectional view of the main headlight module of the headlight device according to the first embodiment of the present disclosure.
Figure 11:
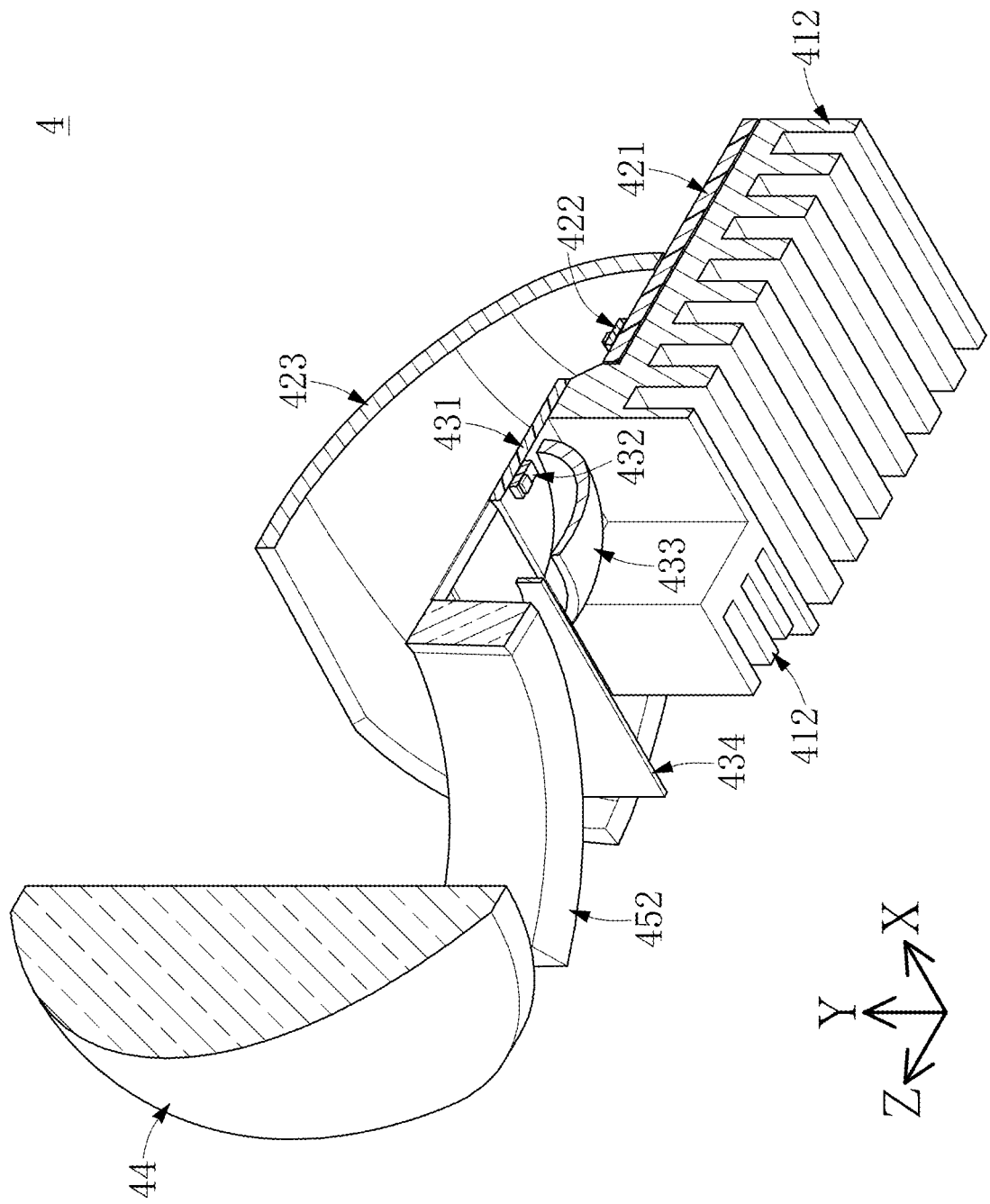
FIG. 11 is another sectional view of the main headlight module of the headlight device according to the first embodiment of the present disclosure.
Figure 23:
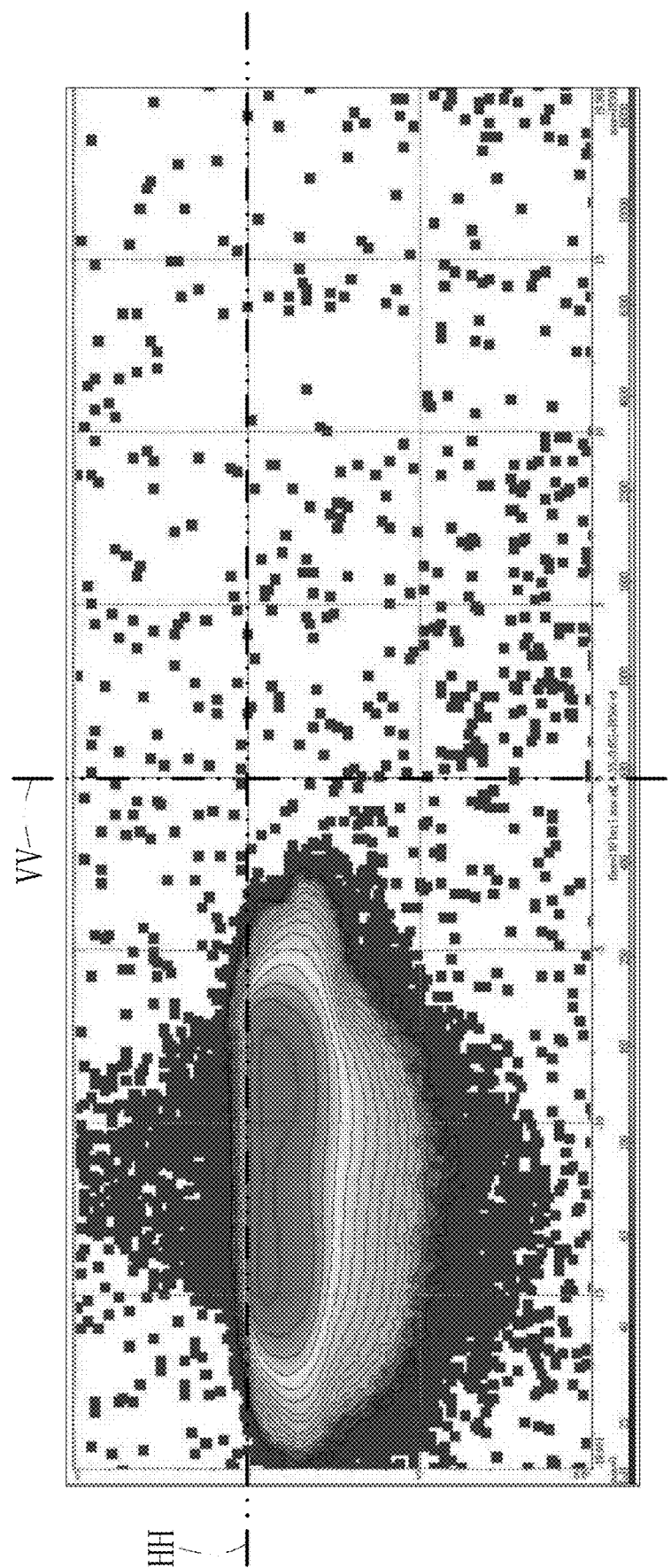
FIG. 23 is a light pattern diagram generated by the bending headlight module of the headlight device according to the first embodiment of the present disclosure.
Figure 24:
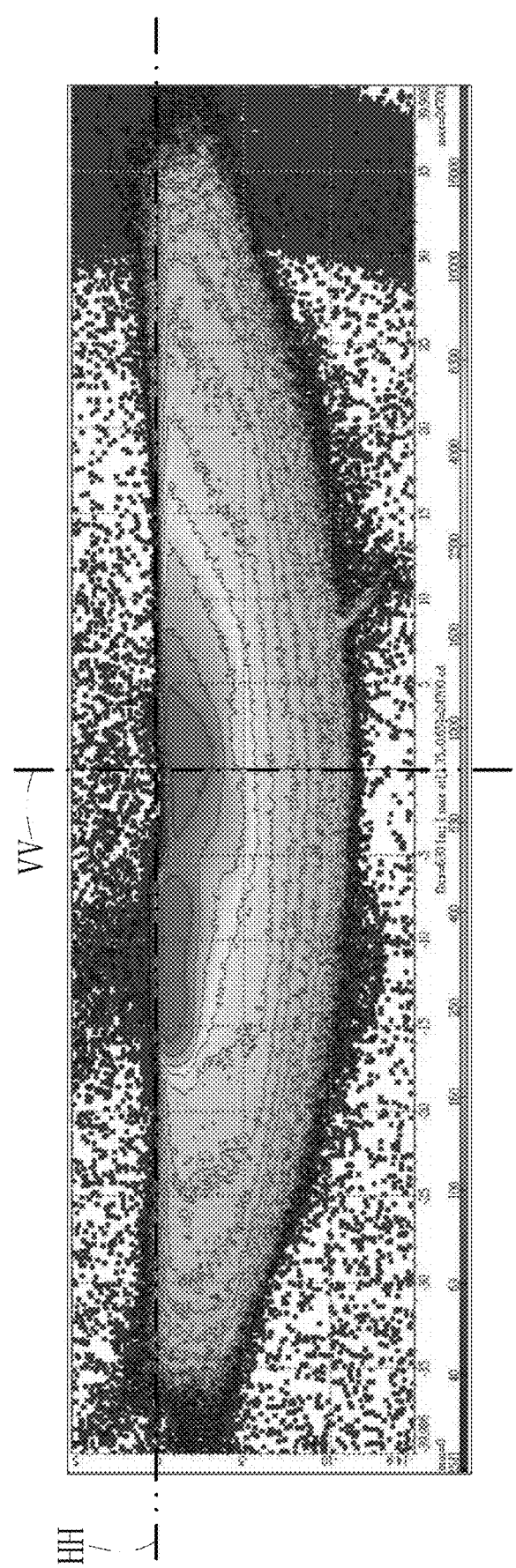
FIG. 24 is a light pattern diagram generated by the main headlight module and the bending headlight module of the headlight device according to the first embodiment of the present disclosure.

As shown in FIG. 4, according to the first embodiment of the present disclosure, the bending headlight module 1 in the left headlight of the left-hand drive car can be turned left relatively to the main headlight module 4, so that the first predetermined angle $\theta1$ between the first optical axis A1 of the bending headlight module 1 and the main optical axis A4 or between the first optical axis A1 of the bending headlight module 1 and the vertical plane SV is provided, thereby generating a light pattern as shown in FIG. 23. Further, when the main headlight module 4 and the bending headlight module 1 are lit at the same time, the light patterns shown in FIG. 24 can be generated. In other words, it can be observed by comparing FIG. 24 and FIG. 14 that it can be judged from the horizontal line HH and the perpendicular line VV in the light pattern diagram that when the main headlight module 4 and the bending headlight module 1 are lit at the same time, the lighting range in the front left can be increased.

It is worth mentioning that, when the main optical axis A4 is parallel to the horizontal plane SH, the normal projection of the first optical axis A1 of the bending headlight module 1 on the vertical plane SV and the normal projection of the main optical axis A4 on the vertical plane SV are parallel to each other. Therefore, in this embodiment, the bending headlight module 1 is only turned to the left relative to the main headlight module 4, so that the lighting direction of the bending headlight module 1 is at the front left of the left-hand drive car, and the extension direction of the first optical axis A1 is toward the front left side, that is, the extension direction of the first optical axis A1 is extended toward the front left and corresponds to the main optical axis A4. However, it should be noted that, in other embodiments, when there is a predetermined tilted angle $\gamma$ other than 0 degrees between the main optical axis A4 and the horizontal plane SH, the normal projection of the first optical axis A1 of the bending headlight module 1 on the vertical plane SV and the normal projection of the main optical axis A4 on the vertical plane SV are not parallel to each other.

Referring to FIG. 17, the first reflecting unit 11 can include a first focal point 11*a* and a second focal point 11*b* corresponding to the first focal point 11*a* of the first reflecting unit 11. In other words, the first reflecting unit 11 can include a reflecting surface with an elliptical curvature. In addition, the first lighting unit 12 can correspond to the first focal point 11*a* of the first reflecting unit 11, and the first lens unit 14 can include a first lens focal point 14*a*. The first lens focal point 14*a* of the first lens unit 14 corresponds to the second focal point 11*b* of the first reflecting unit 11 and is located on the first optical axis A1. For instance, the first lighting unit 12 can be disposed on the first focal point 11*a* of the first reflecting unit 11, and the first lens focal point 14*a* and the second focal point 11*b* of the first reflecting unit 11 can, but not being limited to, overlap with each other. For instance, the present disclosure uses the diameter of the first lens unit 14 as 26 mm as an exemplary description, but is not limited thereto.

Referring to FIG. 17, which is to be read in conjunction with FIG. 18 to FIG. 21, the first cut-off plate unit 13A is a cut-off plate for generating a cut-off line to produce a light pattern that complies with regulations. The first cut-off plate unit 13A can include a first cut-off plate body 131, a second cut-off plate body 132, a cut-off plate turning part 133 connected between the first cut-off plate body 131 and the second cut-off plate body 132, a cut-off plate protruding part 134 protruding from the first cut-off plate body 131 and being adjacent to the cut-off plate turning part 133, a first front cut-off edge 13a, a first rear cut-off edge 13b, and a first top side surface 13c. In addition, the first front cut-off edge 13a can be formed on the first cut-off plate body 131, the second cut-off plate body 132, the cut-off plate turning part 133, and the cut-off plate protruding part 134, and the first rear cut-off edge 13b can be formed on the first cut-off plate body 131, the second cut-off plate body 132, the cut-off plate turning part 133, and the cut-off plate protruding part 134. Further, the first front cut-off edge 13a and the first rear cut-off edge 13b are disposed corresponding to each other, and the first top side surface 13c is connected between the first front cut-off edge 13a and the first rear cut-off edge 13b. Furthermore, the second focal point 11b of the first reflecting unit 11 can preferably be located on the first front cut-off edge 13a, but is not limited thereto.

More specifically, the first top side surface 13c on the cut-off plate turning part 133 is an inclined plane and the first top side surface 13c on the cut-off plate turning part 133 is tilted toward the direction from the first cut-off plate body 131 to the second cut-off plate body 132, and a first predetermined included angle β1 between 160 degrees and 172 degrees is defined between the first top side surface 13c on the cut-off plate turning part 133 and the first top side surface 13c on the second cut-off plate body 132. In the present disclosure, the first predetermined included angle β1 is 166 degrees as an exemplary description. In addition, a first predetermined distance D1 between 0.1 millimeters (mm) and 0.5 mm is provided between the first top side surface 13c on the first cut-off plate body 131 and the first top side surface 13c on the second cut-off plate body 132. Preferably, the first predetermined distance D1 can be between 0.15 mm and 0.35 mm. The first cut-off plate unit 13A of the present disclosure uses the first predetermined distance D1 as 0.25 mm as an exemplary description. Further, a second predetermined distance D2 is provided between the first optical axis A1 and an edge of the cut-off plate turning part 133 that is adjacent to the first optical axis A1, the length of the second predetermined distance D2 is between 5 times and 11 times the size of the first predetermined distance D1. For instance, the second predetermined distance D2 can be between 0.5 mm and 5.5 mm. Preferably, the second predetermined distance D2 can be between 0.75 mm and 3.85 mm. The present disclosure uses the second predetermined distance D2 as 2.1 mm as an exemplary description. In addition, a predetermined distance 13G between 1.7 mm and 4.7 mm is provided between the first optical axis A1 and an edge of an adjacent cut-off plate protruding part 134. Preferably, the predetermined distance 13G can be between 2.2 mm and 4.2 mm. In the present disclosure, the predetermined distance 13G is 3.2 mm as an exemplary description.

Figure 19:
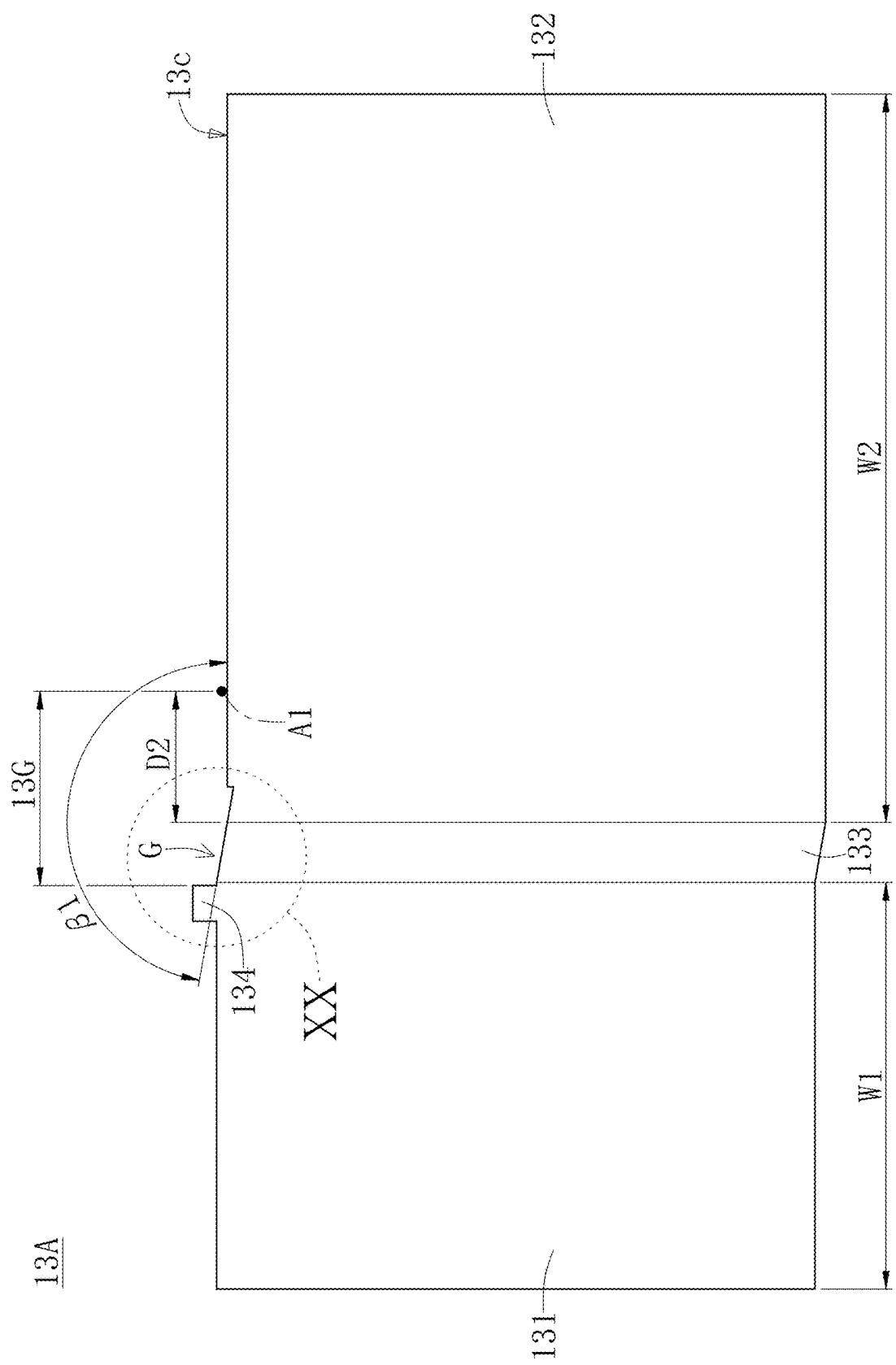
FIG. 19 is a front view of a first cut-off plate unit of the bending headlight module of the headlight device according to the first embodiment of the present disclosure.

Referring to FIG. 4 and FIG. 19, the first cut-off plate body 131, the cut-off plate turning part 133, and part of the second cut-off plate body 132 of the first cut-off plate unit 13A are located on a first side of the first optical axis A1, and the other part of the second cut-off plate body 132 of the first cut-off plate unit 13A is located on a second side of the first optical axis A1, and the first side and the second side are respectively on opposite sides of the first optical axis A1. For instance, as shown in FIG. 4 and FIG. 19, the first side of the first optical axis A1 can be the left side of the first optical axis A1, and the second side of the first optical axis A1 can be the right side of the first optical axis A1. Further, in the effective shading range of the first cut-off plate unit 13A, a first predetermined width W1 of the first cut-off plate body 131 of the first cut-off plate unit 13A can be smaller than a second predetermined width W2 of the second cut-off plate body 132 of the first cut-off plate unit 13A. It should be noted that, the effective shading range described above is the range that the first cut-off plate unit 13A can block light.

Figure 20:
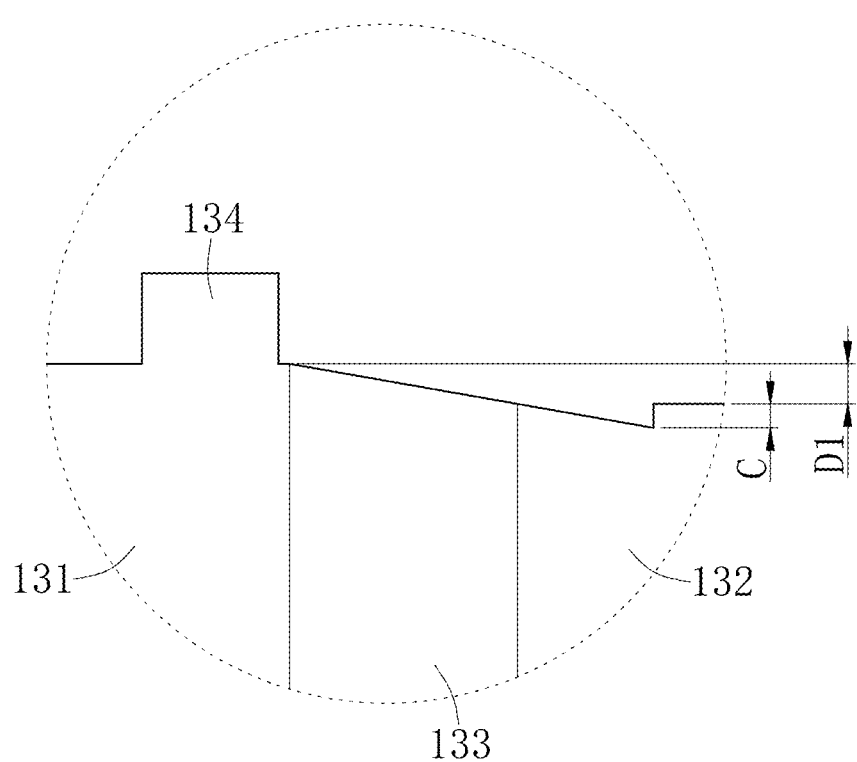
FIG. 20 is a partial view of the XX part in FIG. 19.
Figure 21:
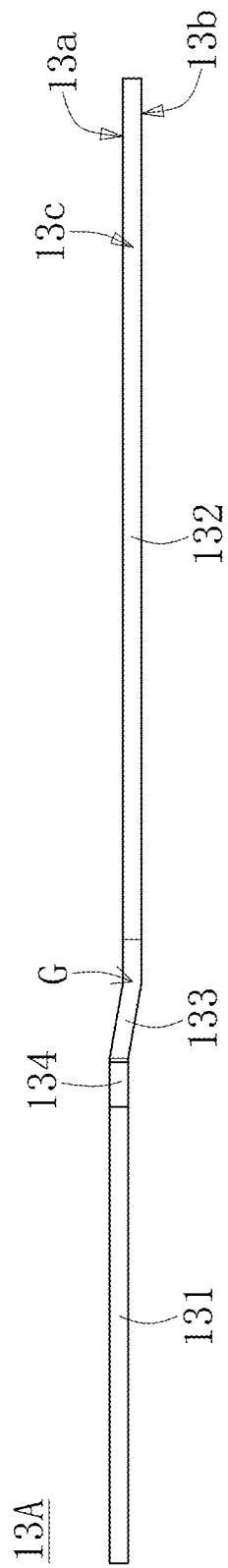
FIG. 21 is a top view of the first cut-off plate unit of the bending headlight module of the headlight device according to the first embodiment of the present disclosure.

Referring to FIG. 20, the inclined plane on the cut-off plate turning part 133 of the first cut-off plate unit 13A extends from the cut-off plate turning part 133 of the first cut-off plate unit 13A to the second cut-off plate body 132 of the first cut-off plate unit 13A, so as to form a groove structure G opposite to the cut-off plate protruding part 134 of the first cut-off plate unit 13A and the second cut-off plate body 132 of the first cut-off plate unit 13A. In other words, a predetermined spaced C between 0 mm and 0.25 mm between the bottom end of the inclined plane on the second cut-off plate body 132 and the first top side surface 13c on the second cut-off plate body 132 is provided. In the present disclosure, the predetermined spaced C of 0.12 mm is taken as an exemplary description, that is, preferably, the first top side surface 13c on the second cut-off plate body 132 of the first cut-off plate unit 13A can correspond to and protrude from the first top side surface 13c on the bottom end of the inclined plane.

Figure 22:
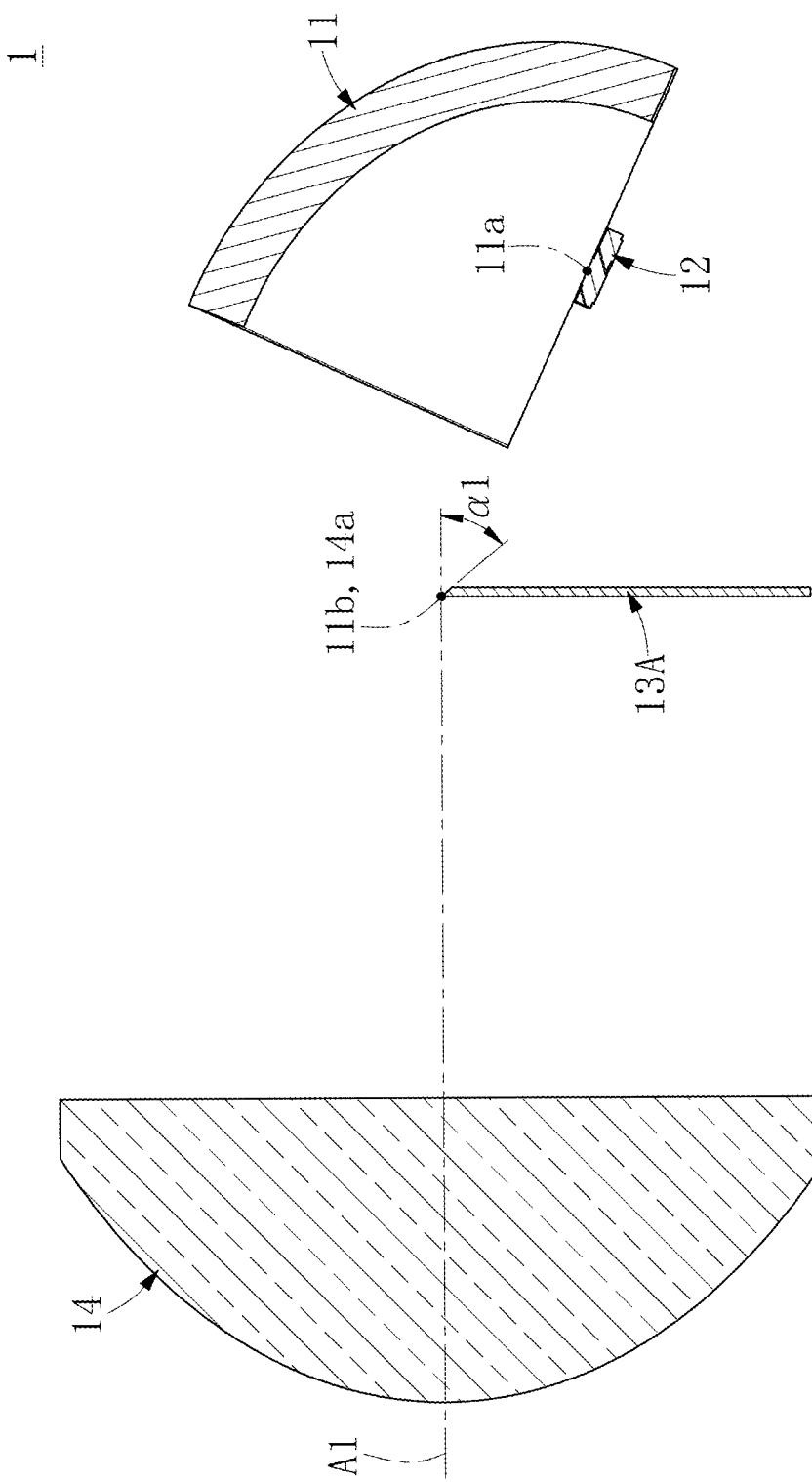
FIG. 22 is a sectional view in another way of the bending headlight module of the headlight device according to the first embodiment of the present disclosure.

Referring to FIG. 17, in order to prevent the first rear cut-off edge 13b of the first cut-off plate unit 13A from blocking the light transmitted to the second focal point 11b of the first reflecting unit 11, a first predetermined inclined angle α1 between 20 degrees and 70 degrees between the first top side surface 13c and the first optical axis A1 is provided, and the present disclosure uses the first predetermined inclined angle α1 as 45 degrees as an exemplary description. That is, in the embodiment of FIG. 17, the first cut-off plate unit 13A can be inclined. However, it should be noted that, as shown in FIG. 22, in the embodiment of FIG. 22, the first cut-off plate unit 13A can be placed upright, and a first predetermined inclined angle α1 between 20 degrees and 70 degrees between the first top side surface 13c and the first optical axis A1 can also be provided.

Referring to FIG. 1 to FIG. 5, which are to be read in conjunction with FIG. 25 to FIG. 28, the following will first describe the structure when the headlight device U is the left headlight on a left-hand drive car and the structure of the high-speed headlight module 2 of the left headlight that is applied on the left-hand drive car.

Specifically speaking, the high-speed headlight module 2 can be disposed adjacent to the main headlight module 4, and the high-speed headlight module 2 can include a second reflecting unit 21, a second lighting unit 22, a second cut-off plate unit 23A, and a second lens unit 24. The second lighting unit 22 can be disposed corresponding to the second reflecting unit 21, the second cut-off plate unit 23A can be disposed corresponding to the second reflecting unit 21, and the second lens unit 24 can be disposed corresponding to the second reflecting unit 21. For instance, the high-speed headlight module 2 of the headlight device U of the first embodiment can be mainly used to generate a light mode of a high-speed road lighting mode 1 (E1 mode) or a high-speed road lighting mode 2 (E2 mode), but is not limited thereto.

The high-speed headlight module 2 can include a second optical axis A2, and the second optical axis A2 can be the optical axis of the second lens unit 24. A second predetermined angle θ2 between 0.9 degrees and 2.1 degrees is defined between the normal projection of the second optical axis A2 on the horizontal plane SH and the normal projection of the main optical axis A4 on the horizontal plane SH, or is defined between the normal projection of the second optical axis A2 on the horizontal plane SH and the normal projection of the vertical plane SV on the horizontal plane SH. In addition, a third predetermined angle θ3 between 0.2 degrees and 0.57 degrees is defined between the normal projection of the second optical axis A2 on the vertical plane SV and the normal projection of the main optical axis A4 on the vertical plane SV, or is defined between the normal projection of the second optical axis A2 on the vertical plane SV and the normal projection of the horizontal plane SH on the vertical plane SV. Preferably, the second predetermined angle θ2 can be between 1.2 degrees and 1.8 degrees, and the third predetermined angle θ3 can be between 0.3 degrees and 0.5 degrees. In the present disclosure, the second predetermined angle θ2 between the normal projection of the second optical axis A2 on the horizontal plane SH and the normal projection of the vertical plane SV on the horizontal plane SH is 1.5 degrees, and the third predetermined angle θ3 between the normal projection of the second optical axis A2 on the vertical plane SV and the normal projection of the horizontal plane SH on the vertical plane SV is 0.3 degrees as an exemplary description. It should be noted that, in order to better explain the figure, the second predetermined angle θ2 between the normal projection of the second optical axis A2 on the horizontal plane SH and the normal projection of the main optical axis A4 on the vertical plane SV or between the normal projection of the second optical axis A2 on the horizontal plane SH and the normal projection of the vertical plane SV on the horizontal plane SH is marked with a line segment parallel to the main optical axis A4 or the vertical plane SV. The third predetermined angle θ3 between the normal projection of the second optical axis A2 on the vertical plane SV and the normal projection of the main optical axis A4 on the vertical plane SV or between the normal projection of the second optical axis A2 on the horizontal plane SH and the normal projection of the horizontal plane SH on the vertical plane SV is marked with a line segment parallel to the main optical axis A4 or the horizontal plane SH. For instance, the second reflecting unit 21 can be a reflecting surface having an elliptic curvature, and the second lighting unit 22 can be, but not limited to being, a light emitting diode (LED) or a light emitting diode package structure (LED package structure).

Figure 25:
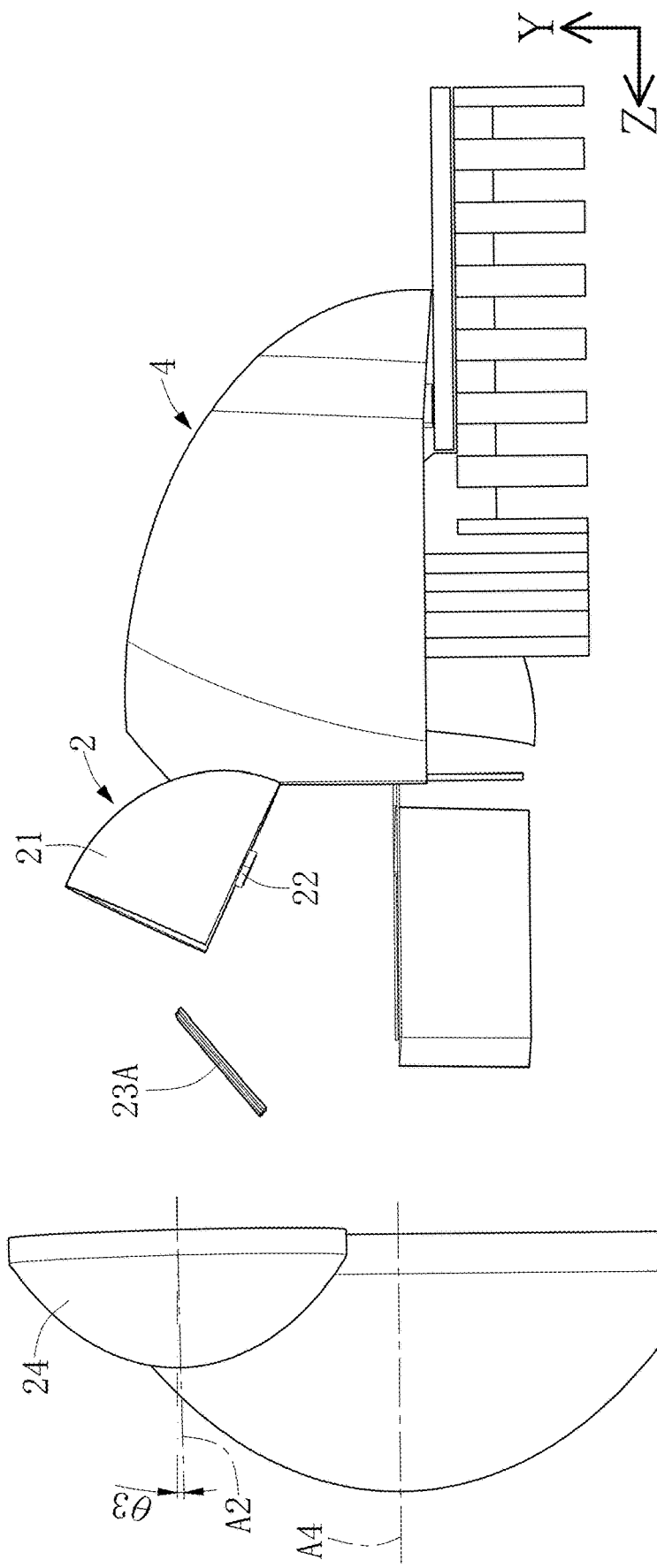
FIG. 25 is a side view of the main headlight module and a high-speed headlight module of the headlight device according to the first embodiment of the present disclosure.
Figure 26:
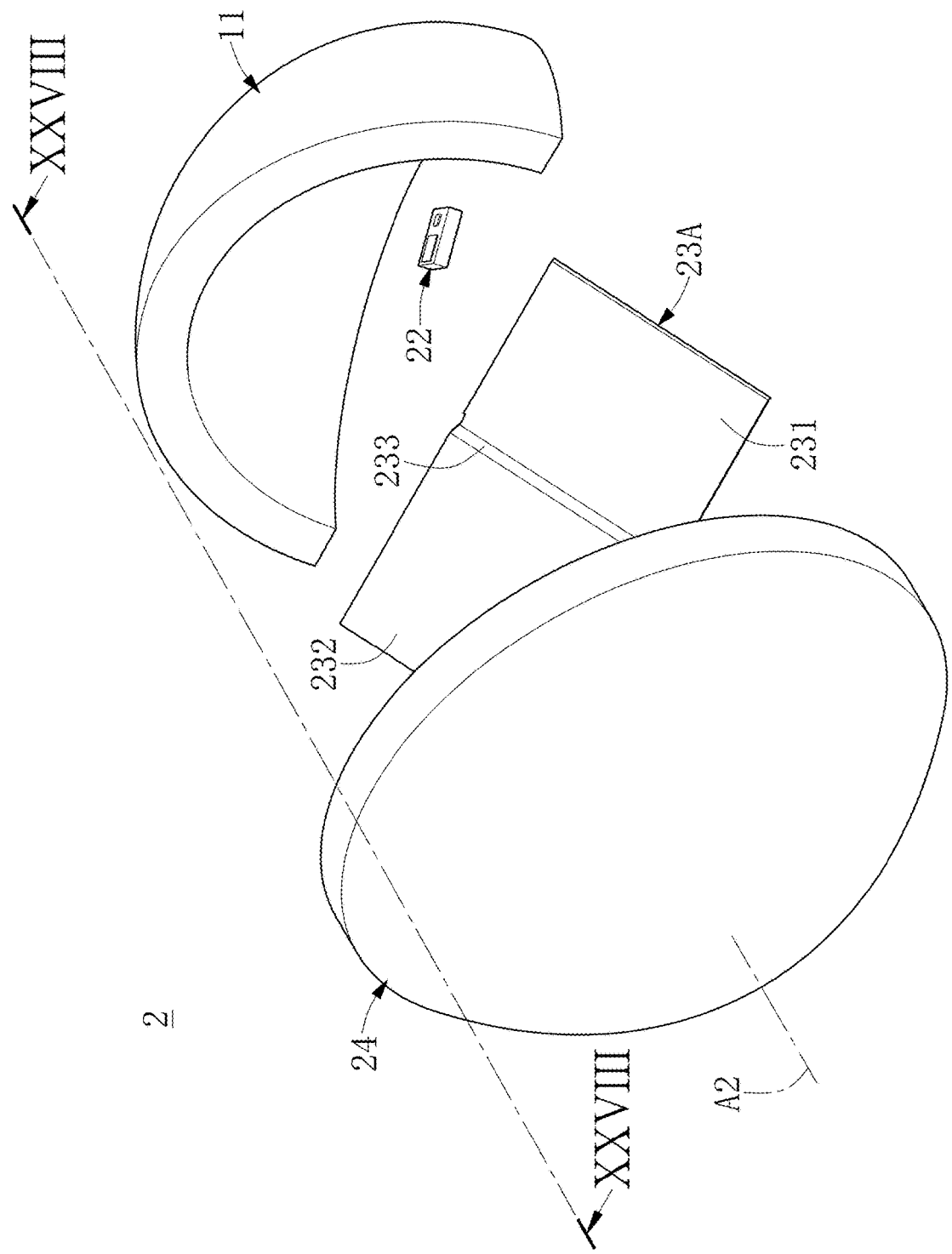
FIG. 26 is a perspective view of the high-speed headlight module of the headlight device according to the first embodiment of the present disclosure.
Figure 27:
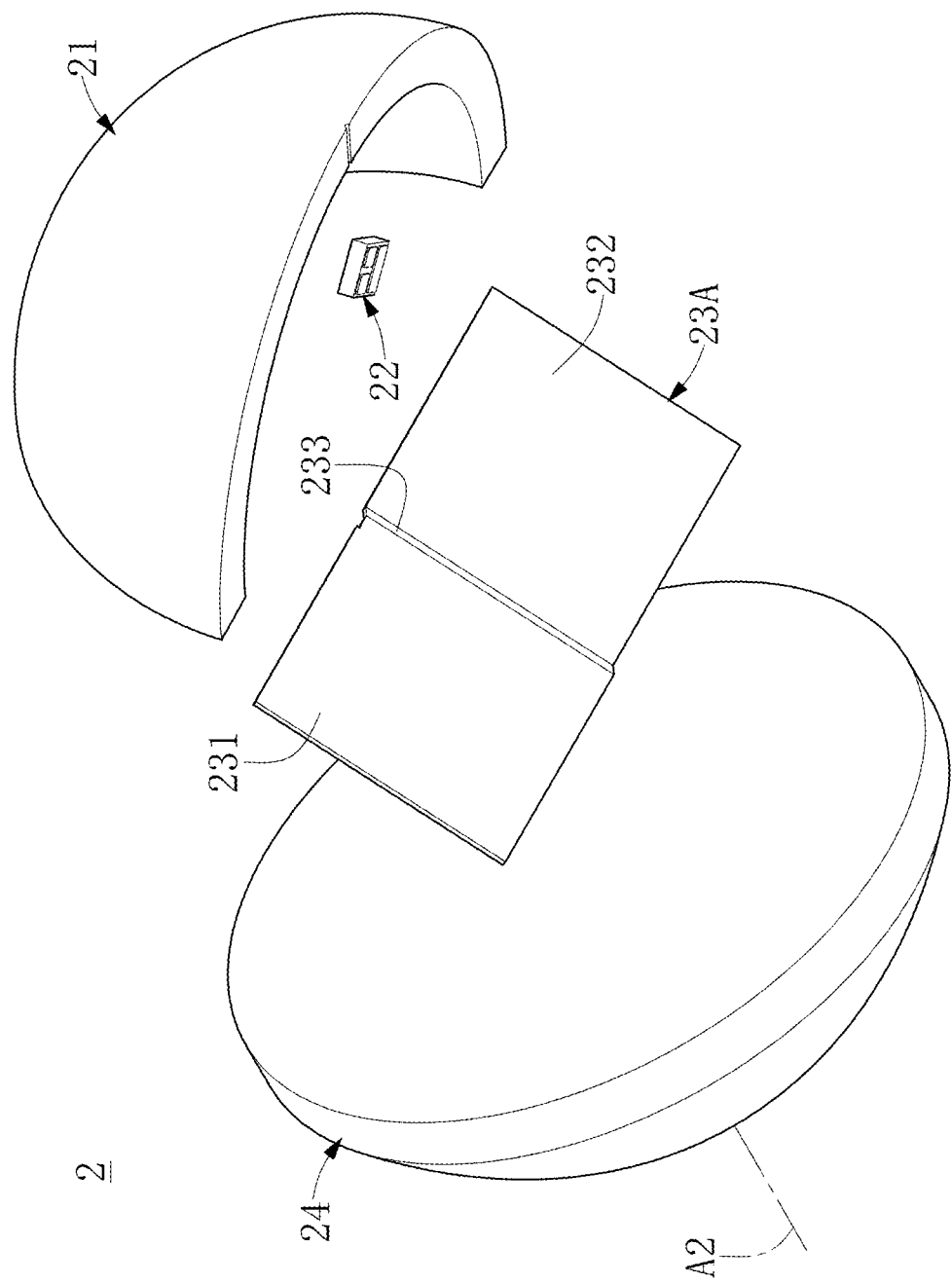
FIG. 27 is another perspective view of the high-speed headlight module of the headlight device according to the first embodiment of the present disclosure.
Figure 34:
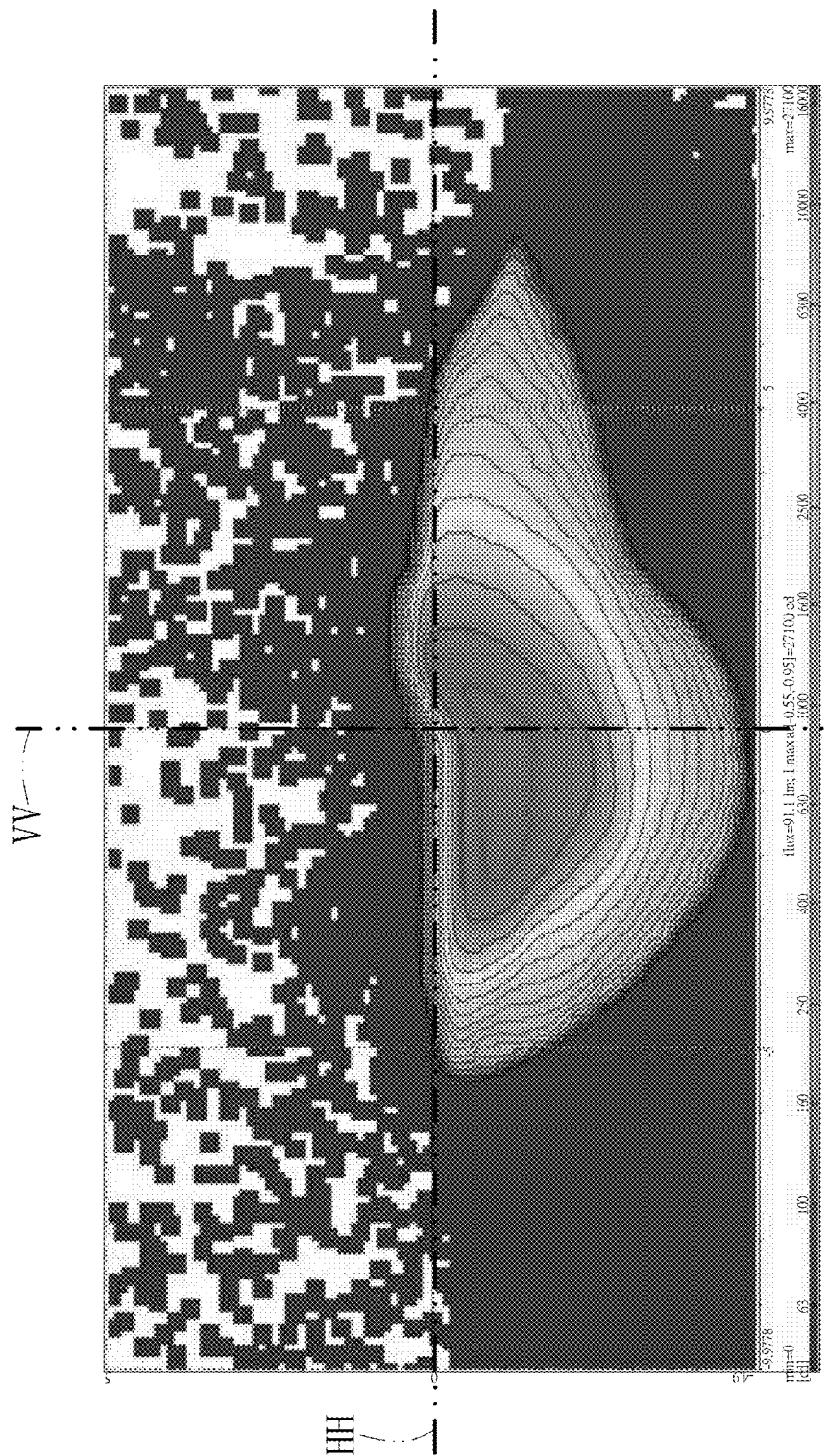
FIG. 34 is a light pattern diagram generated by the high-speed headlight module of the headlight device according to the first embodiment of the present disclosure.
Figure 35:
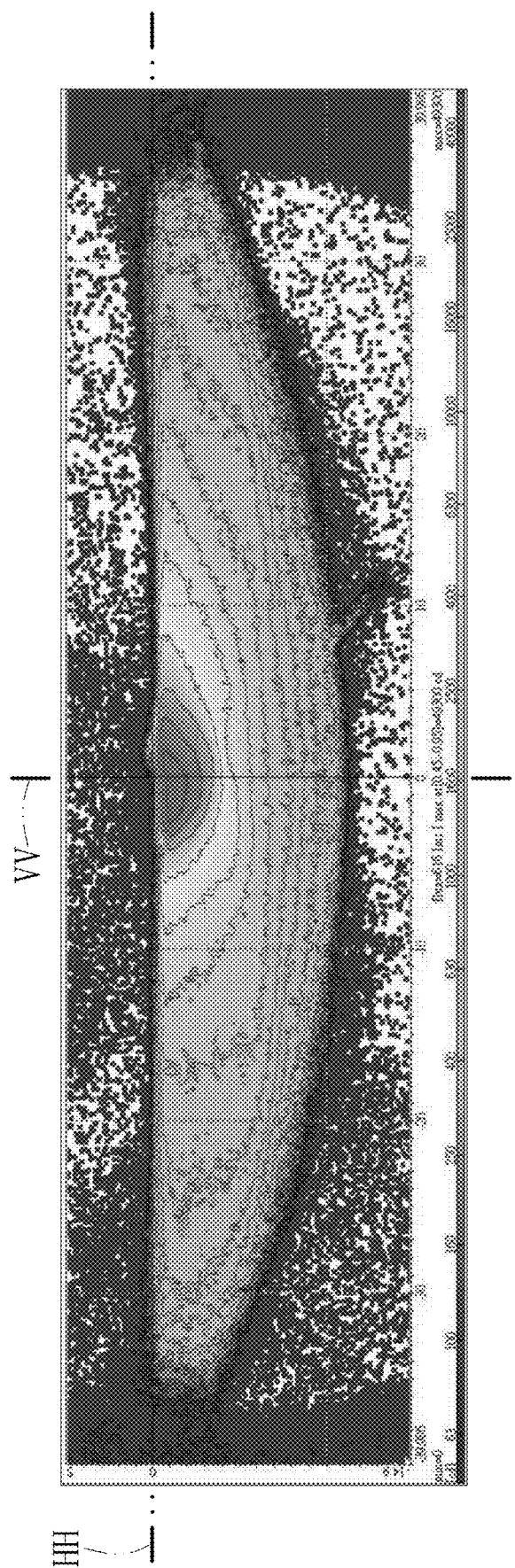
FIG. 35 is a light pattern diagram generated by the main headlight module and the high-speed headlight module of the headlight device according to the first embodiment of the present disclosure.

As shown in FIG. 4 and FIG. 25, according to the first embodiment of the present disclosure, the high-speed headlight module 2 in the left headlight of the left-hand drive car can be relatively rotated leftward and downward to the main headlight module 4 to form the second predetermined angle θ2 and the third predetermined angle θ3 that results in a light pattern as shown in FIG. 34. Further, when the main headlight module 4 and the high-speed headlight module 2 are lit at the same time, the light patterns shown in FIG. 35 can be generated. In other words, it can be observed by comparing FIG. 35 and FIG. 14 that the lighting distance can be increased when the main headlight module 4 and the high-speed headlight module 2 are lit at the same time.

In addition, it is worth mentioning that, in this embodiment, the high-speed headlight module 2 is only rotated leftward and downward relative to the main headlight module 4, so that the lighting direction of the high-speed headlight module 2 is the front left and diagonally downward of left-hand drive car, that is, the extension direction of the second optical axis A2 is the left front lower part of the left-hand drive car, and the extension direction of the second optical axis A2 is the front left lower part relative to the main optical axis A4.

Figure 28:
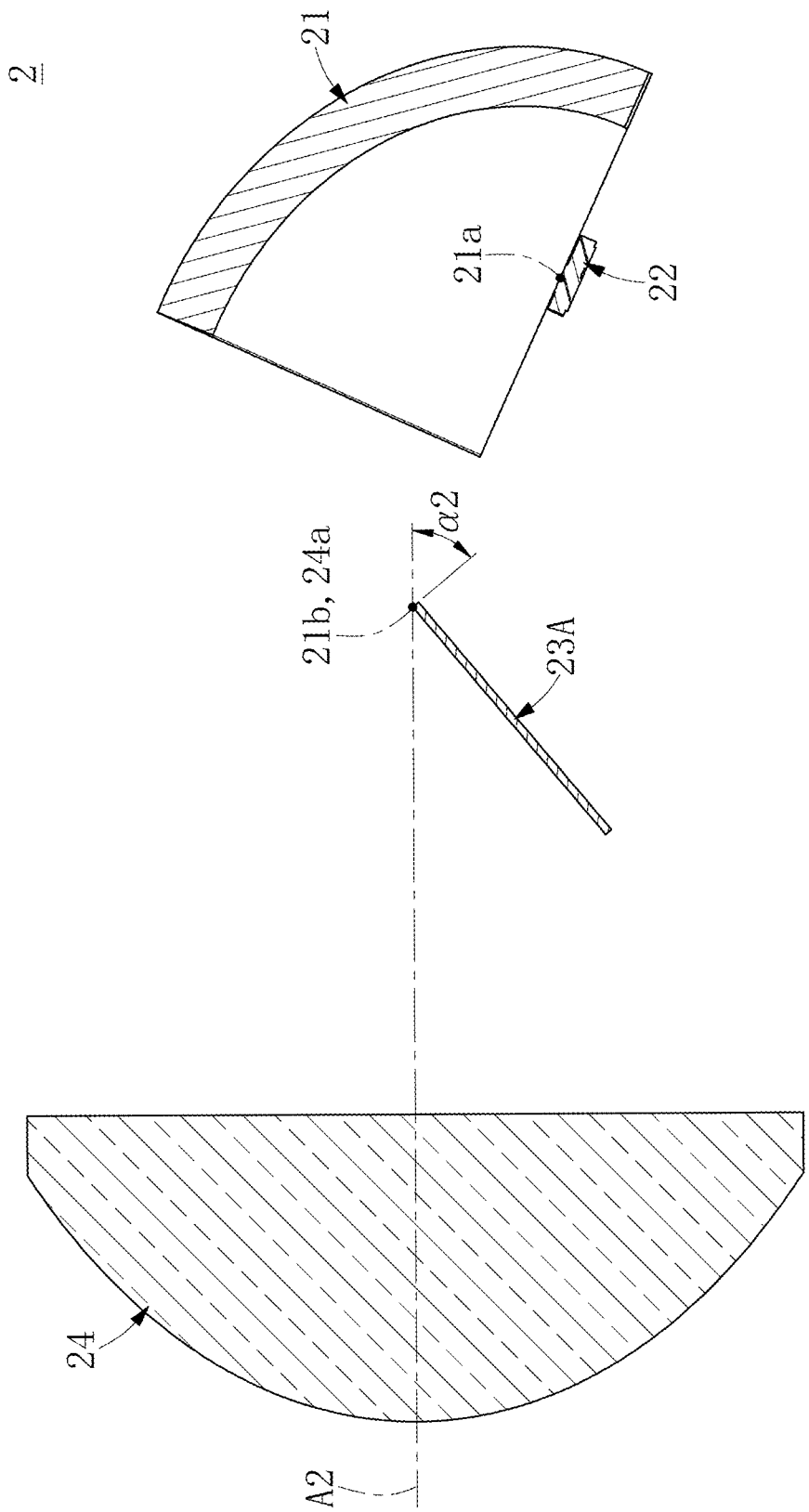
FIG. 28 is a sectional view of the XXVIII-XXVIII section in FIG. 26.
Figure 29:
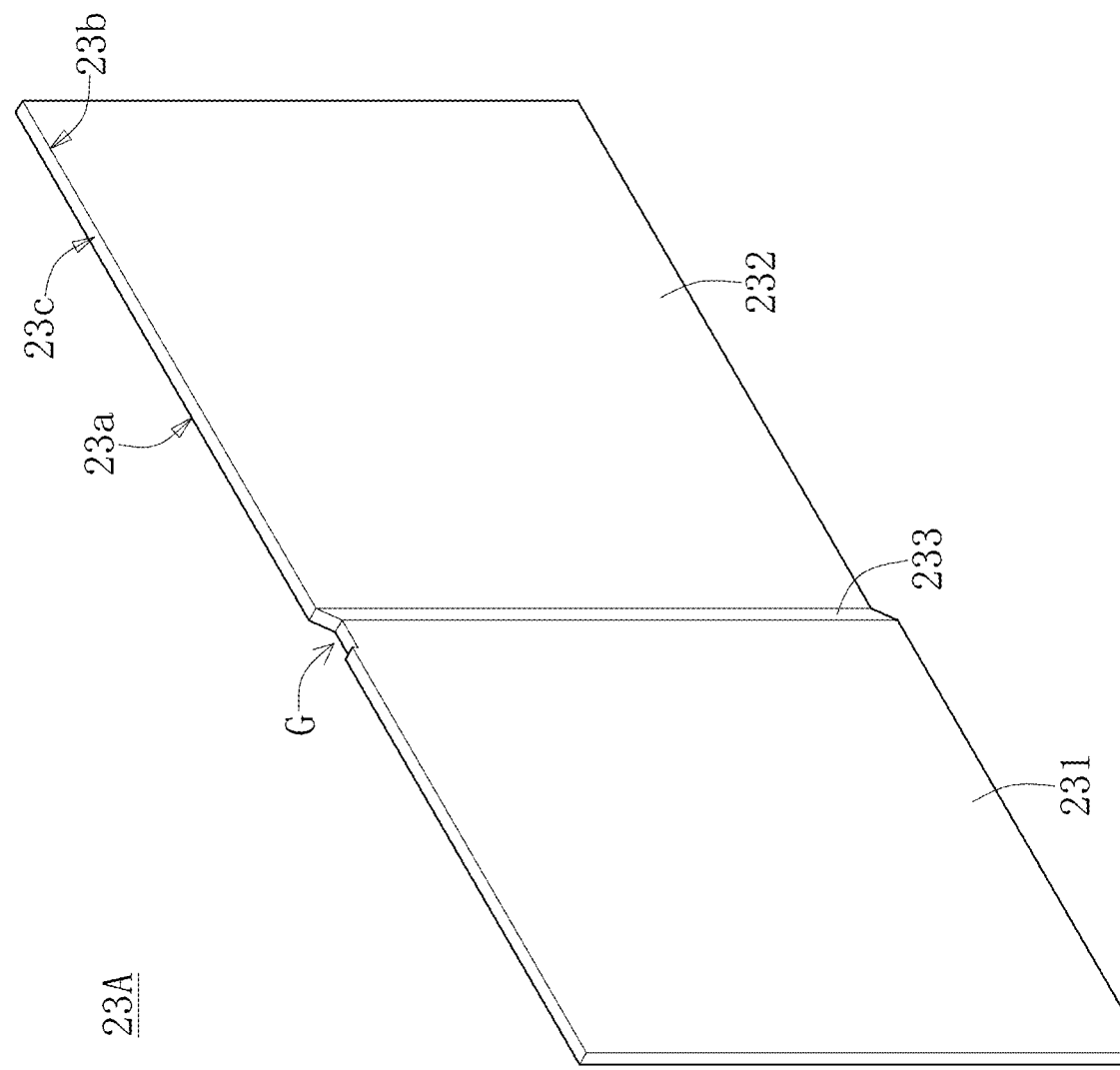
FIG. 29 is a perspective view of a second cut-off plate unit of the high-speed headlight module of the headlight device according to the first embodiment of the present disclosure.
Figure 30:
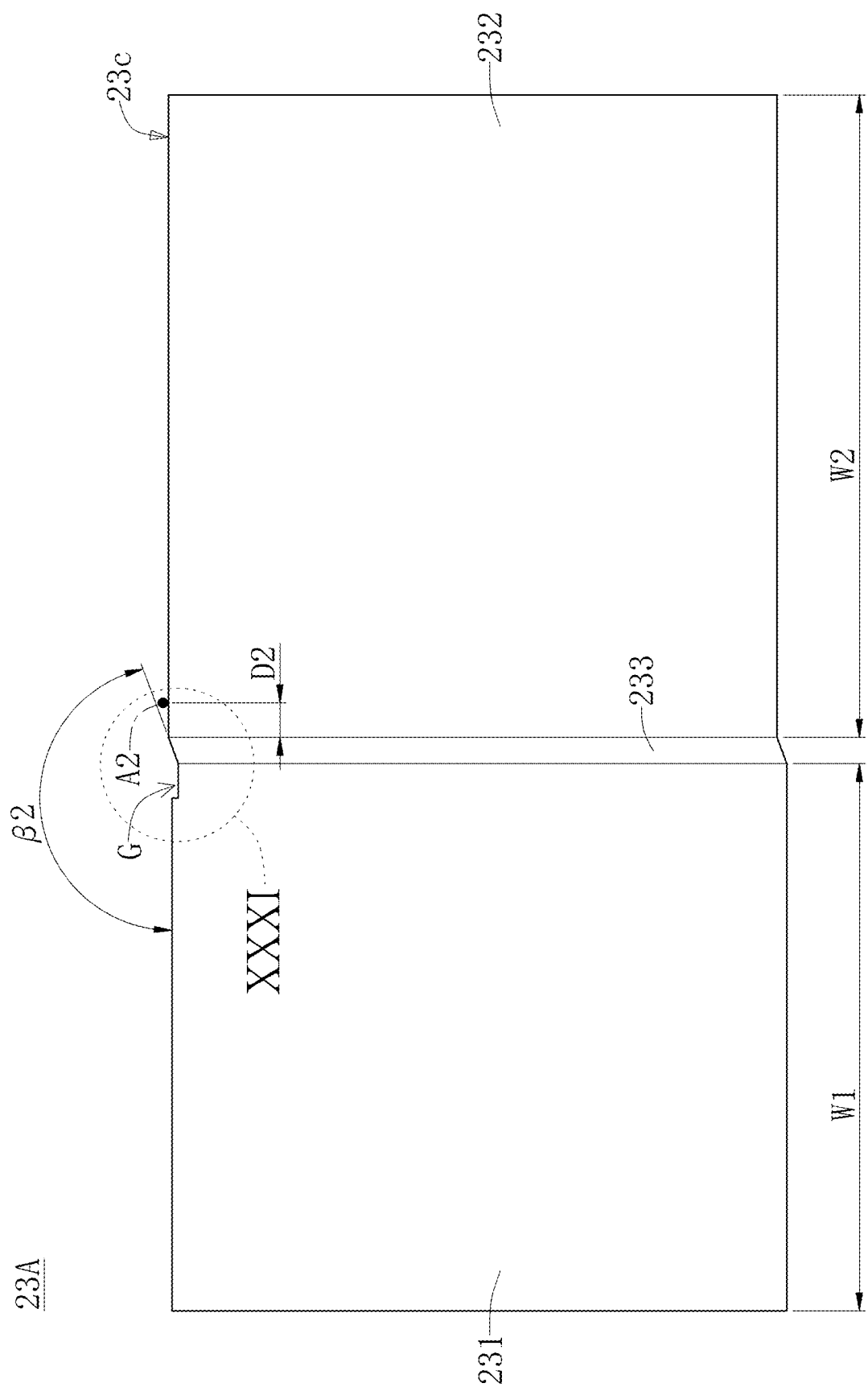
FIG. 30 is a front view of the second cut-off plate unit of the high-speed headlight module of the headlight device according to the first embodiment of the present disclosure.

Referring to FIG. 28, the second reflecting unit 21 can include a first focal point 21a and a second focal point 21b corresponding to the first focal point 21a of the second reflecting unit 21. In other words, the second reflecting unit 21 can include a reflecting surface with an elliptical curvature. The second lighting unit 22 is disposed corresponding to the first focal point 21a of the second reflecting unit 21. The second lens unit 24 can include a first lens focal point 24a, and the first lens focal point 24a of the second lens unit 24 corresponds to the second focal point 21b of the second reflecting unit 21 and is located on the second optical axis A2. For instance, the second lighting unit 22 can be disposed on the first focal point 21a of the second reflecting unit 21, and the second lens focal point 24a and the second focal point 21b of the second reflecting unit 21 can, but not being limited to, overlap to each other. For instance, the present disclosure uses the diameter of the second lens unit 24 as 26 mm as an exemplary description, but is not limited thereto.

Referring to FIG. 28, which is to be read in conjunction with FIG. 29 to FIG. 32, the second cut-off plate unit 23A is a cut-off plate for generating a cut-off line to produce a light pattern that complies with regulations. The second cut-off plate unit 23A can include a first cut-off plate body 231, a second cut-off plate body 232, a cut-off plate turning part 233 connected between the first cut-off plate body 231 and the second cut-off plate body 232, a second front cut-off edge 23a, a second rear cut-off edge 23b, and a second top side surface 23c. In addition, the second front cut-off edge 23a is formed on the first cut-off plate body 231, the second cut-off plate body 232, and the cut-off plate turning part 233, and the second rear cut-off edge 23b can be formed on the first cut-off plate body 231, the second cut-off plate body 232 and the cut-off plate turning part 233. Further, the second front cut-off edge 23a and the second rear cut-off edge 23b are disposed corresponding to each other, and the second top side surface 23c is connected between the second front cut-off edge 23a and the second rear cut-off edge 23b. Furthermore, the second focal point 21b of the second reflecting unit 21 can preferably be located on the second front cut-off edge 23a, but is not limited thereto.

More specifically, the second top side surface 23c on the cut-off plate turning part 233 is an inclined plane and the second top side surface 23c on the cut-off plate turning part 233 is tilted toward the direction from the second cut-off plate body 232 to the first cut-off plate body 231, and a second predetermined included angle β2 between 140 degrees and 160 degrees is defined between the second top side surface 23c on the cut-off plate turning part 233 and the second top side surface 23c on the second cut-off plate body 232, and the second predetermined included angle β2 is 150 degrees as an exemplary description. In addition, a first predetermined distance D1 between 0.02 mm and 0.3 mm is provided between the first top side surface 23c on the first cut-off plate body 231 and the first top side surface 23c on the second cut-off plate body 232. Preferably, the first predetermined distance D1 can be between 0.05 mm and 0.2 mm, and the present disclosure uses the first predetermined distance D1 as 0.1 mm as an exemplary description. Further, a second predetermined distance D2 is provided between the second optical axis A2 and an edge of the cut-off plate turning part 233 that is adjacent to the second optical axis A2, the size of the second predetermined distance D2 is between 2.2 times and 4.6 times the size of the first predetermined distance D1. For instance, the second predetermined distance D2 can be between 0.22 mm and 0.46 mm. Preferably, the second predetermined distance D2 is 3.4 times the size of the first predetermined distance D1, that is, the second predetermined distance D2 is 3.4 mm as an exemplary description.

Referring to FIG. 4 and FIG. 19, the first cut-off plate body 231 of the second cut-off plate unit 23A and the cut-off plate turning part 233 of the second cut-off plate unit 23A are located at a first side of the second optical axis A2, and the second cut-off plate body 232 of the second cut-off plate unit 23A is located at a second side of the second optical axis A2, and the first side and the second side are respectively located on two opposite sides of the second optical axis A2.

Further, in the effective shading range of the second cut-off plate unit 23A, a first predetermined width W1 of the first cut-off plate body 231 of the second cut-off plate unit 23A is smaller than a second predetermined width W2 of the second cut-off plate body 232 of the second cut-off plate unit 23A. It should be noted that, the effective shading range described above is the range that the second cut-off plate unit 23A can block light.

Figure 31:
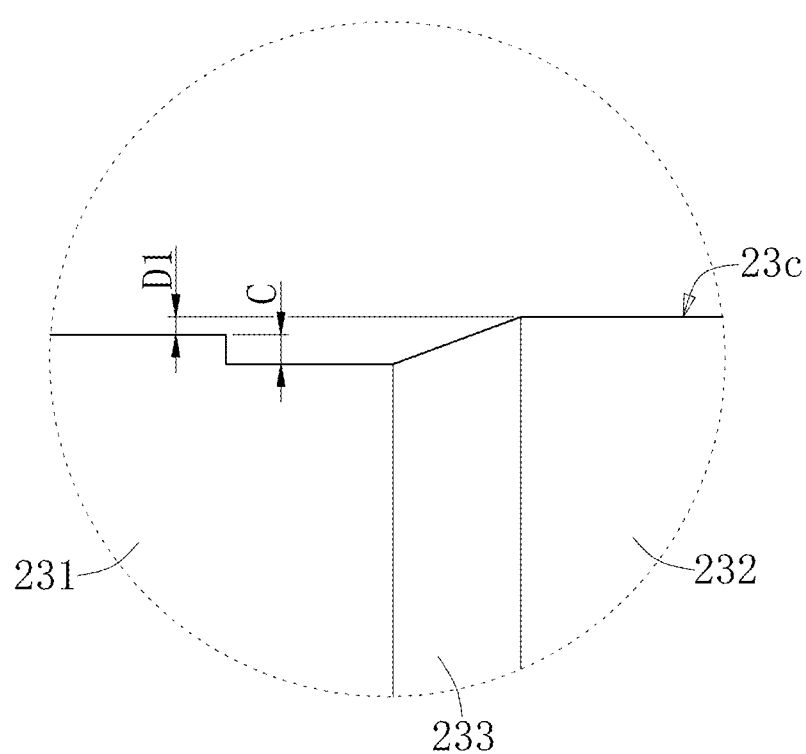
FIG. 31 is a partial view of the XXXI part in FIG. 30.
Figure 32:
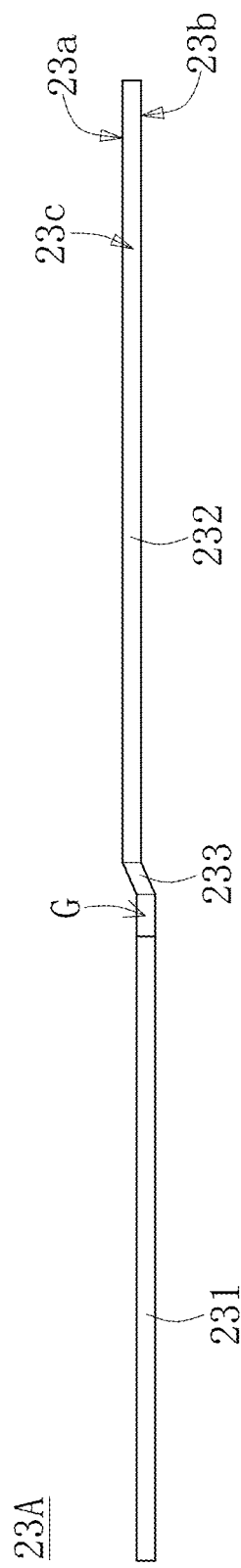
FIG. 32 is a top view of the second cut-off plate unit of the high-speed headlight module of the headlight device according to the first embodiment of the present disclosure.
Figure 33:
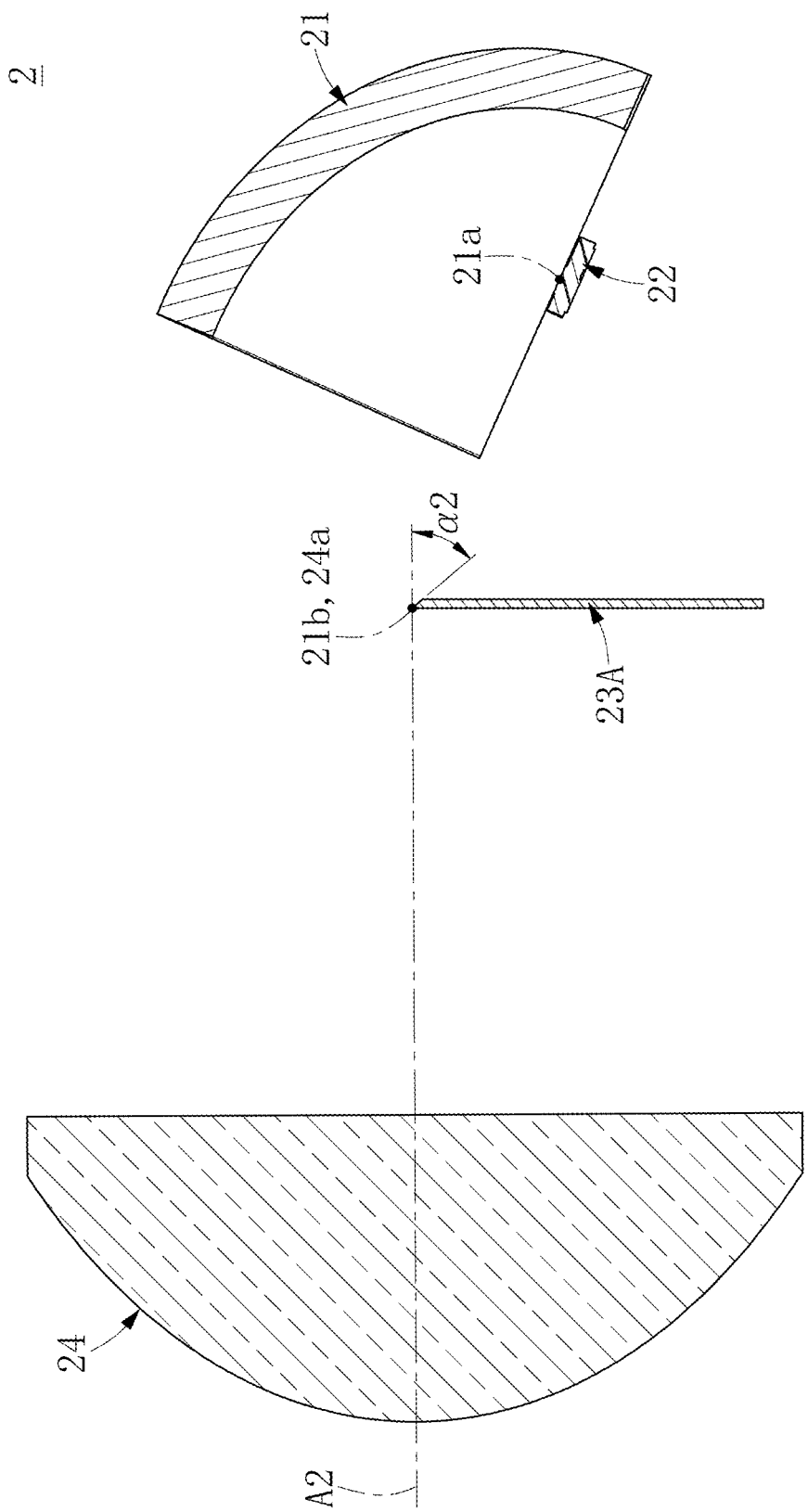
FIG. 33 is a sectional view in another way of the high-speed headlight module of the headlight device according to the first embodiment of the present disclosure.

Referring to FIG. 31, the inclined plane on the cut-off plate turning part 233 of the second cut-off plate unit 23A extends from the cut-off plate turning part 233 of the second cut-off plate unit 23A to the second cut-off plate body 232 of the second cut-off plate unit 23A, so as to form a groove structure G opposite to the first cut-off plate body 231 of the second cut-off plate unit 23A and second cut-off plate body 232 of the second cut-off plate unit 23A.

In other words, a predetermined spaced C between 0.05 mm and 0.25 mm between the bottom end of the inclined plane on the first cut-off plate body 231 of the second cut-off plate unit 23A and the second top side surface 23c on the first cut-off plate body 231 of the second cut-off plate unit 23A is provided. In the present disclosure, the predetermined spaced C of 0.15 mm is taken as an exemplary description, that is, preferably, the second top side surface 23c on the first cut-off plate body 231 of the second cut-off plate unit 23A can correspond to and protrude from the second top side surface 23c on the bottom end of the inclined plane.

Referring to FIG. 28, in order to prevent the second rear cut-off edge 23b of the second cut-off plate unit 23A from blocking the light transmitted to the second focal point 21b of the second reflecting unit 21, a second predetermined inclined angle α2 between 20 degrees and 70 degrees between the second top side surface 23c and the second optical axis A2 is provided, and the present disclosure uses the second predetermined inclined angle α2 as 45 degrees as an exemplary description. That is, in the embodiment of FIG. 28, the second cut-off plate unit 23A can be inclined. However, it should be noted that, as shown in FIG. 22, in the embodiment of FIG. 22, the second cut-off plate unit 23A can also be placed upright, and providing a second predetermined inclined angle α2 between 20 degrees and 70 degrees between the second top side surface 23c and the second optical axis A2.

Figure 36:
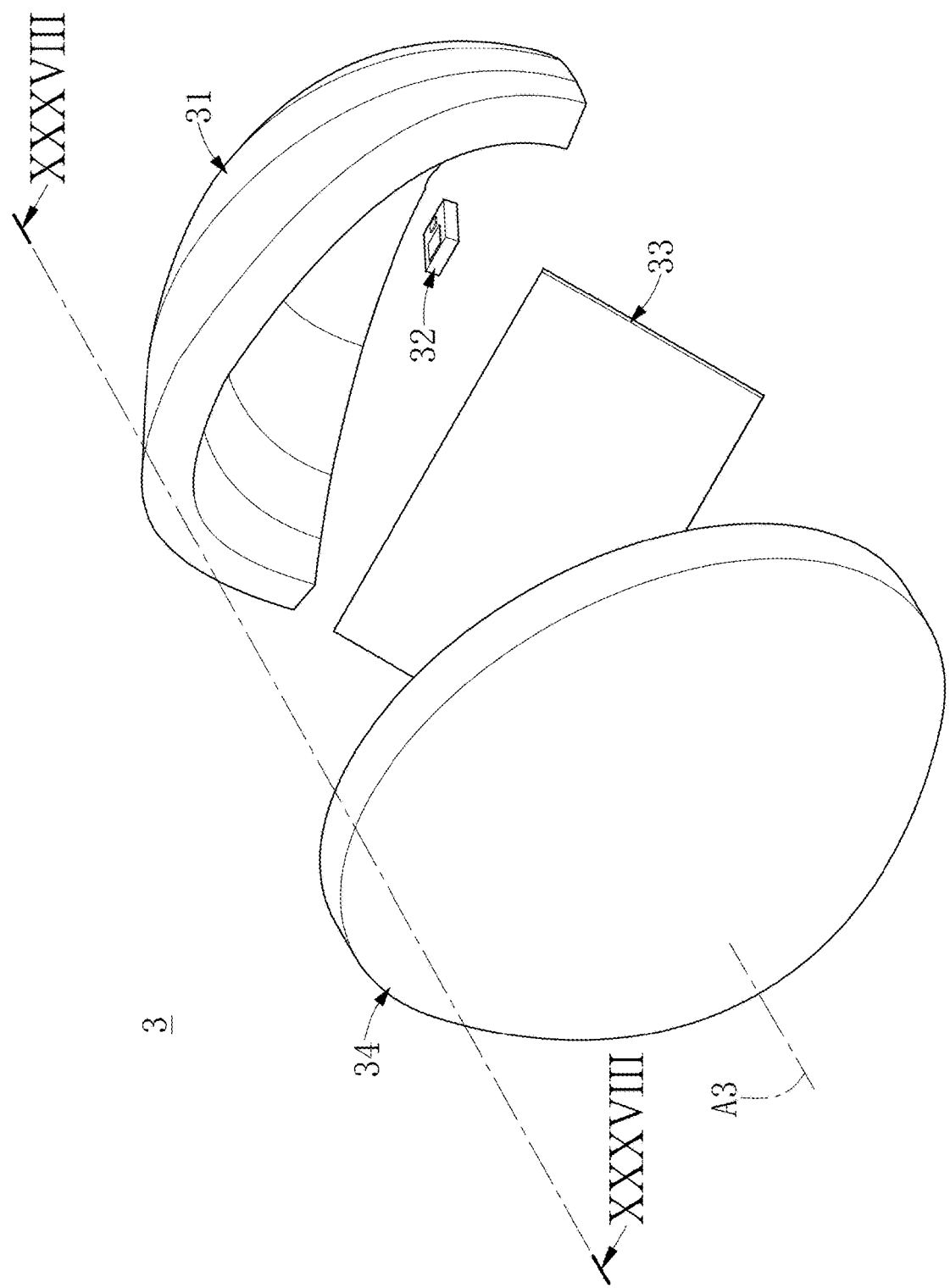
FIG. 36 is a perspective view of a turning headlight module of the headlight device according to the first embodiment of the present disclosure.
Figure 37:
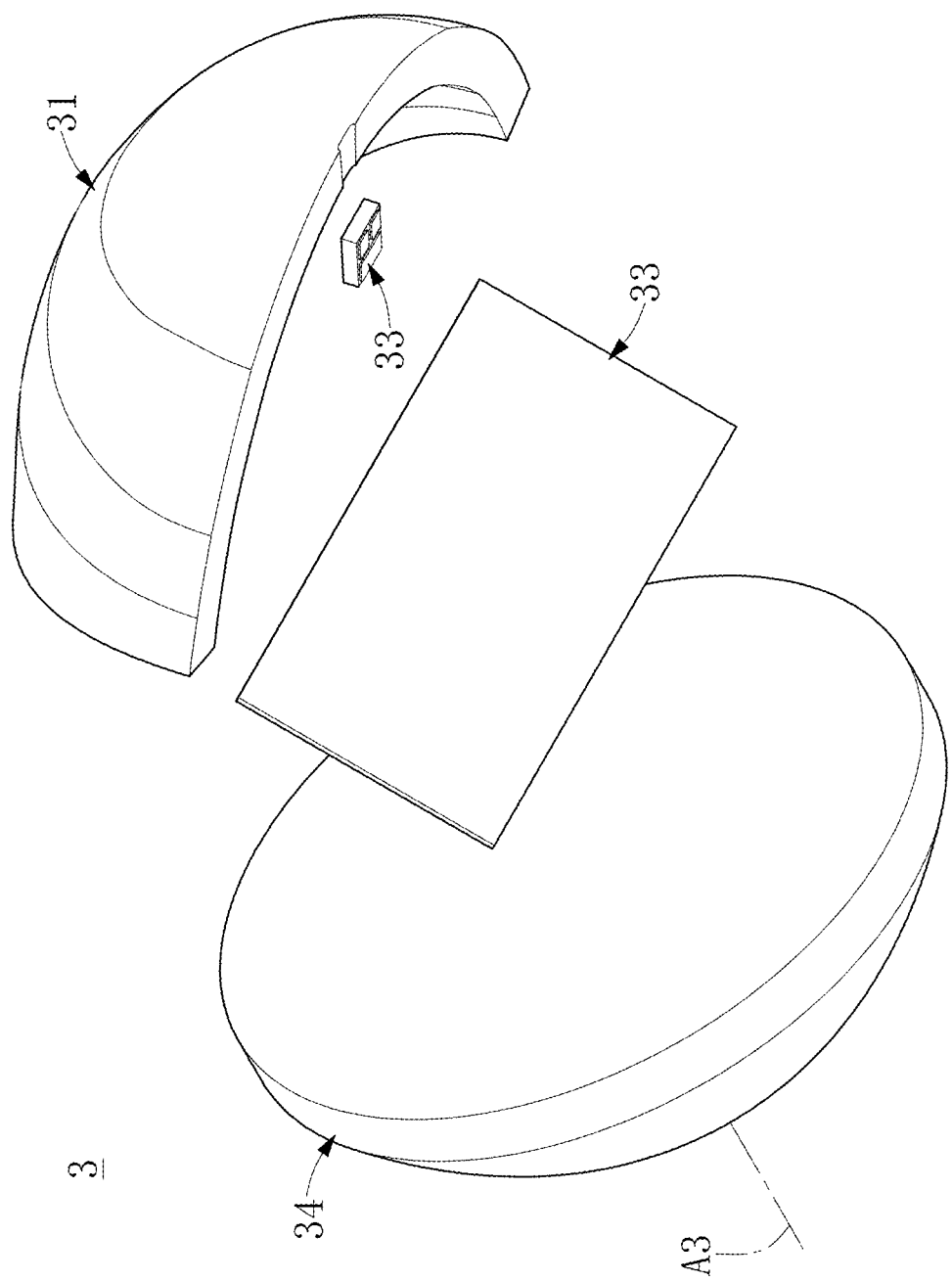
FIG. 37 is another perspective view of the turning headlight module of the headlight device according to the first embodiment of the present disclosure.
Figure 38:
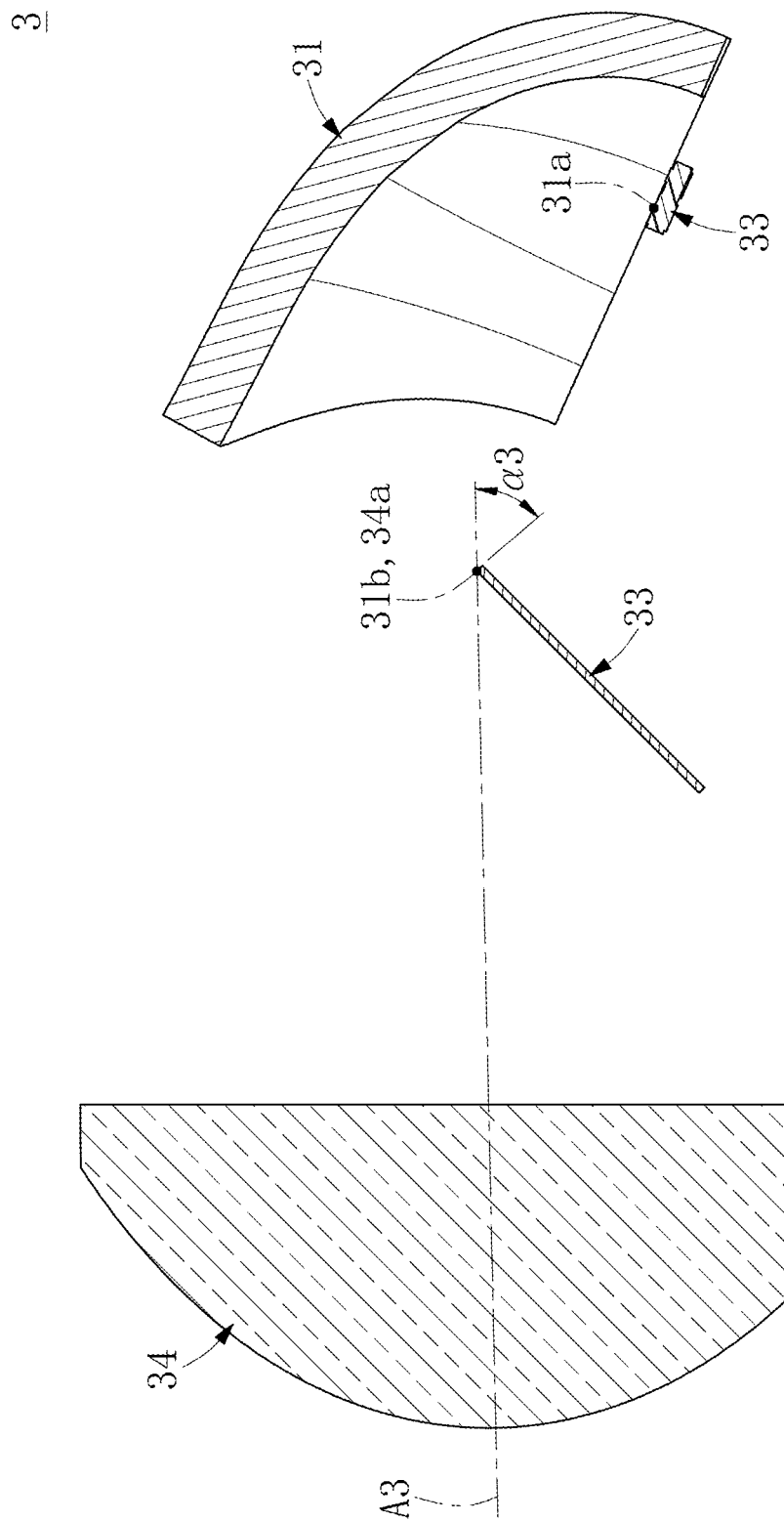
FIG. 38 is a sectional view of the XXXVIII-XXXVIII section in FIG. 36.

Referring to FIG. 1 to FIG. 5, which are to be read in conjunction with FIG. 36 to FIG. 38, the following will first describe the structure when the headlight device U is the left headlight on a left-hand drive car and the structure of the turning headlight module 3 of the left headlight on the left-hand drive car.

Specifically speaking, the turning headlight module 3 can be disposed adjacent to the main headlight module 4, and turning headlight module 3 can include a third reflecting unit 31, a third lighting unit 32, a third cut-off plate unit 33A, and a third lens unit 34. The third lighting unit 32 can be disposed corresponding to the third reflecting unit 31, the third cut-off plate unit 33A can be disposed corresponding to the third reflecting unit 31, and the third lens unit 34 can be disposed corresponding to the third reflecting unit 31. In addition, the turning headlight module 3 can include a third optical axis A3, and the third optical axis A3 can be the optical axis of the third lens unit 34. A fourth predetermined angle θ4 between 30 degrees and 70 degrees is defined between the normal projection of the third optical axis A3 on the horizontal plane SH and the normal projection of the main optical axis A4 on the horizontal plane SH, or is defined between the normal projection of the third optical axis A3 on the horizontal plane SH and the normal projection of the vertical plane SV on the horizontal plane SH.

Preferably, the fourth predetermined angle θ4 can be between 40 degrees and 60 degrees, and in the present disclosure, the fourth predetermined angle θ4 between the normal projection of the third optical axis A3 on the horizontal plane SH and the normal projection of the vertical plane SV on the horizontal plane SH is 50 degrees as an exemplary description. It should be noted that, in order to better explain the figure, the fourth predetermined angle θ4 between the normal projection of the third optical axis A3 on the horizontal plane SH and the normal projection of the main optical axis A4 on the horizontal plane SH or between the normal projection of the third optical axis A3 on the horizontal plane SH and normal projection of the vertical plane SV on the horizontal plane SH is marked with a line segment parallel to the main optical axis A4 or the vertical plane SV. For instance, the third reflecting unit 31 can be a reflecting surface having an elliptic curvature, and the third lighting unit 32 can, but is not limited thereto, be a light emitting diode (LED) or a light emitting diode package structure (LED package structure).

Figure 42:
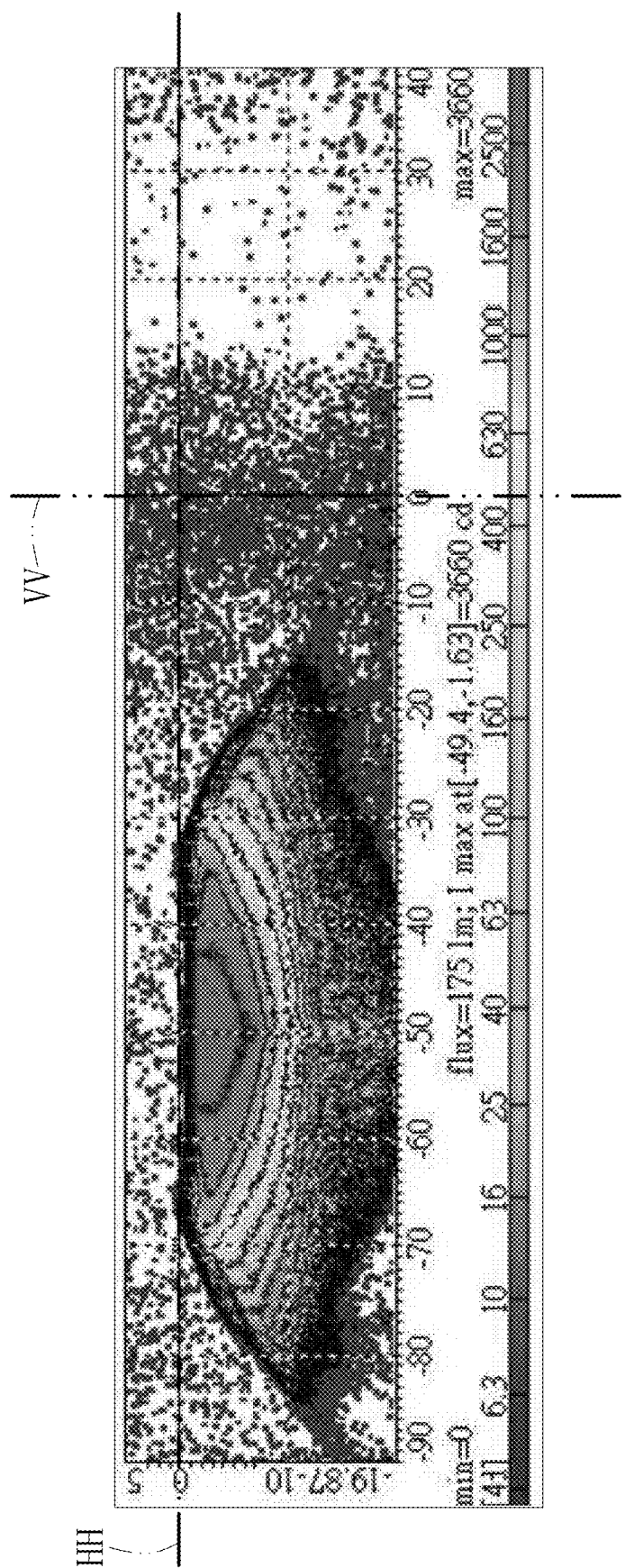
FIG. 42 is a light pattern diagram generated by the turning headlight module of the headlight device according to the first embodiment of the present disclosure.
Figure 43:
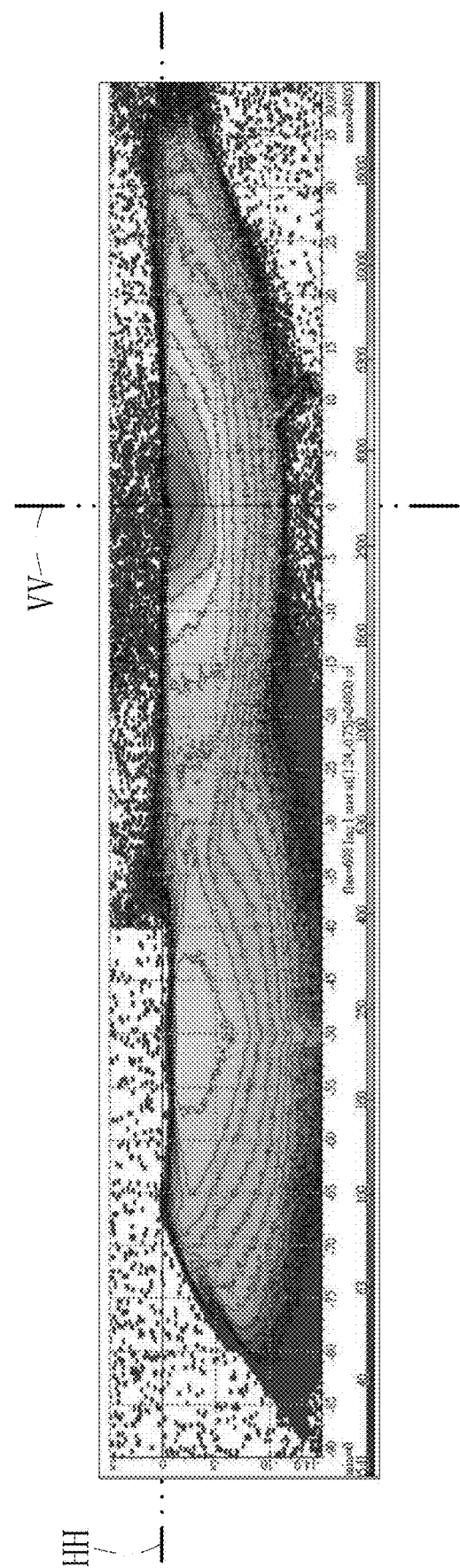
FIG. 43 is a light pattern diagram generated by the main headlight module and the turning headlight module of the headlight device according to the first embodiment of the present disclosure.
Figure 44:
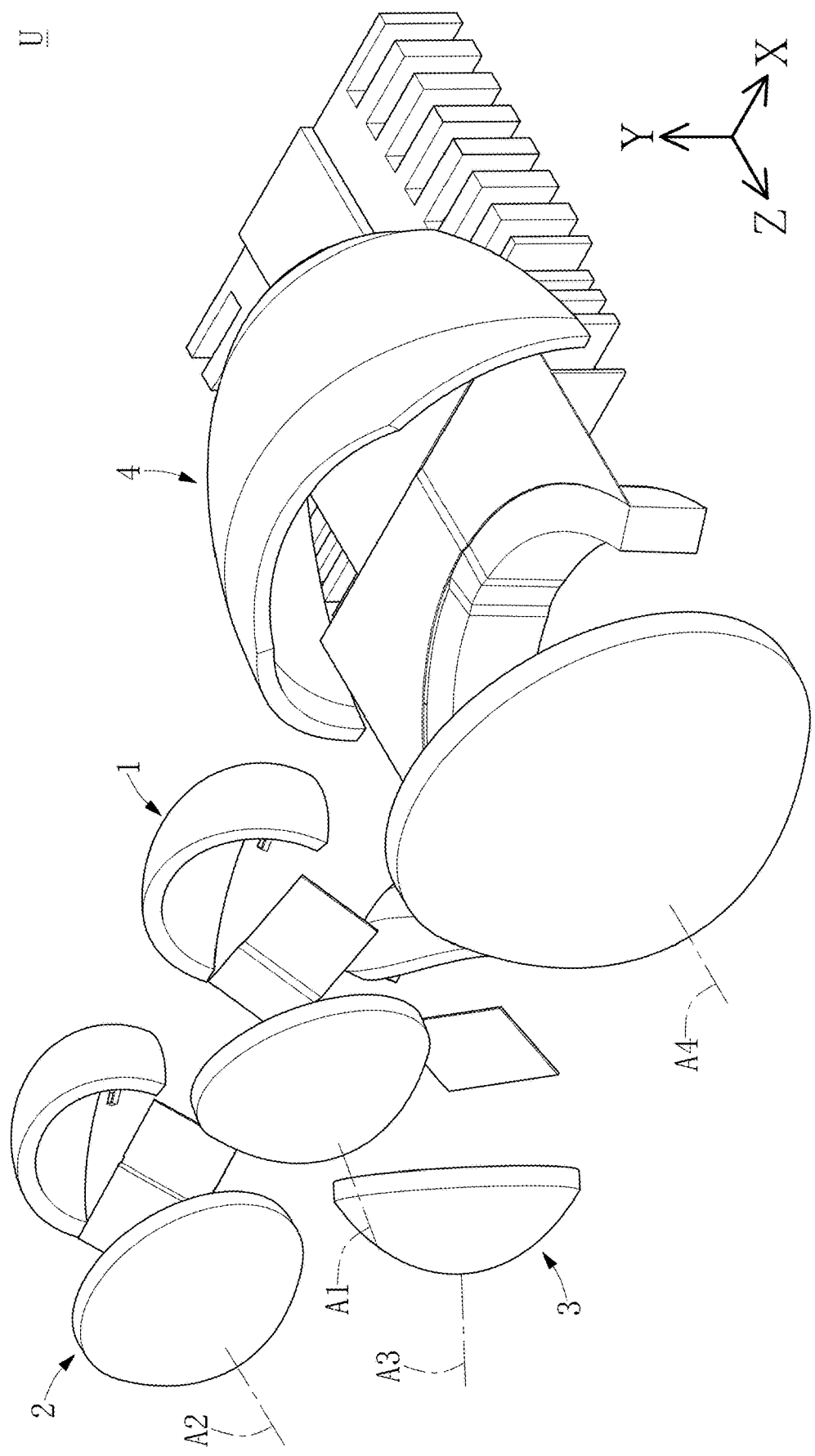
FIG. 44 is a perspective view of a headlight device according to a second embodiment of the present disclosure.
Figure 45:
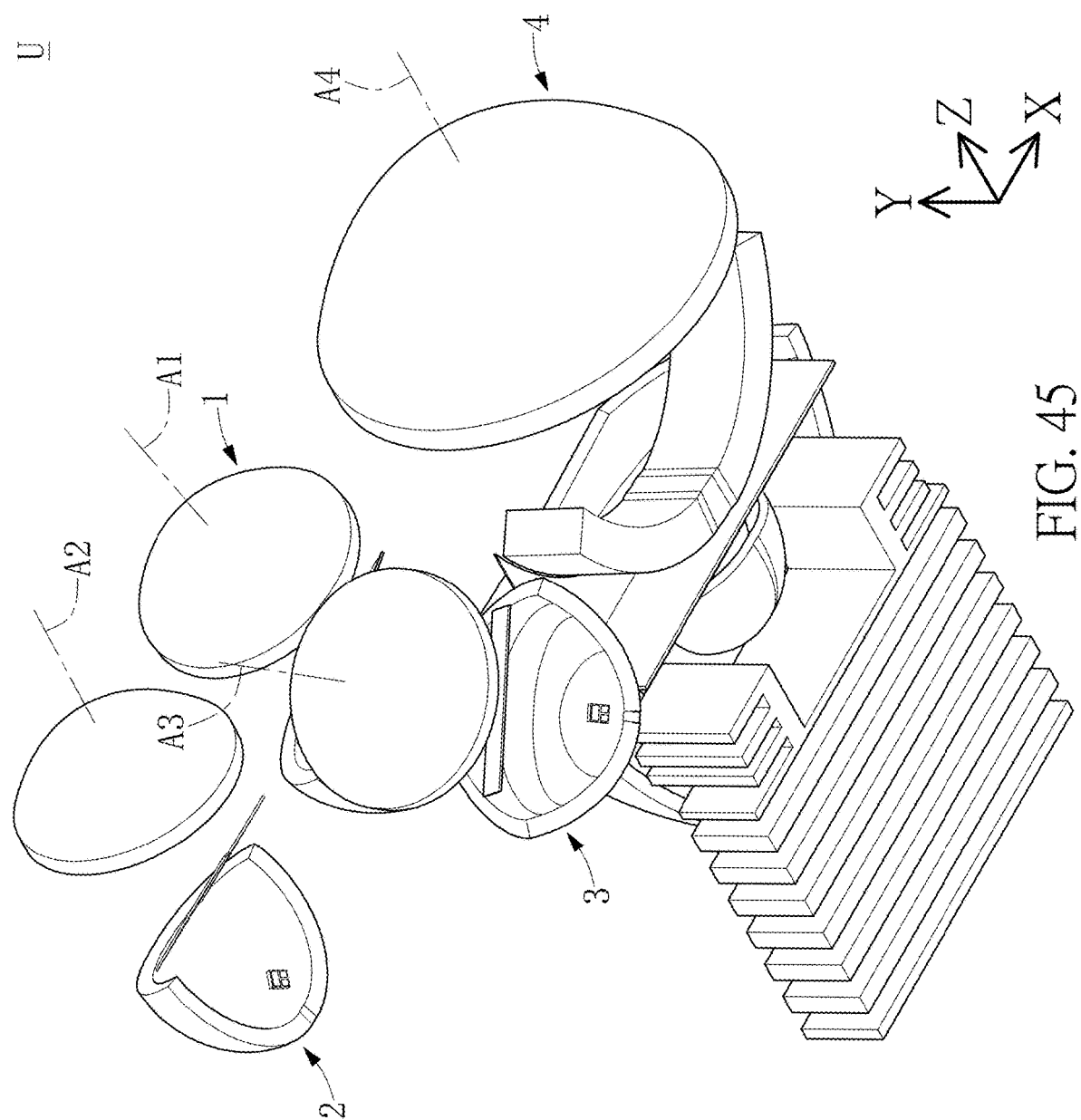
FIG. 45 is another of perspective view of the headlight device according to the second embodiment of the present disclosure.
Figure 46:
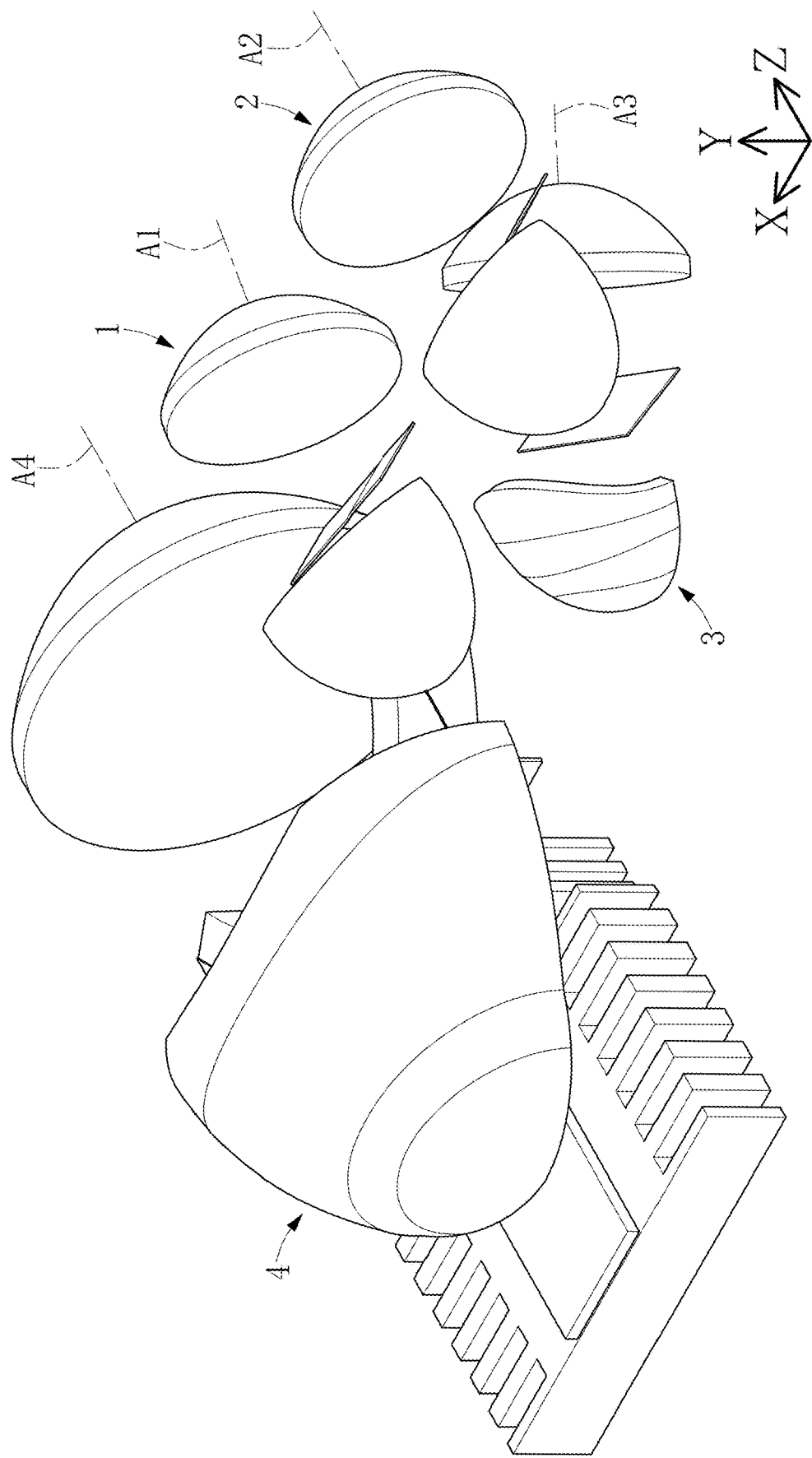
FIG. 46 is yet another of perspective view of the headlight device according to the second embodiment of the present disclosure.

As shown in FIG. 4, according to the first embodiment of the present disclosure, the turning headlight module 3 in the left headlight of the left-hand drive car can be turned left relative to the main headlight module 4, so that the fourth predetermined angle θ4 between the third optical axis A3 of the turning headlight module 3 and the main optical axis A4 is provided, thereby generating a light pattern as shown in FIG. 42. Further, when the main headlight module 4 and the turning headlight module 3 are lit at the same time, the light patterns shown in FIG. 43 can be generated. In other words, it can be observed by comparing FIG. 43 and FIG. 14 that when the main headlight module 4 and the turning headlight module 3 are lit at the same time, the lighting range in the left can be increased. It is worth mentioning that, the normal projection of the third optical axis A3 of the turning headlight module 3 on the vertical plane SV and the normal projection of the main optical axis A4 on the vertical plane SV are parallel to each other. Therefore, in this embodiment, the turning headlight module 3 is only turned to the left relative to the main headlight module 4, so that the lighting direction of the turning headlight module 3 is at the front left of the left-hand drive car, and the extension direction of the third optical axis A3 is toward the front left side, that is, the extension direction of the third optical axis A3 is extended toward the front left corresponds to the main optical axis A4.

Referring to FIG. 38, the third reflecting unit 31 can include a first focal point 31a and a second focal point 21b corresponding to the first focal point 31a of the third reflecting unit 31. In other words, the third reflecting unit 31 can include a reflecting surface with an elliptical curvature. In addition, the third lighting unit 32 can correspond to the first focal point 31a of the third reflecting unit 31, and the third lens unit 34 can include a third lens focal point 34a. The third lens focal point 34a of the third lens unit 34 corresponds to the second focal point 31b of the third reflecting unit 31 and is located on the third optical axis A3. For instance, the third lighting unit 32 can be disposed on the first focal point 31a of the third reflecting unit 31, and the third lens focal point 34a and the second focal point 31b of the third reflecting unit 31 can, but not being limited to, overlap with each other. For instance, the present disclosure uses the diameter of the third lens unit 34 as 26 mm as an exemplary description, but is not limited thereto.

Figure 39:
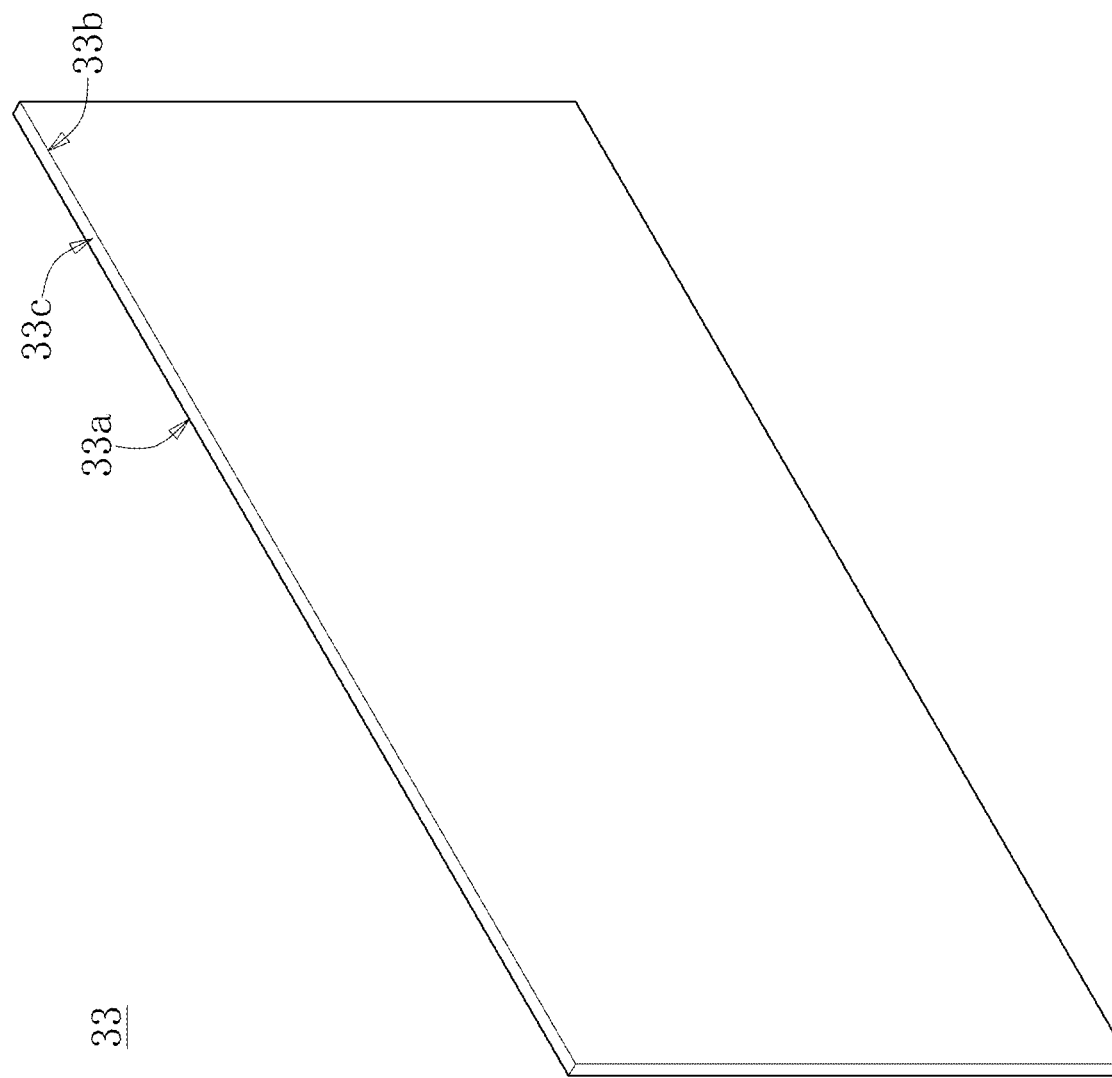
FIG. 39 is a perspective view of a third cut-off plate unit of the turning headlight module of the headlight device according to the first embodiment of the present disclosure.
Figure 40:
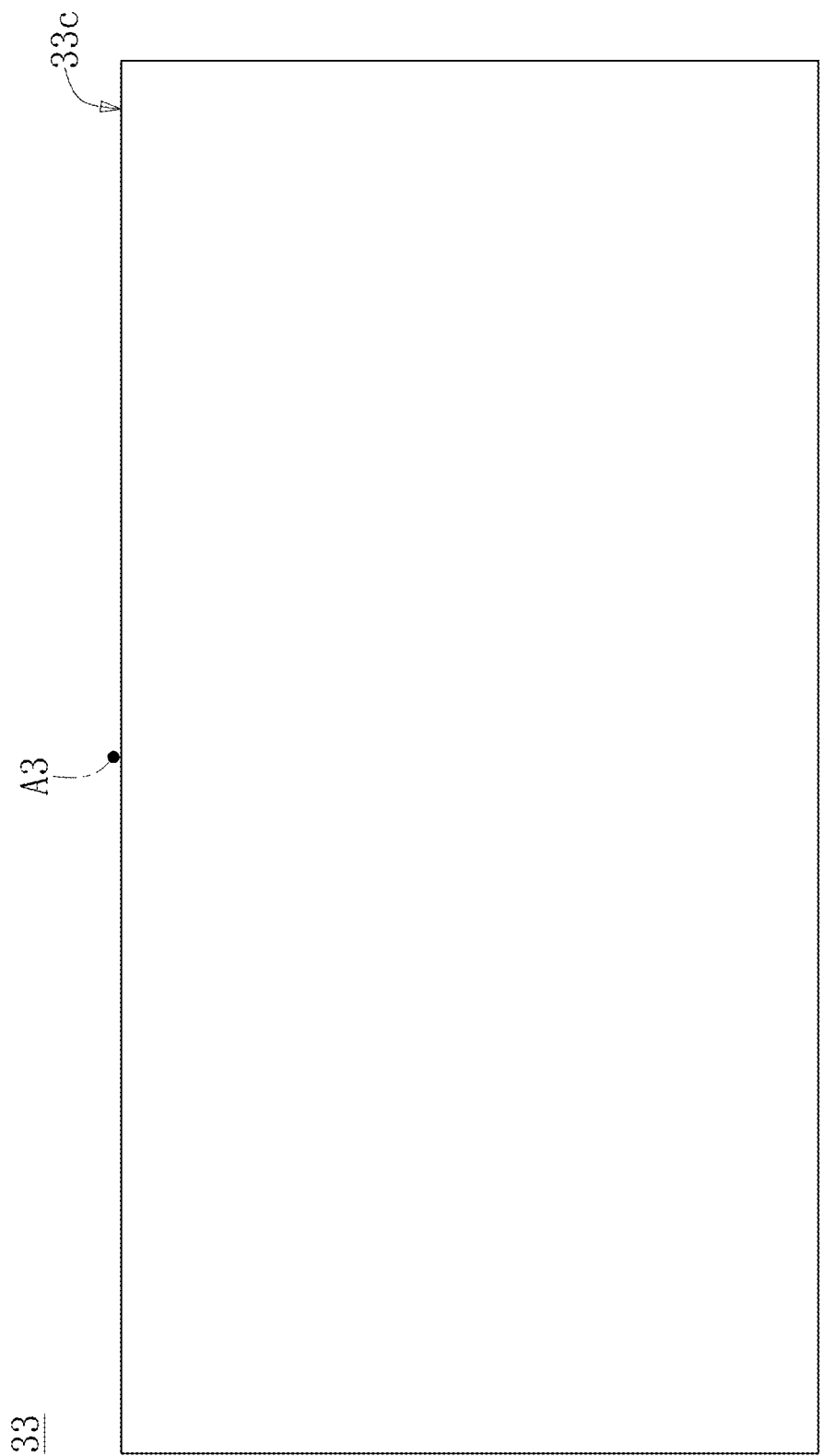
FIG. 40 is a front view of the third cut-off plate unit of the turning headlight module of the headlight device according to the first embodiment of the present disclosure.

Referring to FIG. 38, which is to be read in conjunction with FIG. 39 to FIG. 40, the third cut-off plate unit 33A is a cut-off plate for generating a cut-off line to produce a light pattern that complies with regulations. The third cut-off plate unit 33A can include a third front cut-off edge 33a, a third rear cut-off edge 33b, and a third top side surface 33c. Further, the third front cut-off edge 33a and the third rear cut-off edge 33b are disposed corresponding to each other, and the third top side surface 33c is connected between the third front cut-off edge 33a and the third rear cut-off edge 33b. Furthermore, the second focal point 31b of the third reflecting unit 31 can preferably be located on the third front cut-off edge 33a, but is not limited thereto.

Figure 41:
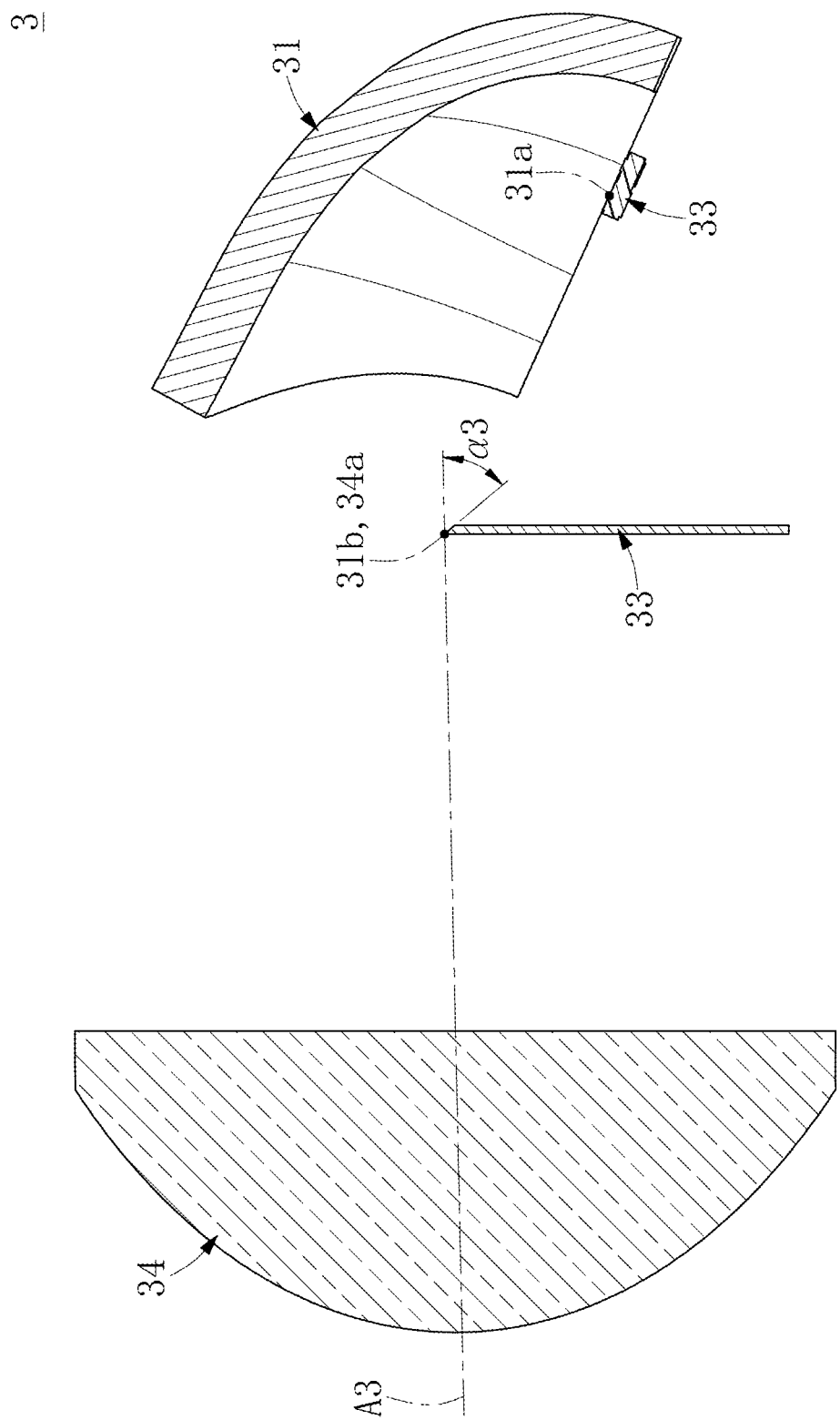
FIG. 41 is a sectional view in another way of the turning headlight module of the headlight device according to the first embodiment of the present disclosure.

Referring to FIG. 38, in order to prevent the third rear cut-off edge 33b of the third cut-off plate unit 33A from blocking the light transmitted to the second focal point 31b of the third reflecting unit 31, a third predetermined inclined angle α3 between 20 degrees and 70 degrees between the third top side surface 33c and the third optical axis A3 is provided, and the present disclosure uses the third predetermined inclined angle α3 as 45 degrees as an exemplary description. That is, in the embodiment of FIG. 38, the third cut-off plate unit 33A can be inclined. However, it should be noted that, as shown in FIG. 41, in the embodiment of FIG. 41, the third cut-off plate unit 33A can also be placed upright, and providing a predetermined inclined angle α3 between 20 degrees and 70 degrees between the third top side surface 33c and the third optical axis A3. It is worth mentioning that, the third front cut-off edge 33a of the turning headlight module 3 is a flush edge.

It should be noted that, although the bending headlight module 1, high-speed headlight module 2, and turning headlight module 3 of the present disclosure describe various elements with terms such as "first", "second", and "third", the above terms are only used to distinguish different headlight modules.

Second Embodiment

Referring to FIG. 44 to FIG. 48, a second embodiment of the present disclosure provides a headlight device U and a bending headlight module 1 thereof. In the following, the main structure of the headlight device U will be described first, and the detailed structure of each headlight module of the headlight device U will be described. For instance, the headlight device U can include a main headlight module 4, a bending headlight module 1, a high-speed headlight module 2 and/or a turning headlight module 3, so as to select the relative headlight module according to the requirements of the lighting mode. The main headlight module 4 is capable of generating a first lighting area which is a light pattern that complies with the regulations of low beam headlamps. In other embodiments, the main headlight module 4 is also capable of generating a second lighting area which is a light pattern that complies with the regulations of low beam headlamps. In other words, main headlight module 4 is the headlight of the car.

It is worth mentioning that, the difference between the second embodiment and the first embodiment of the present disclosure is that a headlight device U provided by the second embodiment of the present disclosure is preferably applicable to the right headlight on a left-hand drive car, but is not limited to thereto. It should be noted that, the structure of the headlight device U shown in FIG. 44 to FIG. 48 are exemplary illustrations of the right headlight applied to the left-hand drive car. The following will firstly illustrate the structure of the bending headlight module 1, the high-speed headlight module 2, and the turning headlight module 3 when applied to the right headlight of left-hand drive car.

The bending headlight module 1, high-speed headlight module 2, and/or turning headlight module 3 can be disposed adjacent to the main headlight module 4. It should be noted that, the "disposed adjacent to the main headlight module 4" described here represents that the bending headlight module 1, the high-speed headlight module 2, and/or the turning headlight module 3 are only required to be set adjacent to the main headlight module 4, and is not limited to be placed on the upper side, the lower side, or the left and right sides of the main headlight module 4. It should be noted that, the main headlight module 4 provided by the first embodiment of the present disclosure can also be applied to the right headlight of the left-hand drive car in the second embodiment, therefore, the structure of the main headlight module 4 will not be reiterated herein. In other words, in the second embodiment, the main headlight module 4 can be any kind of light structure that can produce a light type that complies with the regulations of low beam headlamps. In addition, the main headlight module 4 includes a main optical axis A4, and the main headlight module 4 defines a horizontal plane SH and a vertical plane SV perpendicular to the horizontal plane SH, and the main optical axis A4 is parallel to the horizontal plane SH and the vertical plane SV. Further, for instance, the main optical axis A4 can be a line segment at the intersection of the horizontal plane SH and the vertical plane SV, but is not limited thereto. Furthermore, it should be noted that, the horizontal plane SH and the vertical plane SV of the present disclosure are respectively virtual planes, which are mainly used to explain the configuration relationship of other vehicle headlight modules relative to the main headlight module 4.

Referring to FIG. 44 to FIG. 48, which are to be read in conjunction with FIG. 49 to FIG. 54, the following will first describe the structure when the structure of the bending headlight module 1 of the right headlight on the left-hand drive car. Specifically speaking, the bending headlight module 1 can be disposed adjacent to the main headlight module 4, and the bending headlight module 1 can include a first reflecting unit 11, a first lighting unit 12, a first cut-off plate unit 13B, and a first lens unit 14. Further, it can be observed by comparing FIGS. 49 to 54 and FIGS. 15 to 21 that, the difference between the bending headlight module 1 provided in the second embodiment and the bending headlight module 1 provided in the first embodiment is that the form of the first cut-off plate unit 13B of the bending headlight module 1 provided in the second embodiment, and the arrangement position of the bending headlight module 1 related to the main headlight module 4 is different from that of the first embodiment. Therefore, other structures of the bending headlight module 1 are similar to those of the first embodiment, and will not be reiterated herein.

The first lighting unit 12 can be disposed corresponding to the first reflecting unit 11, the first cut-off plate unit 13A can be disposed corresponding to the first reflecting unit 11, and the first lens unit 14 can be disposed corresponding to the first reflecting unit 11. The bending headlight module 1 can include a first optical axis A1, and a first predetermined angle θ1 between 7 degrees and 15 degrees is defined between the normal projection of the first optical axis A1 on the horizontal plane SH and the normal projection of the main optical axis A4 on the horizontal plane SH, or is defined between the normal projection of the first optical axis A1 on the horizontal plane SH and the normal projection of the vertical plane SV on the horizontal plane SH. Preferably, the first predetermined angle θ1 can be between 8 degrees and 14 degrees, and more preferably, the first predetermined angle θ1 can be between 9 degrees and 13 degrees. In the present disclosure, the first predetermined angle θ1 between the normal projection of the first optical axis A1 on the horizontal plane SH and the normal projection of the vertical plane SV on the horizontal plane SH is 11.3 degrees as an exemplary description.

Figure 55:
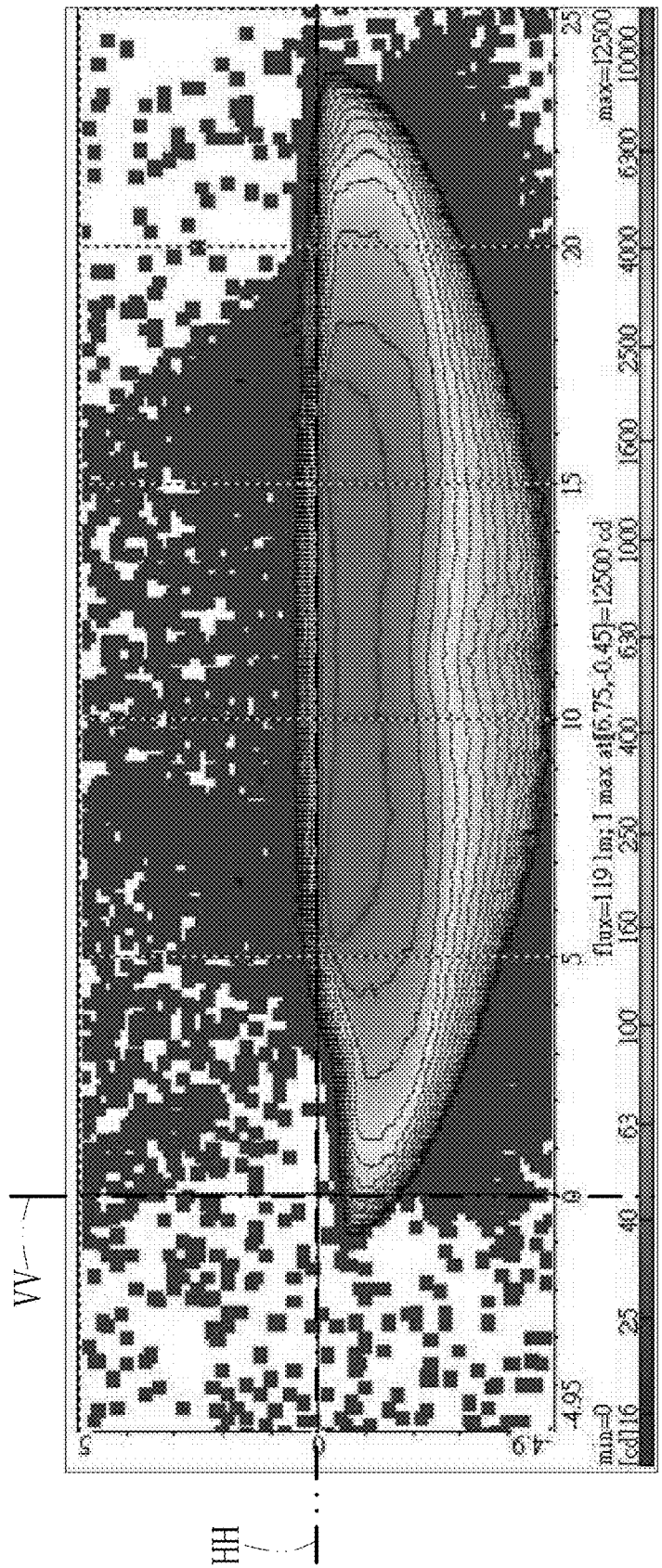
FIG. 55 is a light pattern diagram generated by the bending headlight module of the headlight device according to the second embodiment of the present disclosure.
Figure 56:
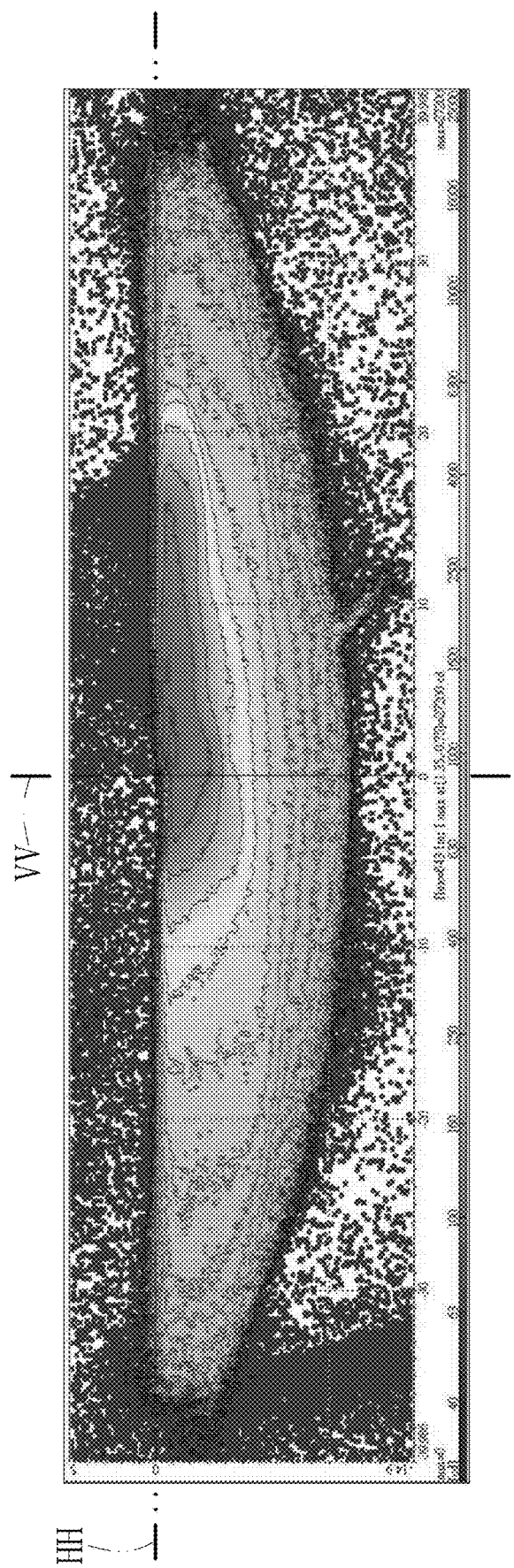
FIG. 56 is a light pattern diagram generated by the main headlight module and the bending headlight module of the headlight device according to the second embodiment of the present disclosure.
Figure 57:
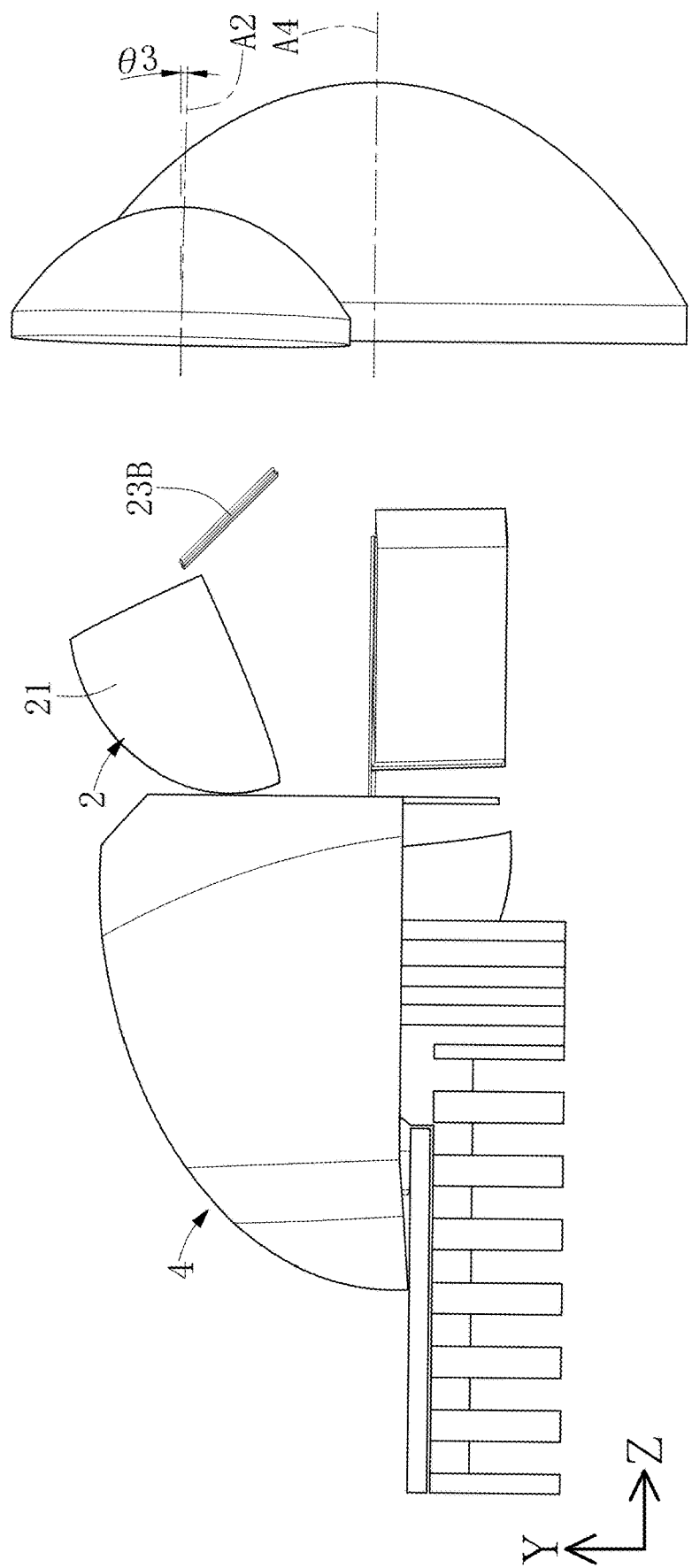
FIG. 57 is a side view of the main headlight module and a high-speed headlight module of the headlight device according to the second embodiment of the present disclosure.

It should be noted that, according to the second embodiment of the present disclosure, the bending headlight module 1 in the right headlight of the left-hand drive car can be turned right relative to the main headlight module 4, so that the first predetermined angle θ1 between the first optical axis A1 of the bending headlight module 1 and the main optical axis A4 or between the first optical axis A1 of the bending headlight module 1 and the vertical plane SV is provided, thereby generating a light pattern as shown in FIG. 55. Further, when the main headlight module 4 and the bending headlight module 1 are lit at the same time, the light patterns shown in FIG. 56 can be generated. In other words, it can be observed by comparing FIG. 56 and FIG. 14 that, when the main headlight module 4 and the bending headlight module 1 are lit at the same time, the lighting range in the front right can be increased.

It is worth mentioning that, the normal projection of the first optical axis A1 of the bending headlight module 1 on the vertical plane SV and the normal projection of the main optical axis A4 on the vertical plane SV are parallel to each other. Therefore, in this embodiment, the bending headlight module 1 is turned to the right only relative to the main headlight module 4, so that the lighting direction of the bending headlight module 1 is toward the front right side of the left-hand drive car, and the extension direction of the first optical axis A1 is toward the front right side, that is, the extension direction of the first optical axis A1 is extended toward the front right corresponding to the main optical axis A4.

Referring to FIG. 51 to FIG. 54, the first cut-off plate unit 13B can include a first cut-off plate body 131, a second cut-off plate body 132, a cut-off plate turning part 133 connected between the first cut-off plate body 131 and the second cut-off plate body 132, a first front cut-off edge 13a, a first rear cut-off edge 13b, and a first top side surface 13c. In addition, the first front cut-off edge 13a can be formed on the first cut-off plate body 131, the second cut-off plate body 132, and the cut-off plate turning part 133, and the first rear cut-off edge 13b can be formed on the first cut-off plate body 131, the second cut-off plate body 132, and the cut-off plate turning part 133. Further, the first front cut-off edge 13a and the first rear cut-off edge 13b are disposed corresponding to each other, and the first top side surface 13c is connected between the first front cut-off edge 13a and the first rear cut-off edge 13b. Furthermore, the second focal point 11b of the first reflecting unit 11 can preferably be located on the first front cut-off edge 13a, but is not limited thereto.

More specifically, the first top side surface 13c on the cut-off plate turning part 133 is an inclined plane and the first top side surface 13c on the cut-off plate turning part 133 is tilted toward the direction from the second cut-off plate body 132 to the first cut-off plate body 131, and a first predetermined included angle β1 between 120 degrees and 170 degrees is defined between the first top side surface 13c on the cut-off plate turning part 133 and the first top side surface 13c on the second cut-off plate body 132. In the present disclosure, the first predetermined included angle β1 is 165 degrees as an exemplary description. In addition, a first predetermined distance D1 between 0.1 mm and 0.5 mm is provided between the first top side surface 13c on the first cut-off plate body 131 and the first top side surface 13c on the second cut-off plate body 132. Preferably, the first predetermined distance D1 can be between 0.2 mm and 0.4 mm, and the present disclosure uses the first predetermined distance D1 as 0.275 mm as an exemplary description. Further, a second predetermined distance D2 is provided between the first optical axis A1 and an edge of the cut-off plate turning part 133 that is adjacent to the first optical axis A1, the size of the second predetermined distance D2 is between 3 times and 14 times the size of the first predetermined distance D1. For instance, the second predetermined distance D2 can be between 1 mm and 3.8 mm. Preferably, the second predetermined distance D2 can be between 1.4 mm and 3.4 mm. The present disclosure uses the second predetermined distance D2 as 2.4 mm as an exemplary description. It is worth mentioning that, preferably, the first predetermined distance D1 of the first cut-off plate unit 13B provided in the second embodiment is smaller than the first predetermined distance D1 of the first cut-off plate unit 13A provided in the first embodiment.

Figure 47:
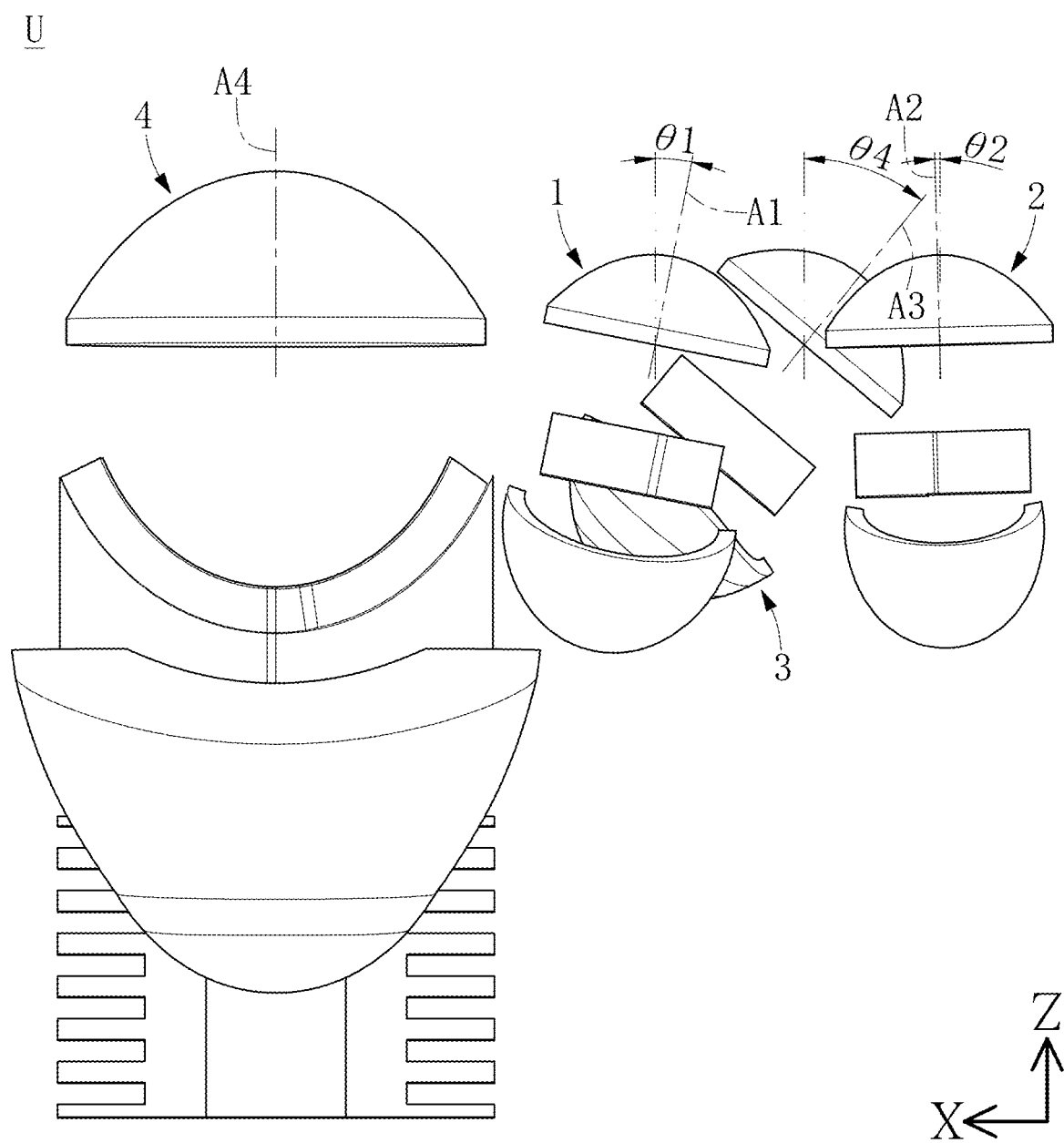
FIG. 47 is a top view of the headlight device according to the second embodiment of the present disclosure.
Figure 48:
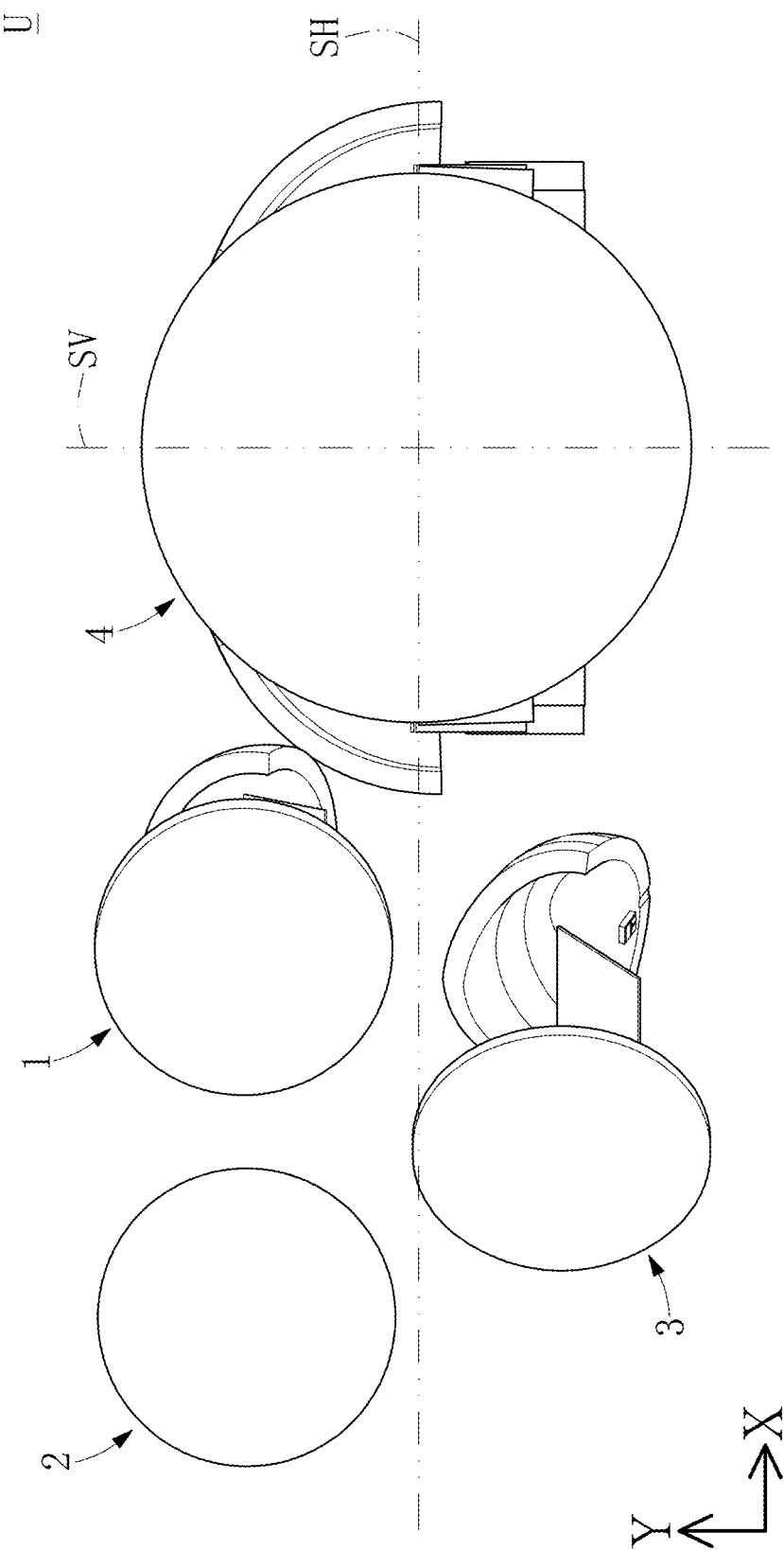
FIG. 48 is a front view of the headlight device according to the second embodiment of the present disclosure.
Figure 49:
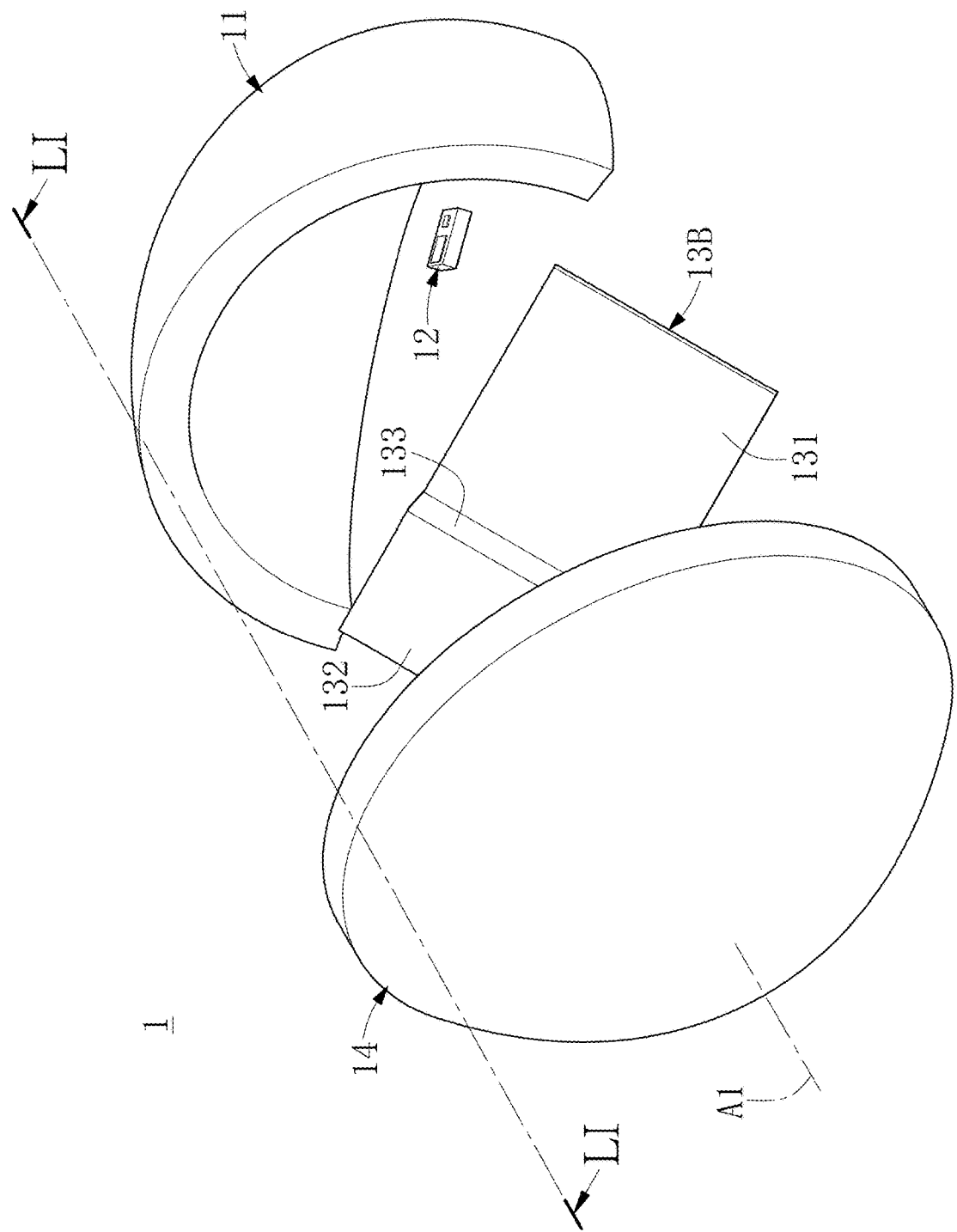
FIG. 49 is a perspective view of a bending headlight module of the headlight device according to the second embodiment of the present disclosure.
Figure 50:
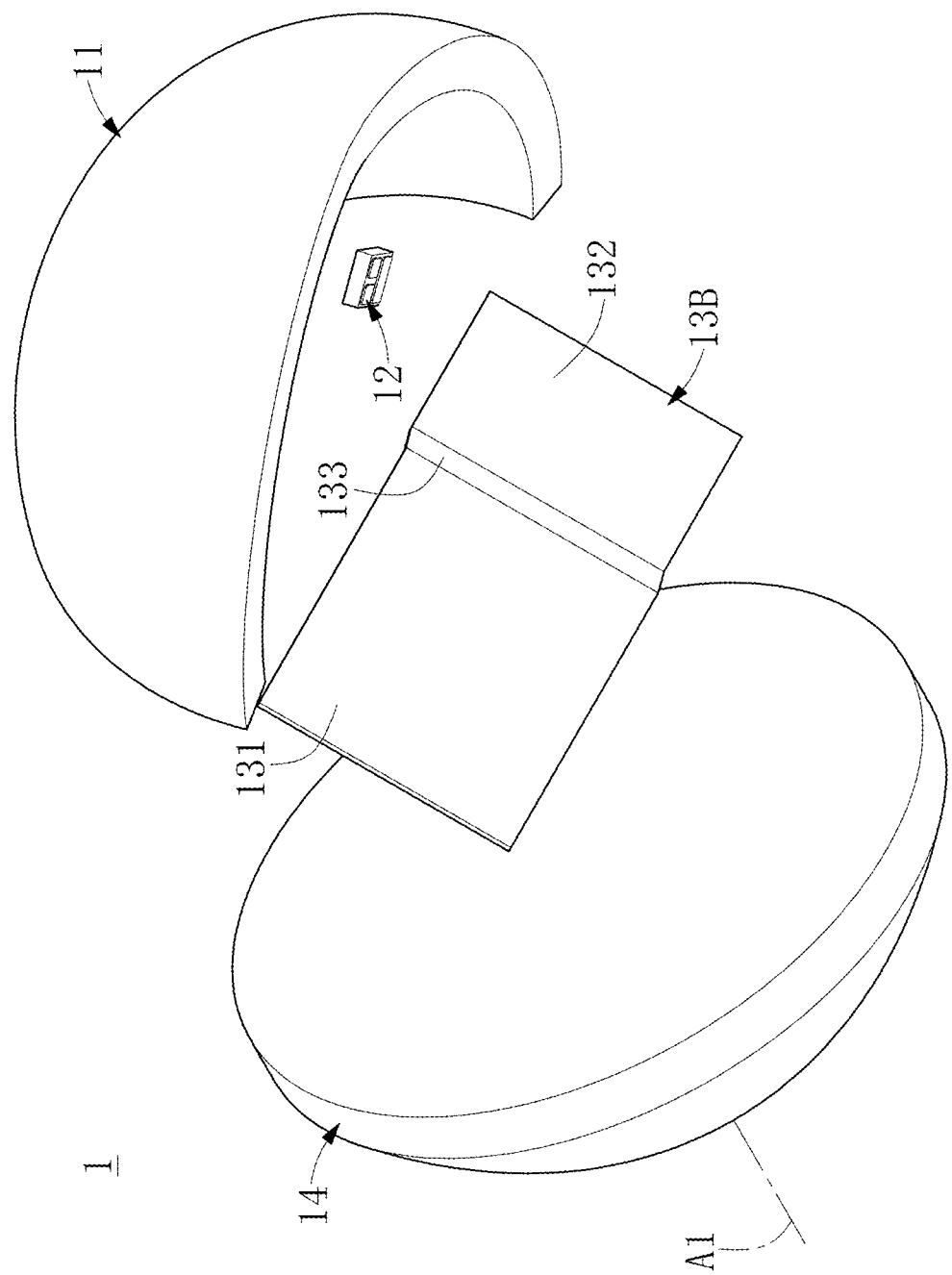
FIG. 50 is another perspective view of the bending headlight module of the headlight device according to the second embodiment of the present disclosure.
Figure 53:
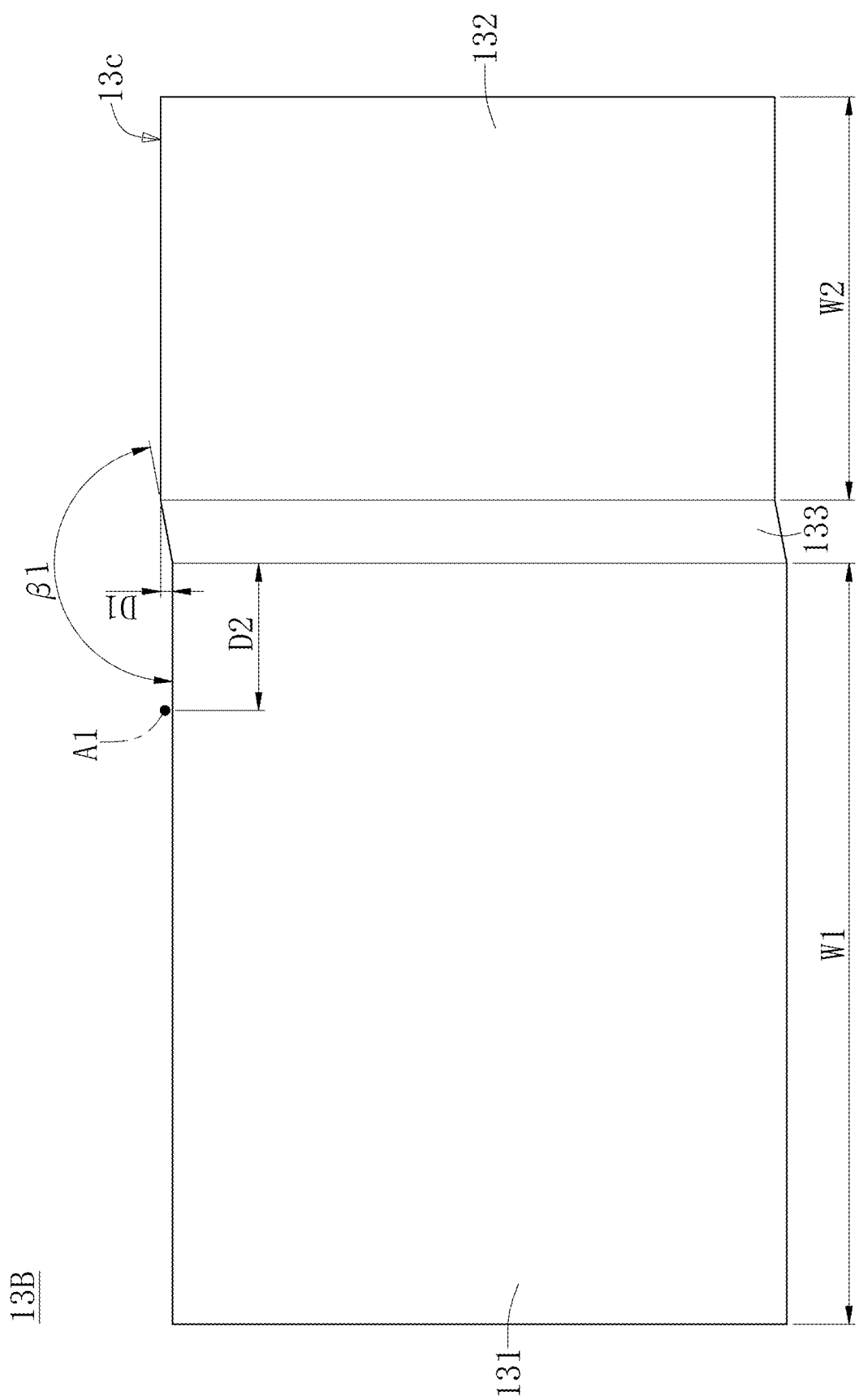
FIG. 53 is a front view of the first cut-off plate unit of the bending headlight module of the headlight device according to the second embodiment of the present disclosure.
Figure 54:
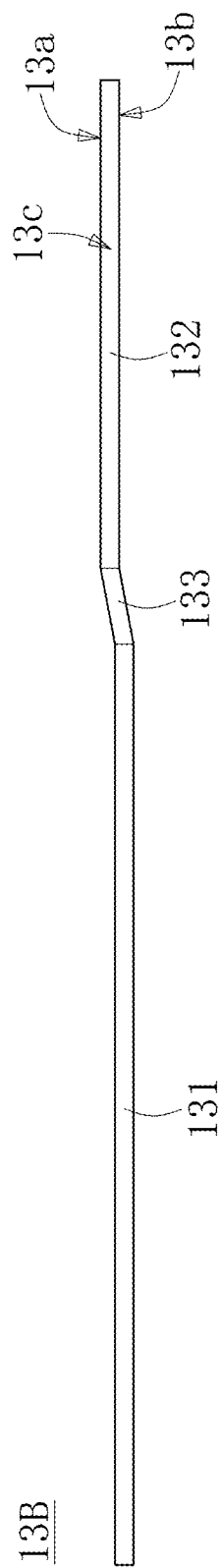
FIG. 54 is a top view of the first cut-off plate unit of the bending headlight module of the headlight device according to the second embodiment of the present disclosure.

Referring to FIG. 47 and FIG. 53, a part of the first cut-off plate body 131 of the first cut-off plate unit 13B on a first side of the first optical axis A1, the other part of the first cut-off plate body 131, the cut-off plate turning part 133, and the second cut-off plate body 132 of the first cut-off plate unit 13B are located on a second side of the first optical axis A1, and the first side and the second side are respectively on opposite sides of the first optical axis A1. For instance, as shown in FIG. 47 and FIG. 53, the first side of the first optical axis A1 can be the left side of the first optical axis A1, and the second side of the first optical axis A1 can be the right side of the first optical axis A1. Further, in the effective shading range of the first cut-off plate unit 13B, a first predetermined width W1 of the first cut-off plate body 131 can be larger than a second predetermined width W2 of the second cut-off plate body 132. It should be noted that, the effective shading range described above is the range that the first cut-off plate unit 13B can block light.

Figure 51:
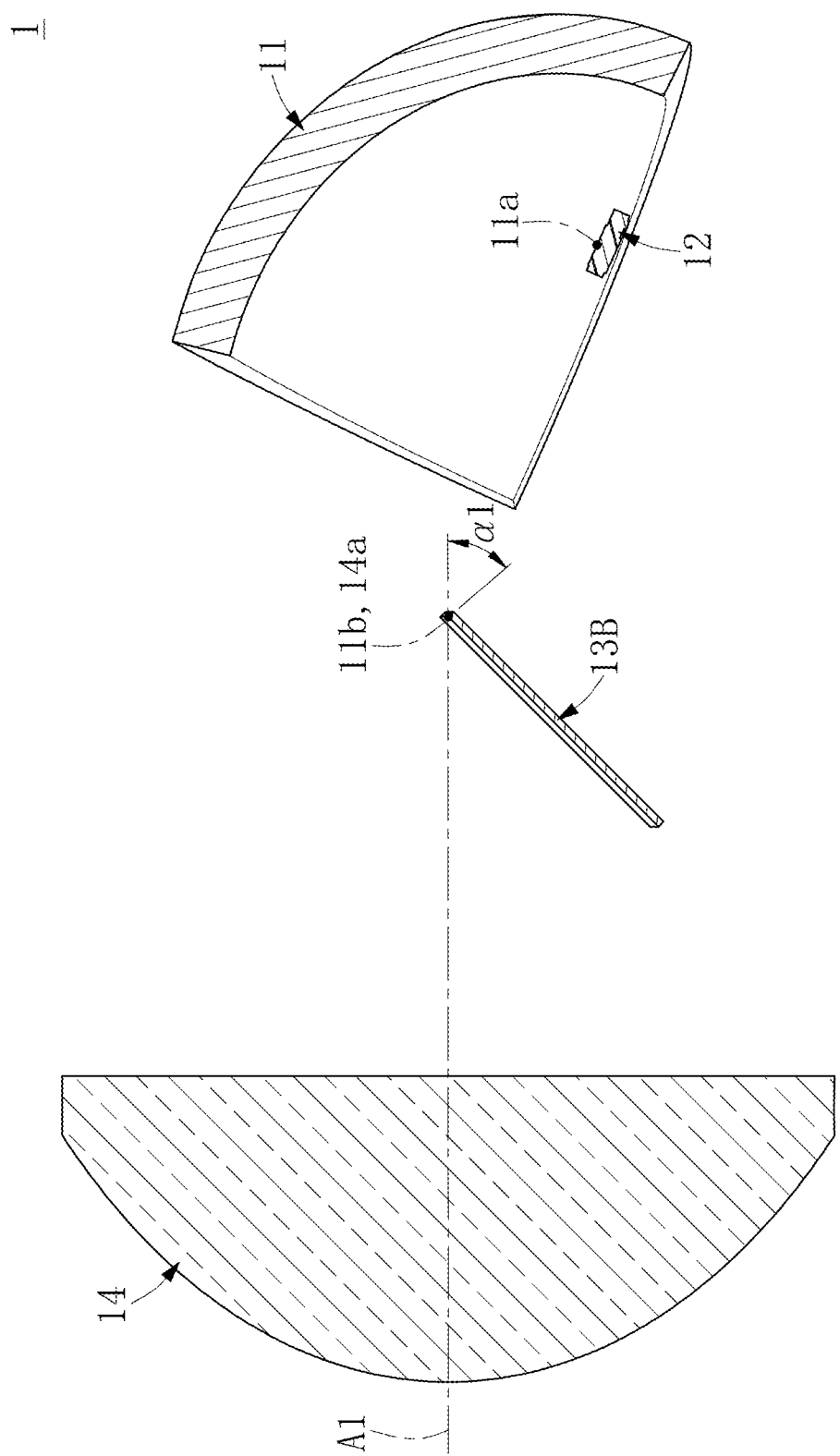
FIG. 51 is a sectional view of the LI-LI section in FIG. 49.
Figure 52:
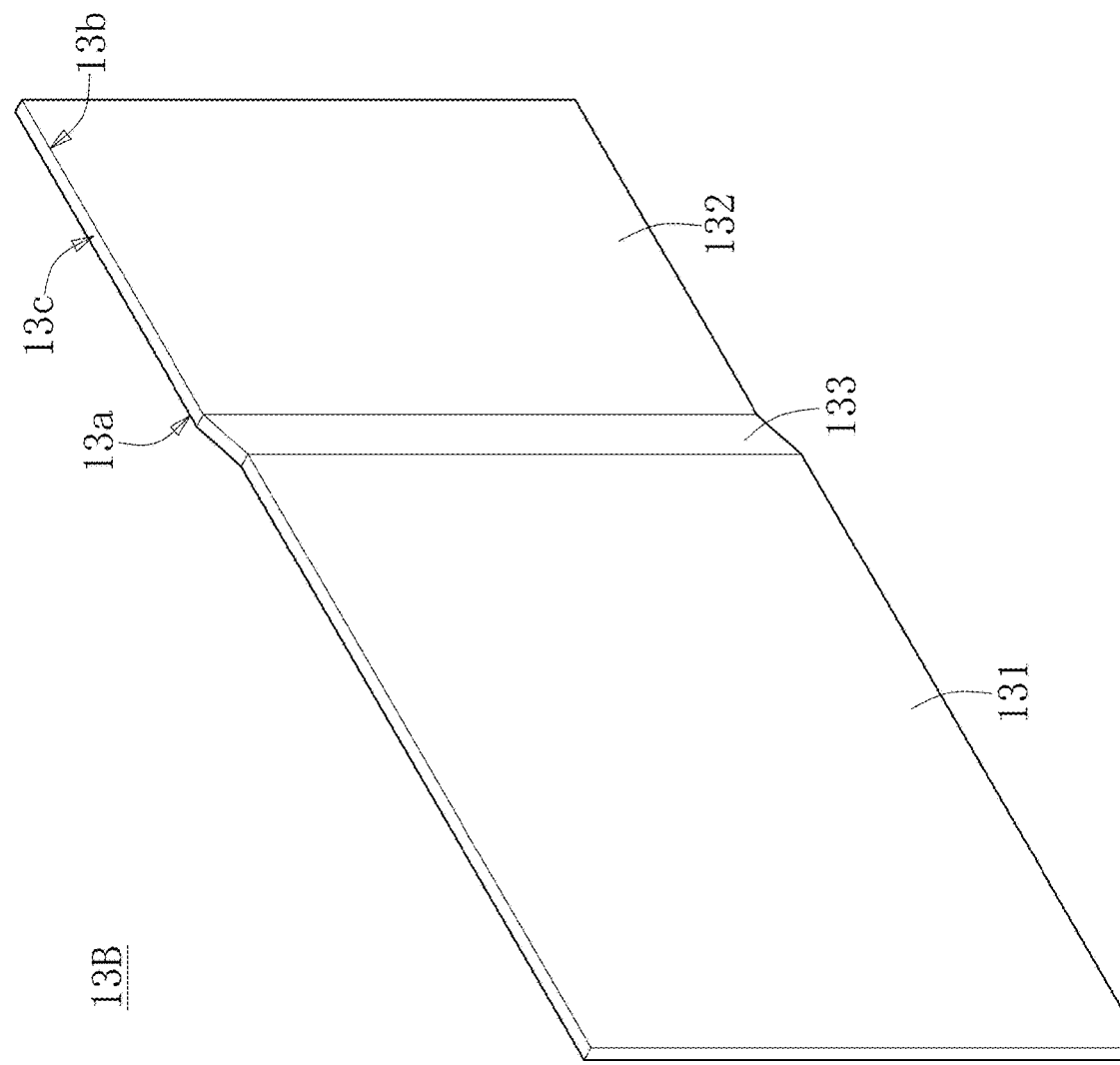
FIG. 52 is a perspective view of a first cut-off plate unit of the bending headlight module of the headlight device according to the second embodiment of the present disclosure.

Referring to FIG. 51, in order to prevent the first rear cut-off edge 13b of the first cut-off plate unit 13B from blocking the light transmitted to the second focal point 11b of the first reflecting unit 11, the first cut-off plate unit 13B can be inclined. However, it should be noted that, the first cut-off plate unit 13B can also be placed upright as described in the first embodiment, and providing a first predetermined inclined angle α1 between 20 degrees and 70 degrees between the first top side surface 13c and the first optical axis A1, and the present disclosure uses the first predetermined inclined angle α1 as 45 degrees as an exemplary description.

Referring to FIG. 44 to FIG. 48, which are to be read in conjunction with FIG. 57 to FIG. 63, the following will first describe the structure when the headlight device U is applied to the structure of the high-speed headlight module 2 of the right headlight on the left-hand drive car. Specifically speaking, the high-speed headlight module 2 can be disposed adjacent to the main headlight module 4, and high-speed headlight module 2 can include a second reflecting unit 21, a second lighting unit 22, a second cut-off plate unit 23A, and a second lens unit 24.

Further, it can be observed by comparing FIGS. 57 to 63 and FIGS. 25 to 32 that, the difference between the high-speed headlight module 2 provided in the second embodiment and the high-speed headlight module 2 provided in the first embodiment is that the form of the second cut-off plate unit 23B of the high-speed headlight module 2 provided in the second embodiment, is different from the second cut-off plate unit 23A of the high-speed headlight module 2 provided in the first embodiment. Therefore, other structures of the high-speed headlight module 2 are similar to those of the first embodiment, and will not be reiterated herein. For instance, the high-speed headlight module 2 of the headlight device U of the second embodiment can be mainly used to generate a light mode of a high-speed road lighting mode 3 (E3 mode), but is not limited thereto. For instance, when the high-speed road lighting mode 3 (E3 mode) is required, the high-speed headlight module 2 provided in the second embodiment can be turned on, when the high-speed road lighting mode 2 (E2 mode) is required, the high-speed headlight module 2 provided in the first embodiment can be turned on, and when a high-speed road lighting mode 1 (E1 mode) is required, the high-speed headlight module 2 provided in the first embodiment and the high-speed headlight module 2 provided in the second embodiment can be turned on at the same time, but the present disclosure is not limited thereto.

The second lighting unit 22 can be disposed corresponding to the second reflecting unit 21, the second cut-off plate unit 23B can be disposed corresponding to the second reflecting unit 21, and the second lens unit 24 can be disposed corresponding to the second reflecting unit 21. The high-speed headlight module 2 can include a second optical axis A2, and the second optical axis A2 can be the optical axis of the second lens unit 24. A second predetermined angle θ2 between 0.9 degrees and 2.1 degrees is defined between the normal projection of the second optical axis A2 on the horizontal plane SH and the normal projection of the main optical axis A4 on the horizontal plane SH, or is defined between the normal projection of the second optical axis A2 on the horizontal plane SH and the normal projection of the vertical plane SV on the horizontal plane SH. In addition, a third predetermined angle θ3 between 0.2 degrees and 0.57 degrees is defined between the normal projection of the second optical axis A2 on the vertical plane SV and the normal projection of the main optical axis A4 on the vertical plane SV, or is defined between the normal projection of the second optical axis A2 on the vertical plane SV and the normal projection of the horizontal plane SH on the vertical plane SV. Preferably, the second predetermined angle θ2 can be between 1.2 degrees and 1.8 degrees, and the third predetermined angle θ3 can be between 0.3 degrees and 0.5 degrees. In the present disclosure, the second predetermined angle θ2 between the normal projection of the second optical axis A2 on the horizontal plane SH and the normal projection of the vertical plane SV on the horizontal plane SH is 1.5 degrees, and the third predetermined angle θ3 between the normal projection of the second optical axis A2 on the vertical plane SV and the normal projection of the horizontal plane SH on the vertical plane SV is 0.3 degrees as an exemplary description.

Figure 64:
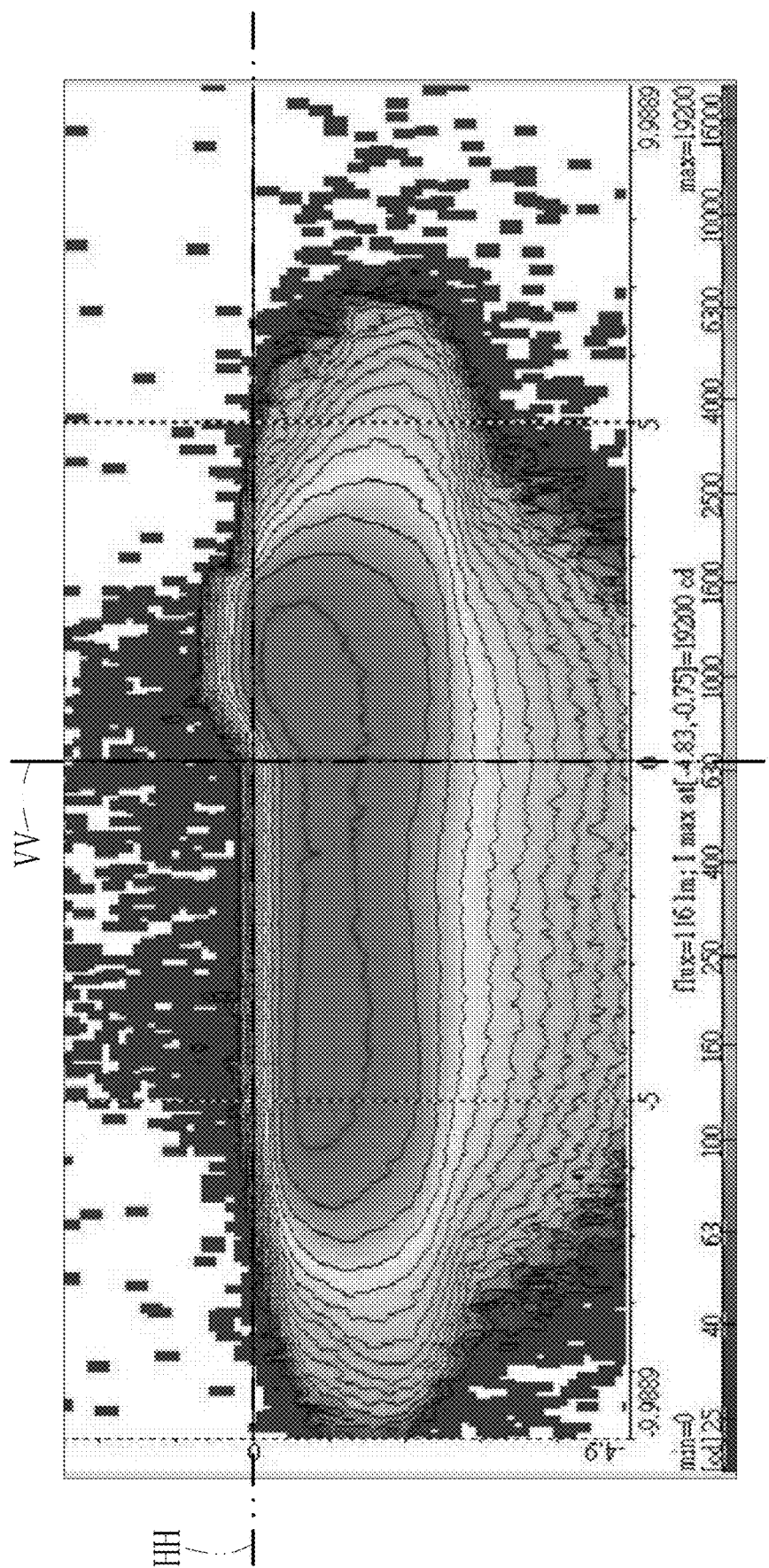
FIG. 64 is a light pattern diagram generated by the high-speed headlight module of the headlight device according to the second embodiment of the present disclosure.
Figure 65:
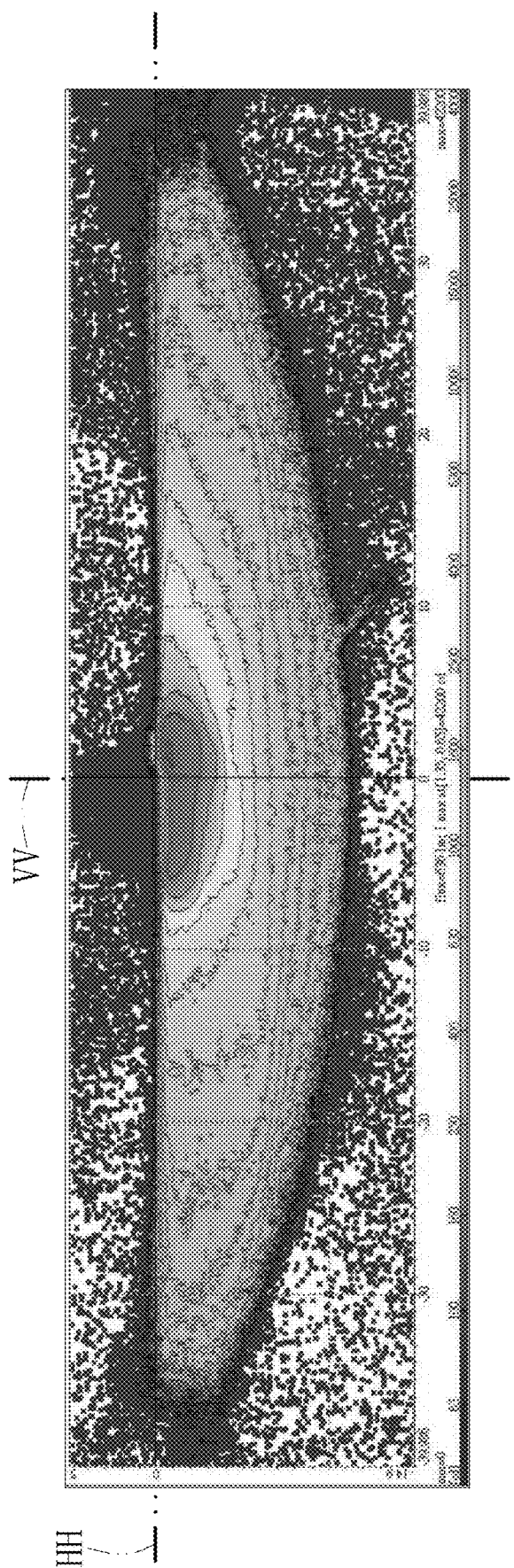
FIG. 65 is a light pattern diagram generated by the main headlight module and the high-speed headlight module of the headlight device according to the second embodiment of the present disclosure.

It should be noted that, according to the second embodiment of the present disclosure, the high-speed headlight module 2 in the right headlight of the left-hand drive car can be relatively rotated leftward and downward to the main headlight module 4 to form the second predetermined angle θ2 and the third predetermined angle θ3 that results in a light pattern as shown in FIG. 64. Further, when the main headlight module 4 and the high-speed headlight module 2 are lit at the same time, the light patterns shown in FIG. 65 can be generated. In other words, it can be observed by comparing FIG. 65 and FIG. 14 that the lighting distance can be increased when the main headlight module 4 and the high-speed headlight module 2 are lit at the same time.

In addition, it is worth mentioning that, in this embodiment, the high-speed headlight module 2 is only rotated leftward and downward relatively to the main headlight module 4, so that the lighting direction of the high-speed headlight module 2 is left-hand drive car front left and diagonally down, that is, the extension direction of the second optical axis A2 is the left front lower part of the left-hand drive car, and the extension direction of the second optical axis A2 is the front left lower part relative to the main optical axis A4. In other words, the angle of the second optical axis A2 of the high-speed headlight module 2 of the second embodiment corresponds to the main optical axis A4 can be the same as the angle of the second optical axis A2 of the high-speed headlight module 2 of the first embodiment with respect to the main optical axis A4.

Referring to FIGS. 57 to 63, the second cut-off plate unit 23B can include a first cut-off plate body 231, a second cut-off plate body 232, a cut-off plate turning part 233 connected between the first cut-off plate body 231 and the second cut-off plate body 232, a second front cut-off edge 23a, a second rear cut-off edge 23b, and a second top side surface 23c. In addition, the second front cut-off edge 23a is formed on the first cut-off plate body 231, the second cut-off plate body 232, and the cut-off plate turning part 233, and the second rear cut-off edge 23b can be formed on the first cut-off plate body 231, the second cut-off plate body 232 and the cut-off plate turning part 233. Further, the second front cut-off edge 23a and the second rear cut-off edge 23b are disposed corresponding to each other, and the second top side surface 23c is connected between the second front cut-off edge 23a and the second rear cut-off edge 23b. Furthermore, the second focal point 21b of the second reflecting unit 21 can preferably be located on the second front cut-off edge 23a, but is not limited thereto.

More specifically, the second top side surface 23c on the cut-off plate turning part 233 is an inclined plane and the second top side surface 23c on the cut-off plate turning part 233 is tilted toward the direction from the second cut-off plate body 232 to the first cut-off plate body 231, and a second predetermined included angle β2 between 140 degrees and 160 degrees is defined between the second top side surface 23c on the cut-off plate turning part 233 and the second top side surface 23c on the second cut-off plate body 232. In the present disclosure, the second predetermined included angle β2 is 150 degrees as an exemplary description. In addition, a first predetermined distance D1 between 0.02 mm and 0.3 mm is provided between the first top side surface 23c on the first cut-off plate body 231 and the first top side surface 23c on the second cut-off plate body 232. Preferably, the first predetermined distance D1 can be between 0.05 mm and 0.2 mm, and the present disclosure uses the first predetermined distance D1 as 0.1 mm as an exemplary description. Further, a second predetermined distance D2 is provided between the second optical axis A2 and an edge of the cut-off plate turning part 233 that is adjacent to the second optical axis A2, the size of the second predetermined distance D2 is between 1 times and 12 times the size of the first predetermined distance D1. For instance, the second predetermined distance D2 can be between 0.1 mm and 1.2 mm. Preferably, the second predetermined distance D2 can be between 0.3 mm and 1 mm, the second predetermined distance D2 is 0.6 mm as an exemplary description.

Figure 61:
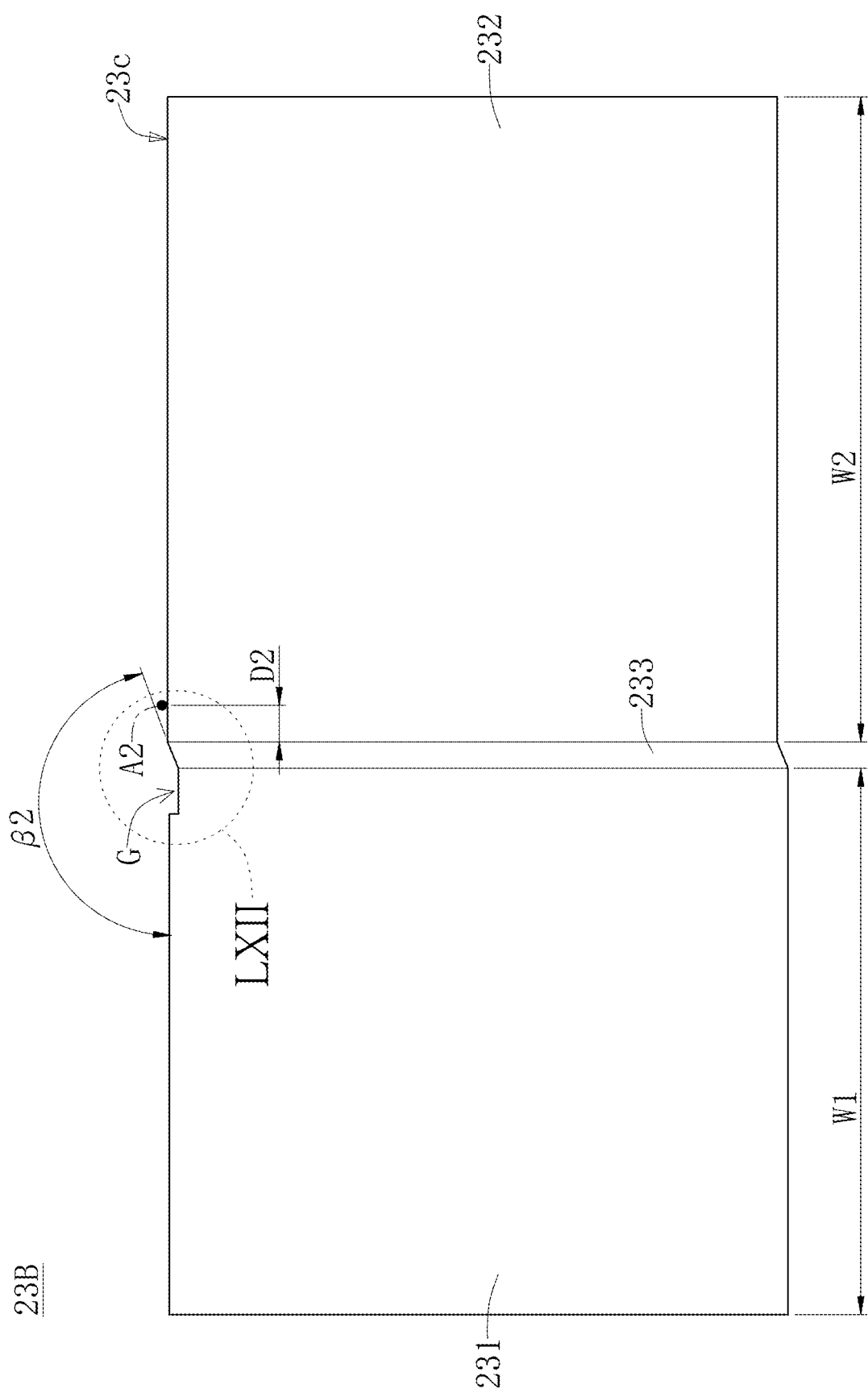
FIG. 61 is a front view of the second cut-off plate unit of the high-speed headlight module of the headlight device according to the second embodiment of the present disclosure.

Referring to FIG. 47 and FIG. 61, the first cut-off plate body 231 of the second cut-off plate unit 23B and the cut-off plate turning part 233 of the second cut-off plate unit 23B are located at a first side of the second optical axis A2, and the second cut-off plate body 232 of the second cut-off plate unit 23B is located at a second side of the second optical axis A2, and the first side and the second side are respectively located on two opposite sides of the second optical axis A2. For instance, as shown in FIG. 47 and FIG. 61, the first side of the second optical axis A2 can be the left side of the second optical axis A2, and the second side of the second optical axis A2 can be the right side of the second optical axis A2. Further, in the effective shading range of the second cut-off plate unit 23B, a first predetermined width W1 of the first cut-off plate body 231 of the second cut-off plate unit 23 B is smaller than a second predetermined width W2 of the second cut-off plate body 232 of the second cut-off plate unit 23 B. It should be noted that, the effective shading range described above is the range that the second cut-off plate unit 23 B can block light.

Figure 62:
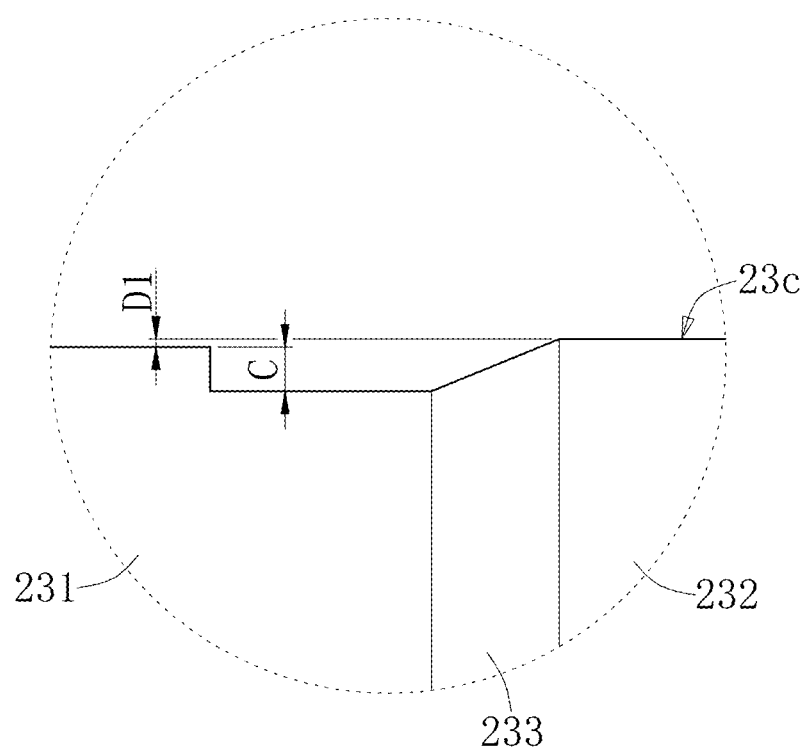
FIG. 62 is a partial view of the LXII part in FIG. 61.
Figure 63:
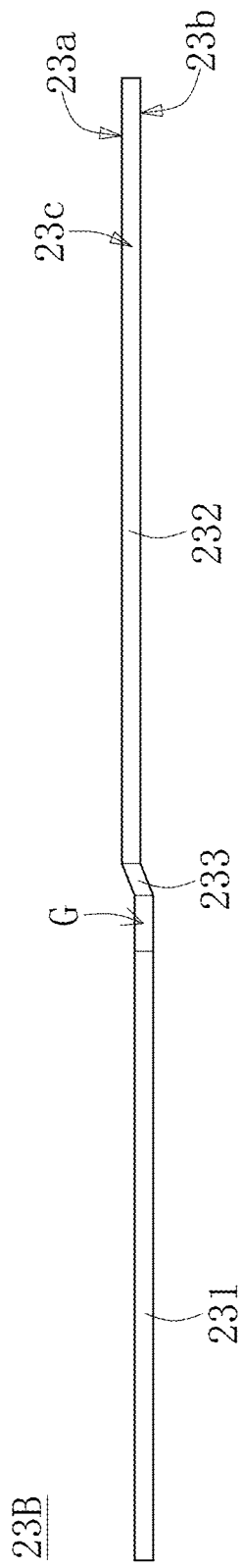
FIG. 63 is a top view of the second cut-off plate unit of the high-speed headlight module of the headlight device according to the second embodiment of the present disclosure.

Referring to FIG. 62, the inclined plane on the cut-off plate turning part 233 of the second cut-off plate unit 23B extends from the second cut-off plate body 232 of the second cut-off plate unit 23B to the first cut-off plate body 231 of the second cut-off plate unit 23B, so as to form a groove structure G opposite to the first cut-off plate body 231 of the second cut-off plate unit 23B and second cut-off plate body 232 of the second cut-off plate unit 23B.

Figure 58:
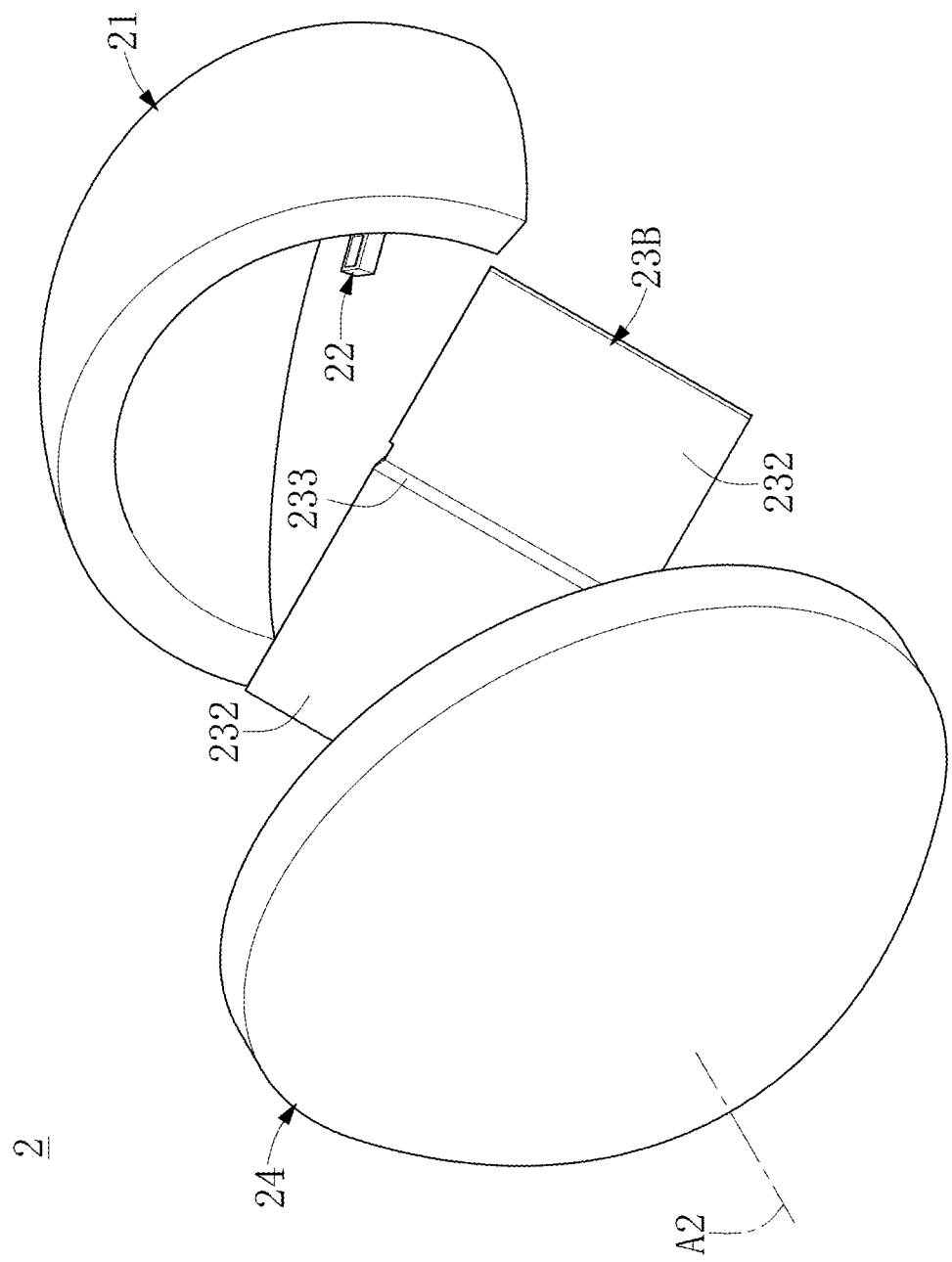
FIG. 58 is a perspective view of the high-speed headlight module of the headlight device according to the second embodiment of the present disclosure.
Figure 59:
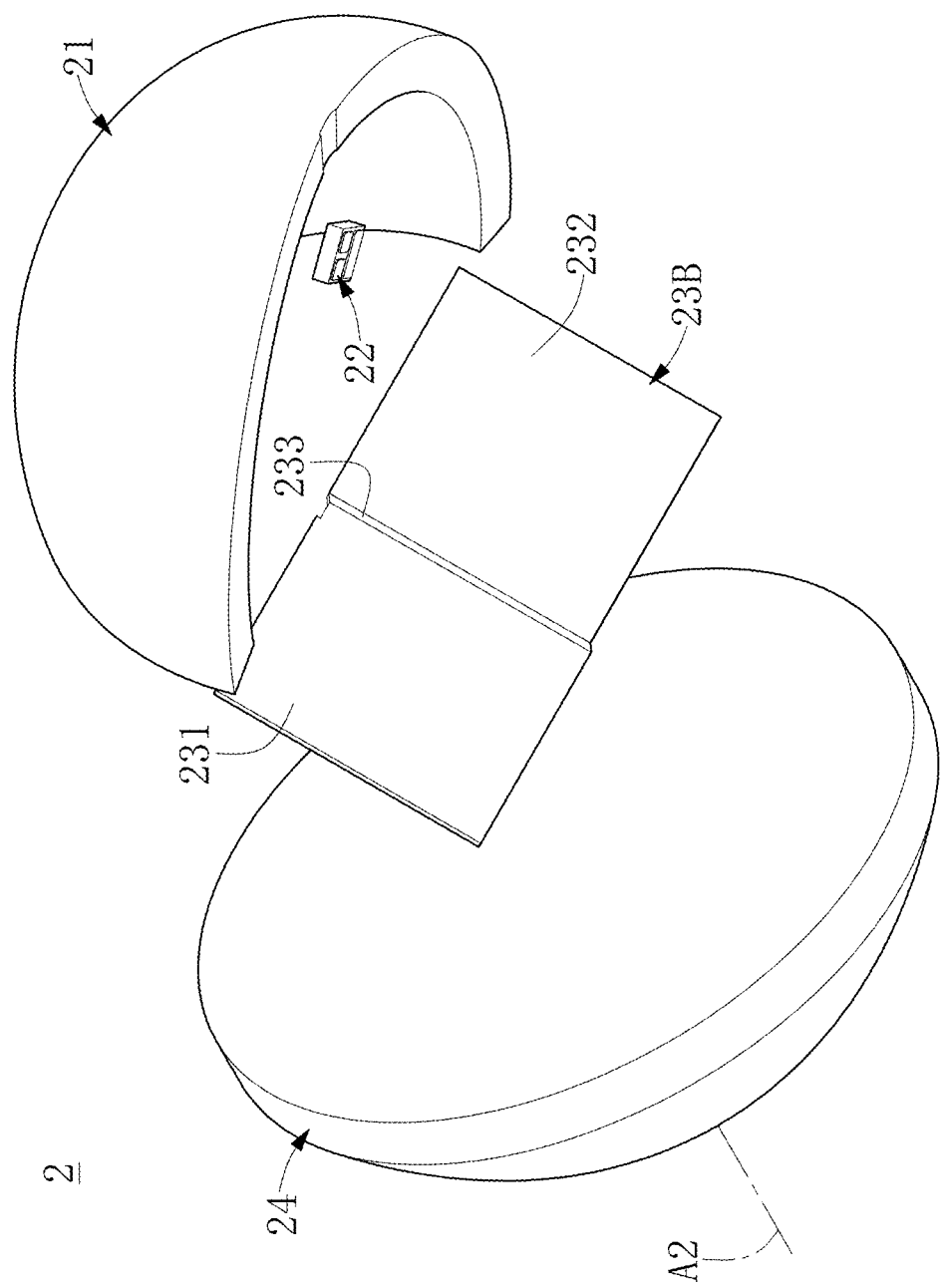
FIG. 59 is another perspective view of the high-speed headlight module of the headlight device according to the second embodiment of the present disclosure.
Figure 60:
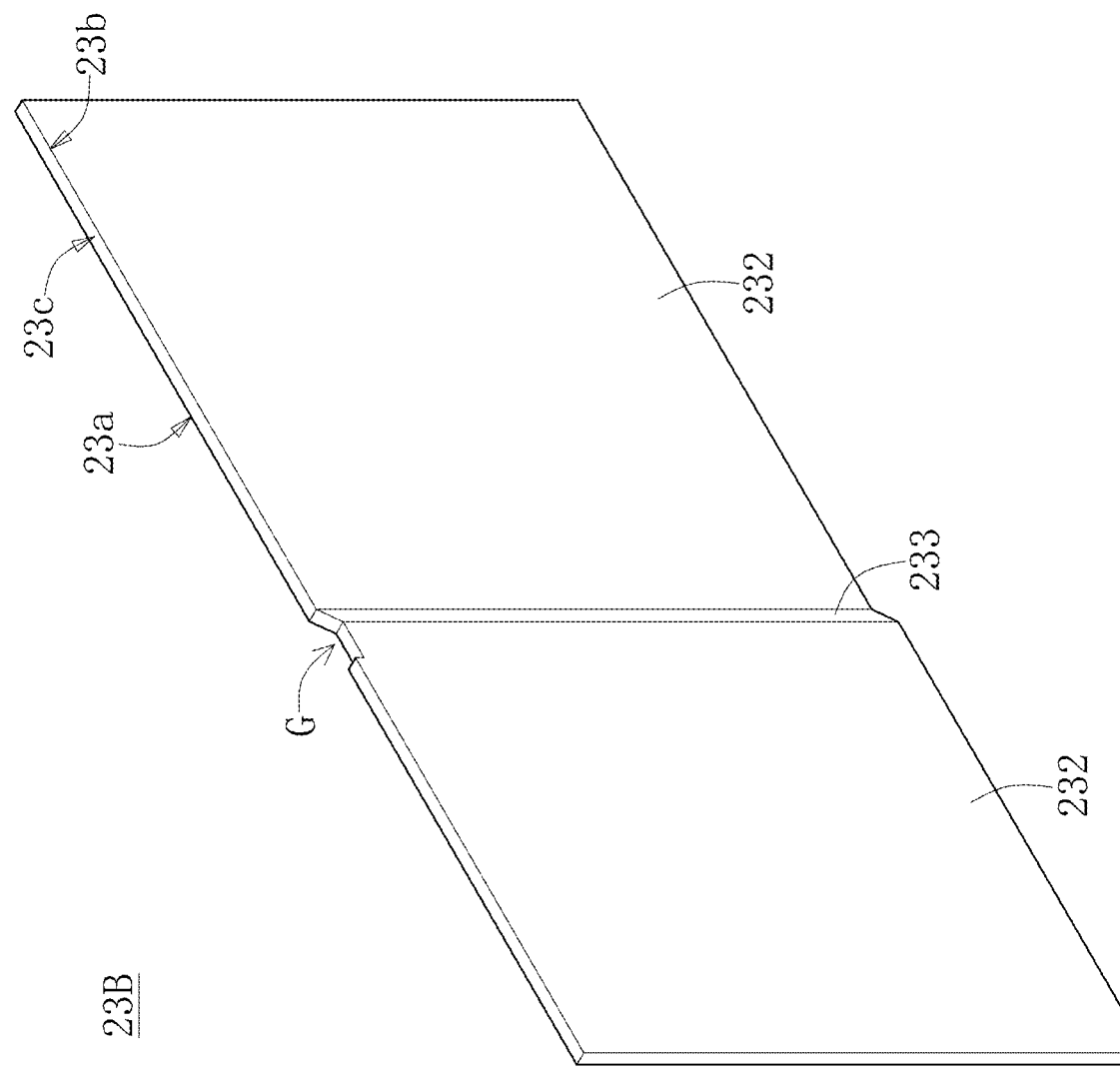
FIG. 60 is a perspective view of a second cut-off plate unit of the high-speed headlight module of the headlight device according to the second embodiment of the present disclosure.

Referring to FIG. 58 and FIG. 59, in order to prevent the second rear cut-off edge 23b of the second cut-off plate unit 23B from blocking the light transmitted to the second focal point 21b of the second reflecting unit 21, the second cut-off plate unit 23B can be inclined. However, it should be noted that, as shown in FIG. 22, in the embodiments, the second cut-off plate unit 23B can be placed upright as described in the first embodiment, a second predetermined inclined angle α2 between 20 degrees and 70 degrees between the second top side surface 23c and the second optical axis A2 can also be provided, and the present disclosure uses the second predetermined inclined angle α2 as 45 degrees as an exemplary description.

Figure 66:
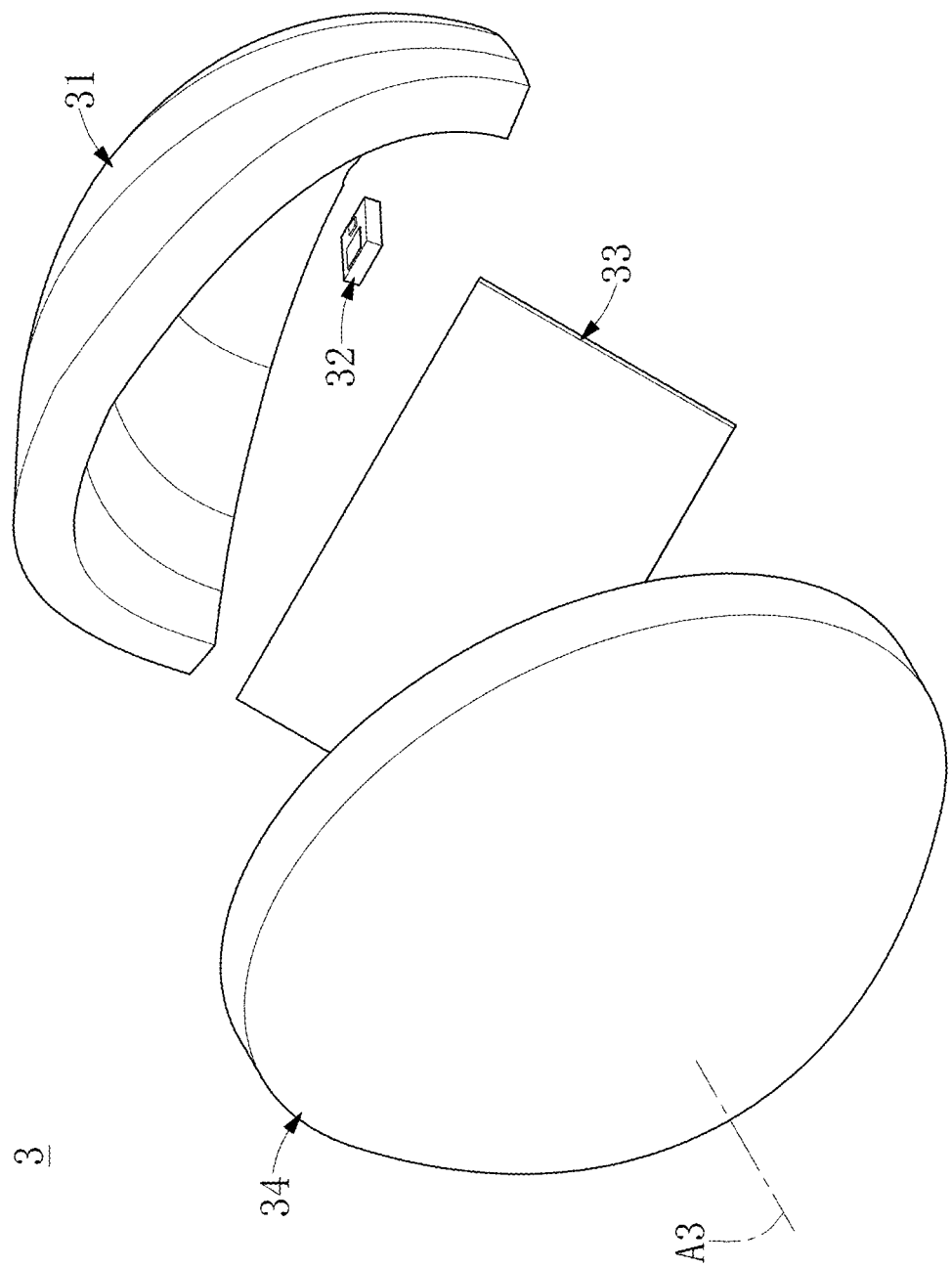
FIG. 66 is a perspective view of a turning headlight module of the headlight device according to the first embodiment of the present disclosure.

Referring to FIG. 44 to FIG. 48, which are to be read in conjunction with FIG. 66, the following will describe the structure when the headlight device U is applied to the structure of the turning headlight module 3 of the right headlight on the left-hand drive car. Specifically speaking, the turning headlight module 3 can be disposed adjacent to the main headlight module 4, and the turning headlight module 3 can include a third reflecting unit 31, a third lighting unit 32, a third cut-off plate unit 33A, and a third lens unit 34.

Further, it can be observed by comparing FIGS. 44 to 48 and 66 and FIGS. 1 to 5 and 36 that, the difference between the turning headlight module 3 provided in the second embodiment and the turning headlight module 3 provided in the first embodiment is that the arrangement position of the turning headlight module 3 related to the main headlight module 4 is different from that of the first embodiment. Therefore, other structures of the turning headlight module 3 are similar to those of the first embodiment, and will not be reiterated herein. The third lighting unit 32 can be disposed corresponding to the third reflecting unit 31, the third cut-off plate unit 33A can be disposed corresponding to the third reflecting unit 31, and the third lens unit 34 can be disposed corresponding to the third reflecting unit 31. In addition, the turning headlight module 3 can include a third optical axis A3, and a fourth predetermined angle θ4 between 30 degrees and 70 degrees is defined between the normal projection of the third optical axis A3 on the horizontal plane SH and the normal projection of the main optical axis A4 on the horizontal plane SH, or is defined between the normal projection of the third optical axis A3 on the horizontal plane SH and the normal projection of the vertical plane SV on the horizontal plane SH. Preferably, the fourth predetermined angle θ4 can be between 40 degrees and 60 degrees, and in the present disclosure, the fourth predetermined angle θ4 between the normal projection of the third optical axis A3 on the horizontal plane SH and the normal projection of the vertical plane SV on the horizontal plane SH is 50 degrees as an exemplary description.

Figure 67:
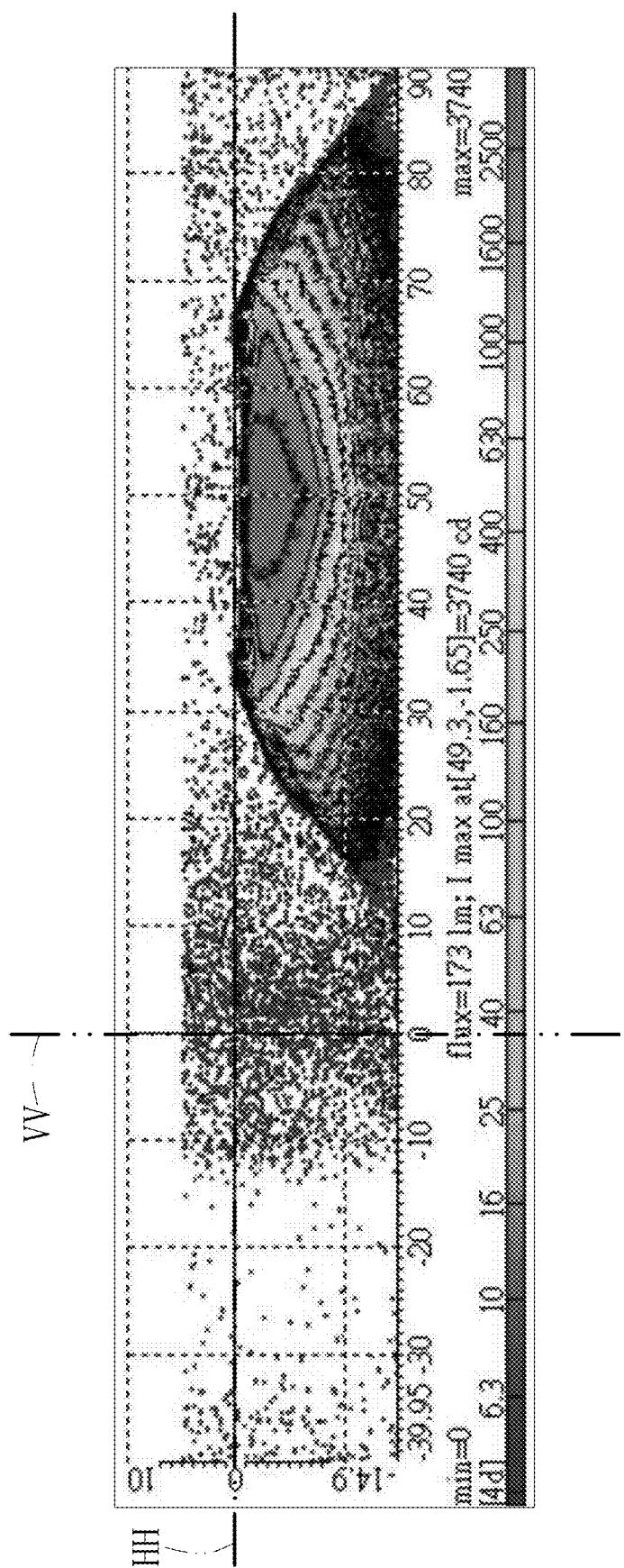
FIG. 67 is a light pattern diagram generated by the turning headlight module of the headlight device according to the second embodiment of the present disclosure.
Figure 68:
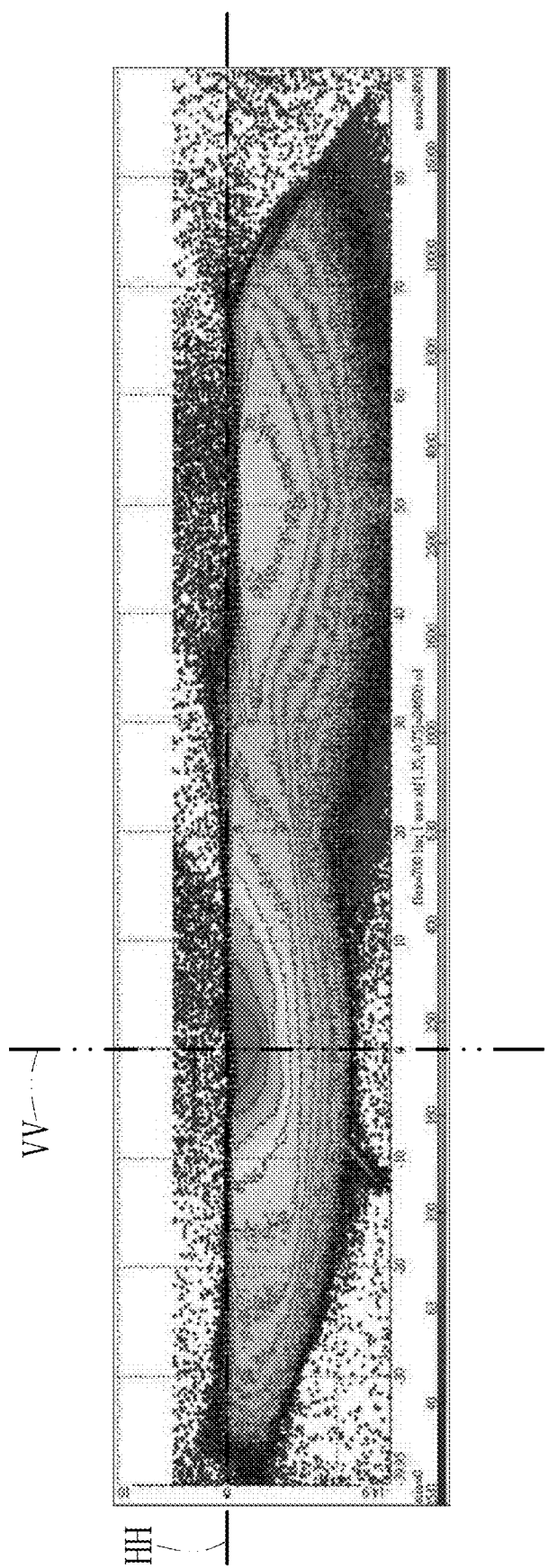
FIG. 68 is a light pattern diagram generated by the main headlight module and the turning headlight module of the headlight device according to the second embodiment of the present disclosure.

It should be noted that, according to the second embodiment of the present disclosure, the turning headlight module 3 in the right headlight of the left-hand drive car can be turned right relative to the main headlight module 4, so that the fourth predetermined angle θ4 between the third optical axis A3 of the turning headlight module 3 and the main optical axis A4 is provided, thereby generating a light pattern as shown in FIG. 67. Further, when the main headlight module 4 and the turning headlight module 3 are lit at the same time, the light patterns shown in FIG. 68 can be generated. In other words, it can be observed by comparing FIG. 68 and FIG. 14 that when the main headlight module 4 and the turning headlight module 3 are lit at the same time, the lighting range in the right can be increased.

It is worth mentioning that, the normal projection of the third optical axis A3 of the turning headlight module 3 on the vertical plane SV and the normal projection of the main optical axis A4 on the vertical plane SV are parallel to each other. That is, the turning headlight module 3 is only turned to the right relative to the main headlight module 4, so that the lighting direction of the turning headlight module 3 is at the front right of the left-hand drive car, and the extension direction of the third optical axis A3 is toward the front right side, that is, the extension direction of the third optical axis A3 is extended toward the front right corresponds to the main optical axis A4.

Third Embodiment

Figure 69:
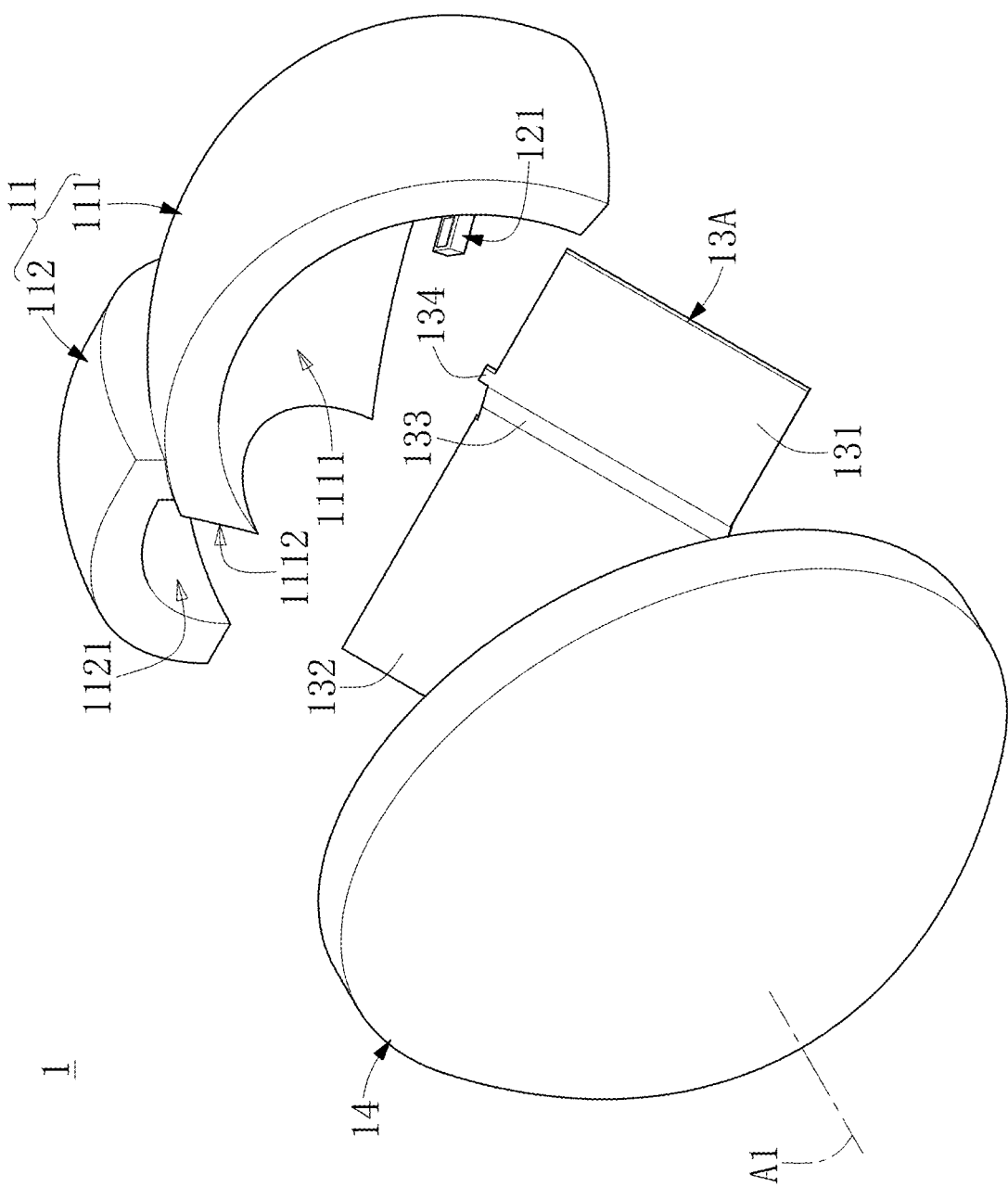
FIG. 69 is a perspective view of a bending headlight module of the headlight device according to a third embodiment of the present disclosure.
Figure 70:
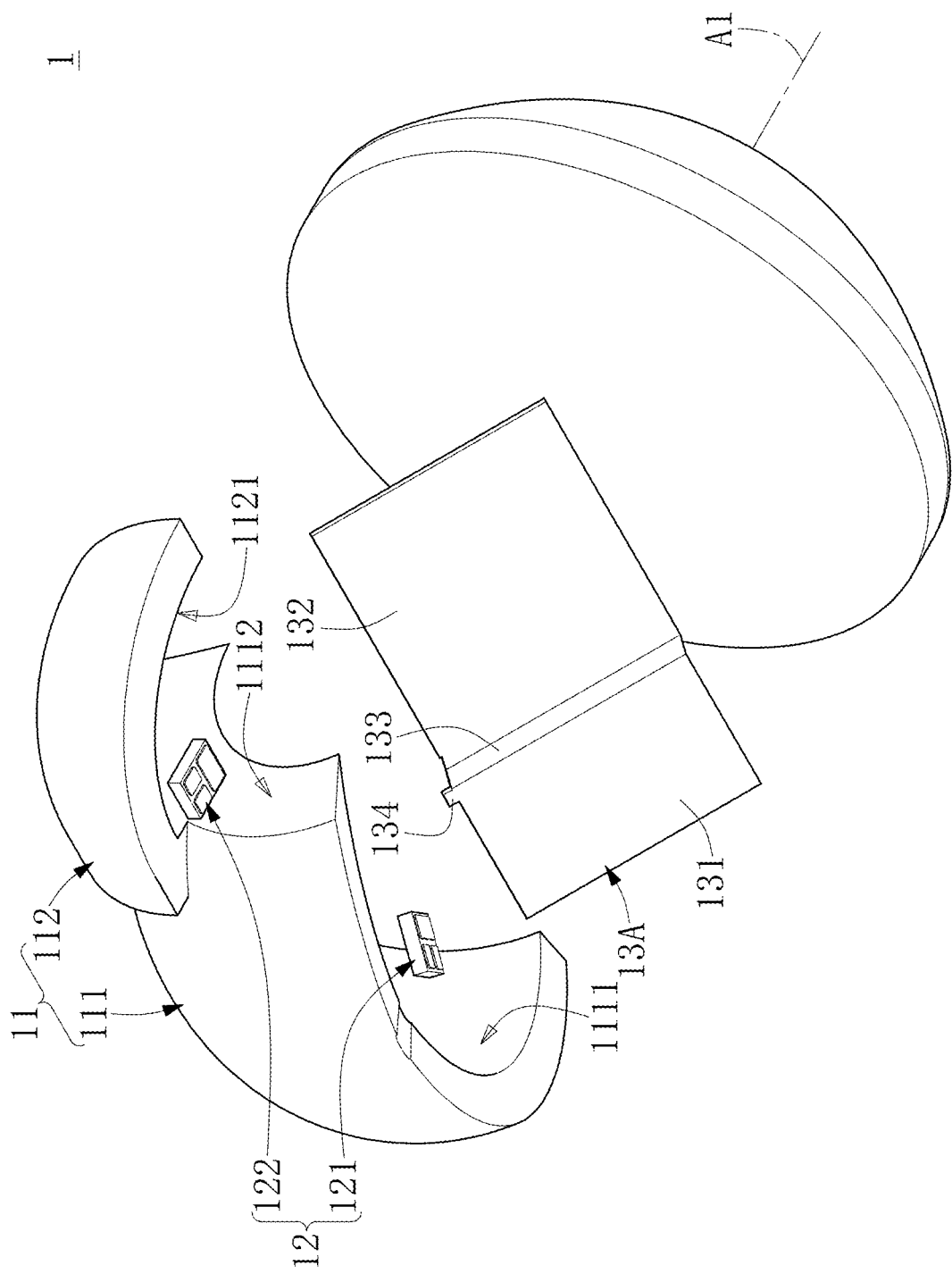
FIG. 70 is another perspective view of the bending headlight module of the headlight device according to the third embodiment of the present disclosure.

Referring to FIG. 69 to FIG. 71, a third embodiment of the present disclosure provides a bending headlight module 1 in another embodiment. It can be observed by comparing FIGS. 69 to 71 and FIGS. 15 to 16 that, the difference between the bending headlight module 1 of the third embodiment and the bending headlight module 1 of the first embodiment is the structure of the first reflecting unit 11, the number of the first lighting units 12, and the structure of the first cut-off plate unit 13A of the bending headlight module 1 of the third embodiment.

The bending headlight module 1 of the third embodiment can include a first reflecting unit 11, a first lighting unit 12, a first cut-off plate unit 13A, and a first lens unit 14. The first reflecting unit 11 can include a first reflecting element 111 and a second reflecting unit 112. The first lighting unit 12 can include a first reflecting element 121 and a second reflecting unit 122. The first reflecting element 121 can correspond to the first reflecting element 111 and the second reflecting unit 122 can correspond to the second reflecting unit 112. In addition, it is worth mentioning that, the first reflecting element 111, and the second reflecting unit 112 are reflecting surfaces having an elliptical curvature, respectively.

Further, the first reflecting element 111 can include a first reflecting surface 1111 and a bare reflecting surface 1112, and the second reflecting unit 112 can include a second reflecting surface 1121. The bare reflecting surface 1112 is connected between the first reflecting surface 1111 and the second reflecting surface 1121. Furthermore, the first reflecting element 111 and the second reflecting unit 112 are arranged alternately to form a bare reflecting surface 1112, so that the bare reflecting surface 1112 is exposed relative to the second reflecting surface 1121. Therefore, a setting of the bare reflecting surface 1112 can increase the lighting range of the bending headlight module 1, that is, the setting of the bare reflecting surface 1112 can increase the light expansion effect of the bending headlight module 1.

Fourth Embodiment

Figure 72:
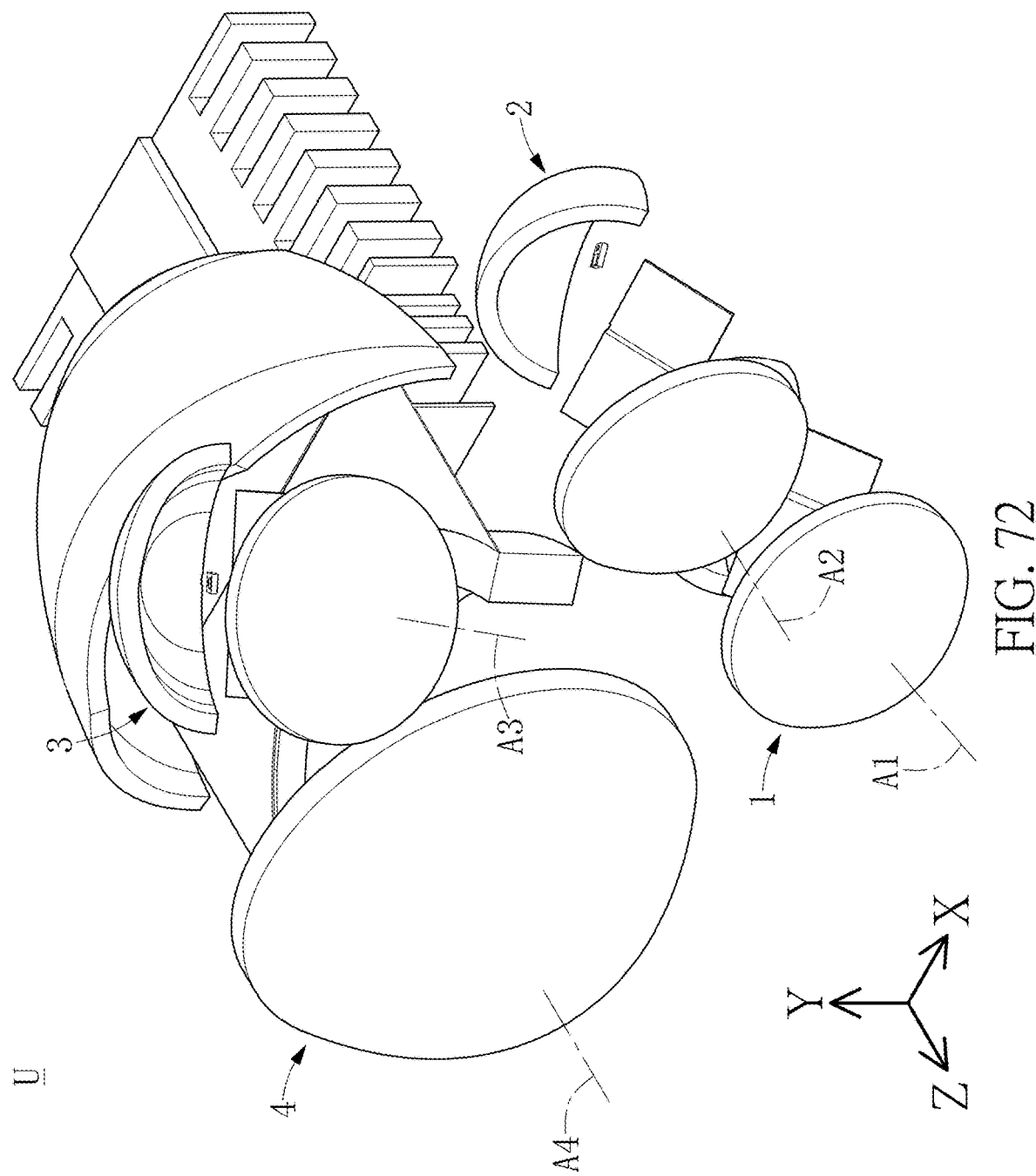
FIG. 72 is a perspective view of a headlight device according to a fourth embodiment of the present disclosure.
Figure 73:
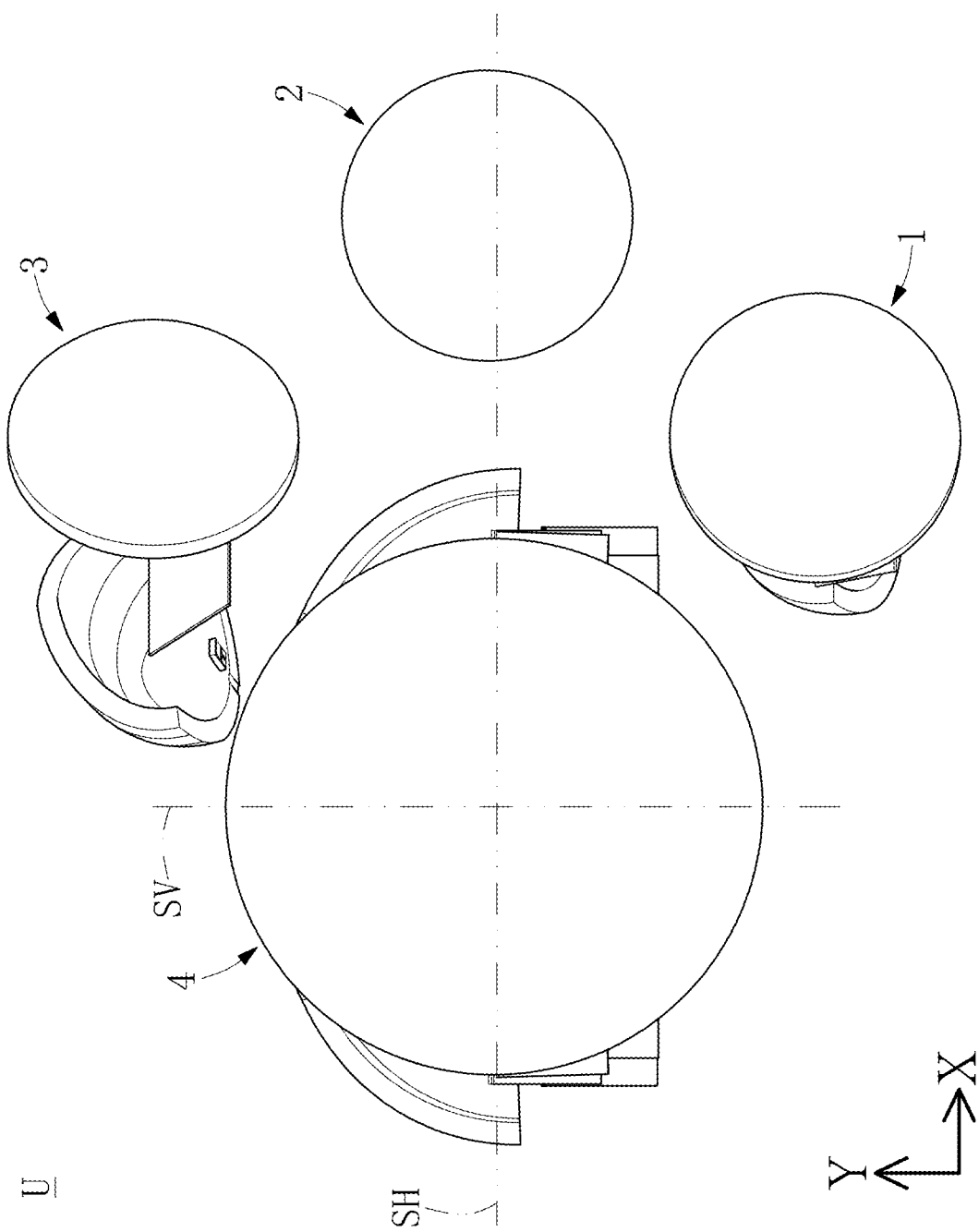
FIG. 73 is a front view of the headlight device according to the fourth embodiment of the present disclosure.
Figure 74:
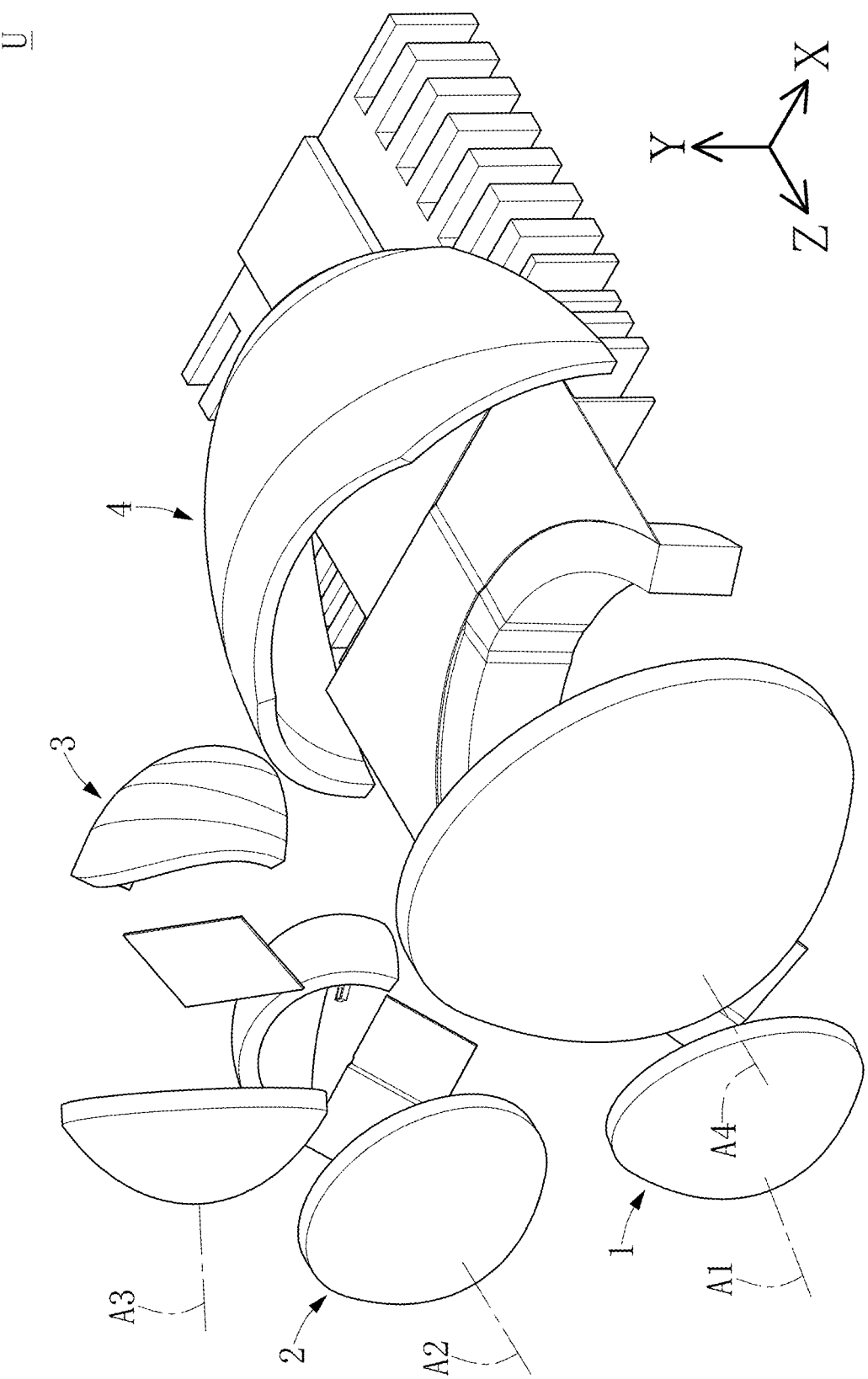
FIG. 74 is a perspective view of a headlight device according to a fifth embodiment of the present disclosure.
Figure 75:
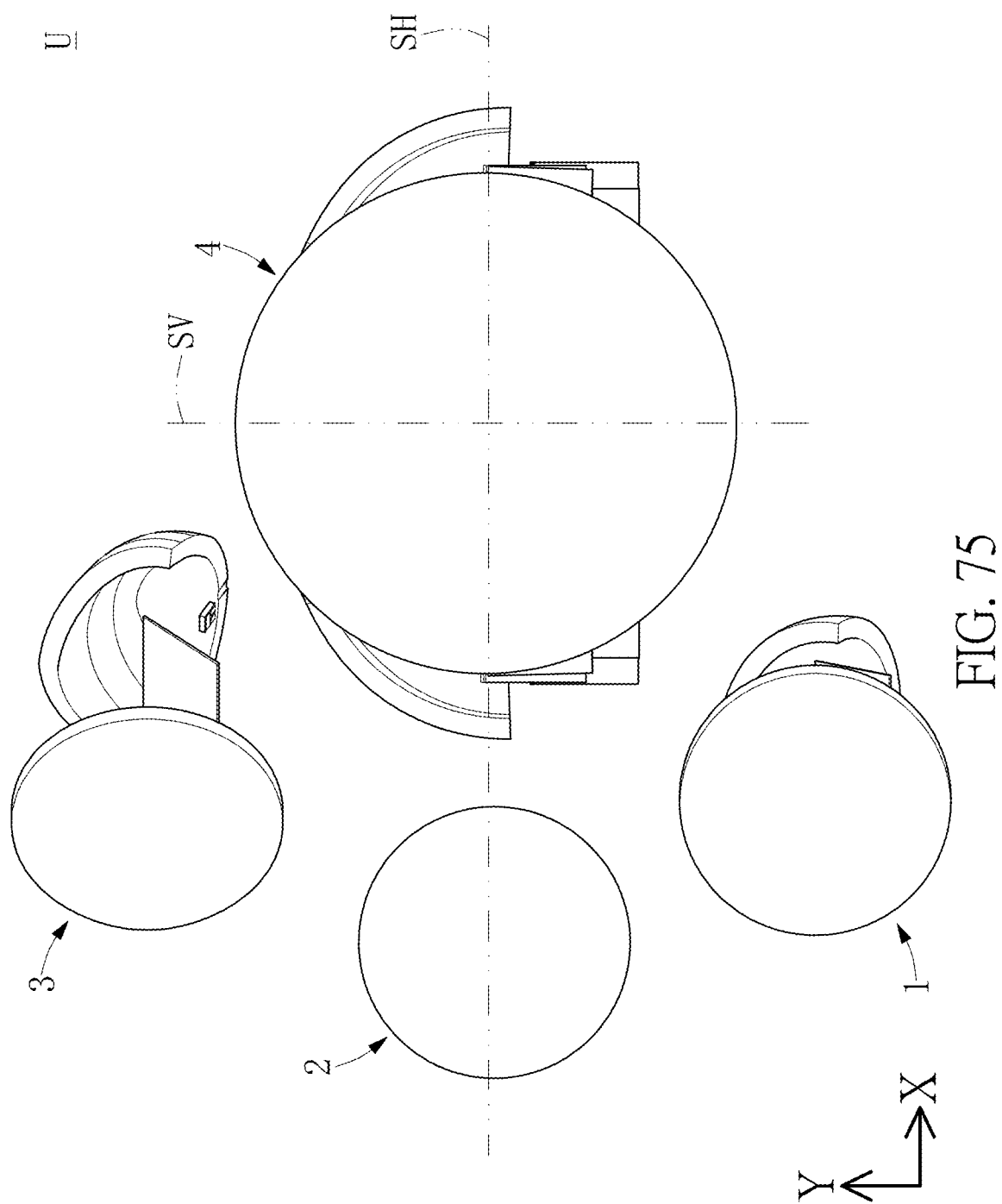
FIG. 75 is a front view of the headlight device according to the fifth embodiment of the present disclosure.

Referring to FIG. 72 to FIG. 75, which provide another configuration method of the headlight device U. The headlight device U shown in FIG. 72 and FIG. 73 is preferably applicable to the left headlight on the left-hand drive car, and the headlight device U shown in FIG. 74 and FIG. 75 is preferably applicable to the right headlight on the left-hand drive car.

It can be observed by comparing FIGS. 72 and 73 and FIGS. 1 and 5 and by comparing FIGS. 74 and 75 and FIGS. 44 and 48 that, the difference between the headlight device U provided in the fourth embodiment and the first and second embodiments is the arrangement positions of various vehicle headlight modules of the headlight devices U provided in the fourth embodiment.

The bending headlight module 1, high-speed headlight module 2, and/or turning headlight module 3 can be disposed adjacent to the main headlight module 4, and is not limited to be placed on the upper side, the lower side, or the left and right sides of the main headlight module 4. Therefore, the position of each headlight module relative to the main headlight module 4 can be adjusted according to the allowable space of the car. Further, in other embodiments, the bending headlight module 1 and/or the high-speed headlight module 2 in the left headlight on the left-hand drive car in the first embodiment can be disposed in the right headlight on the left-hand drive car in the second embodiment. Similarly, the bending headlight module 1 and/or the high-speed headlight module 2 in the right headlight on the left-hand drive car in the second embodiment may be disposed in the left headlight on the left-hand drive car in the first embodiment, but is not limited to thereto.

It is worth mentioning that, although the headlight device U provided in the embodiment of the present disclosure is applied to a headlight of a left-hand drive car, the headlight device U provided in the embodiment of the present disclosure can also be applied to a headlight of a right-hand drive vehicle. In addition, the headlight device U applied to the headlight of the right-hand drive vehicle can be a mirrored symmetry structure of the structure of the headlight device U provided in the embodiment of the present invention.

Advantages of the Embodiments

One of the effects of the present disclosure is that, the headlight device U and its bending headlight module 1 of the present disclosure can enable the headlight device U to generate the curve lighting mode (T mode) of the adaptive front-lighting system through the technical solution of "a first predetermined angle $\theta 1$ between 7 degrees and 15 degrees is defined between the normal projection of the first optical axis A1 on the horizontal plane SH and the normal projection of the main optical axis A4 on the horizontal plane SH or between the normal projection of the first optical axis A1 on the horizontal plane SH and the normal projection of the vertical plane SV on the horizontal plane SH". In addition, the bending headlight module 1 can also make the bending headlight module 1 cooperate with the main headlight module 4 to generate light patterns that meet specifications and increase the lighting range of the headlight device U through the technical solution of "the first cut-off plate unit (13A, 13B) includes a first cut-off plate body 131, a second cut-off plate body 132, a cut-off plate turning part 133 connecting between the first cut-off plate body 131 and the second cut-off plate body 132, a cut-off plate protruding part 134 protruding from and being disposed corresponding to the first cut-off plate body 131 and being close to the cut-off plate turning part 133, a first front cut-off edge 13a, a first rear cut-off edge 13b, and a first top side surface 13c".

Another one of the effects of the present disclosure is that, the headlight device U and the high-speed headlight module 2 of the present disclosure can enable the headlight device U to generate the high-speed road lighting mode 1 (E1 mode) or the high-speed road lighting mode 2 (E2 mode) of the adaptive front-lighting system through the technical solution of "a second predetermined angle $\theta 2$ between 0.9 degrees and 2.1 degrees is defined between the normal projection of the second optical axis A2 on the horizontal plane SH and the normal projection of the main optical axis A4 on the horizontal plane SH, or is defined between the normal projection of the second optical axis A2 on the horizontal plane SH and the normal projection of the vertical plane SV on the horizontal plane SH. In addition, a third predetermined angle $\theta 3$ between 0.2 degrees and 0.57 degrees is defined between the normal projection of the second optical axis A2 on the vertical plane SV and the normal projection of the main optical axis A4 on the vertical plane SV, or is defined between the normal projection of the second optical axis A2 on the vertical plane SV and the normal projection of the horizontal plane SH on the vertical plane SV." In addition, the headlight device and the high-speed headlight module can also make the high-speed headlight module 2 cooperate with the main headlight module 4 to generate light patterns that meet specifications and increase the lighting range of the headlight device through the technical solution of "the second cut-off plate unit (23A, 23B) includes a first cut-off plate body 231, a second cut-off plate body 232, a cut-off plate turning part 233 connecting between the first cut-off plate body 231 and the second cut-off plate body 232, a second front cut-off edge 23a, a second rear cut-off edge 23b, and a second top side surface 23c".

Further, the lighting timing of the light lighting units (the first lighting unit 12, the second lighting unit 22, and the third lighting unit 32) of the bending headlight module 1, the high-speed headlight module 2, and/or the turning headlight module 3 can be activated by the system in the car according to the current state of the car. For instance, it can be determined according to the speed or steering angle of the car whether the bending headlight module 1, the high-speed headlight module 2, and/or the turning headlight module 3 should be activated. The present disclosure can increase the lighting range of the headlight device U by using the bending headlight module 1, the high-speed headlight module 2, and/or the turning headlight module 3.

In addition, compared with the headlight device with steering function in the conventional technology, the steering angle must be controlled by the motor. The headlight device U and the bending headlight module 1 provided by the present disclosure can change the light type without using a motor, but by using the cut-off control of the light lighting units.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A headlight device, comprising:
a main headlight module, which is capable of generating a first lighting area having a light pattern that complies with the regulations of low beam headlamps, wherein the main headlight module includes a main optical axis, and the main headlight module defines a horizontal plane and a vertical plane perpendicular to the horizontal plane, and the main optical axis is parallel to the horizontal plane and the vertical plane; and
a high-speed headlight module, which is disposed close to the main headlight module, wherein the high-speed headlight module includes a reflecting unit, a lighting unit, a cut-off plate unit, and a lens unit, and wherein the lighting unit of the high-speed headlight module is disposed corresponding to the reflecting unit of the high-speed headlight module, the cut-off plate unit of the high-speed headlight module is disposed corresponding to the reflecting unit of the high-speed headlight module, and the lens unit of the high-speed headlight module is disposed corresponding to the reflecting unit of the high-speed headlight module;
wherein the high-speed headlight module includes an optical axis, and a predetermined angle between 0.9 degrees and 2.1 degrees is defined between the normal projection of the optical axis on the horizontal plane and the normal projection of the main optical axis on the horizontal plane or between the normal projection of the optical axis on the horizontal plane and the normal projection of the vertical plane on the horizontal plane, and a predetermined angle between 0.2 degrees and 0.57 degrees is defined between the normal projection of the optical axis of the high-speed headlight module on the vertical plane and the normal projection of the main optical axis on the vertical plane or between the normal projection of the optical axis of the high-speed headlight module on the vertical plane and the normal projection of the horizontal plane on the vertical plane.

2. The headlight device according to claim 1, wherein the reflecting unit of the high-speed headlight module includes a first focal point and a second focal point corresponding to the first focal point of the reflecting unit of the high-speed headlight module, wherein the lighting unit of the high-speed headlight module is disposed corresponding to the first focal point of the reflecting unit of the high-speed headlight module, and the lens unit of the high-speed headlight module includes a first lens focal point, the first lens focal point of the lens unit of the high-speed headlight module being disposed corresponding to the second focal point of the reflecting unit of the high-speed headlight module and being located on the optical axis of the high-speed headlight module.

3. The headlight device according to claim 1, wherein the cut-off plate unit of the high-speed headlight module includes a front cut-off edge, a rear cut-off edge, and a top side surface, the front cut-off edge of the cut-off plate unit of the high-speed headlight module and the rear cut-off edge of the cut-off plate unit of the high-speed headlight module are disposed corresponding to each other, and the top side surface of the cut-off plate unit of the high-speed headlight module is connected between the front cut-off edge of the cut-off plate unit of the high-speed headlight module and the rear cut-off edge of the cut-off plate unit of the high-speed headlight module, and wherein a predetermined inclined angle ranging between 20 degrees to 70 degrees is defined between the normal projection of the top side surface of the cut-off plate unit of the high-speed headlight module on the vertical plane and the normal projection of the optical axis of the cut-off plate unit of the high-speed headlight module on the vertical plane.

4. The headlight device according to claim 1, wherein the headlight device is a left headlight on a left-hand drive car, a lighting direction of the high-speed headlight module is toward the front left side and obliquely downward of the left-hand drive car, and the extension direction of the optical axis of the high-speed headlight module is toward the front left side and obliquely downward of the left-hand drive car.

5. The headlight device according to claim 4, wherein the cut-off plate unit of the high-speed headlight module includes a first cut-off plate body, a second cut-off plate body, a cut-off plate turning part connecting between the first cut-off plate body of the cut-off plate unit and the second cut-off plate body of the cut-off plate unit, a front cut-off edge, a rear cut-off edge, and a top side surface; wherein the front cut-off edge of the cut-off plate unit of the high-speed headlight module is formed on the first cut-off plate body, the second cut-off plate body, and the cut-off plate turning part of the cut-off plate unit of the high-speed headlight module, the rear cut-off edge of the cut-off plate unit of the high-speed headlight module is formed on the first cut-off plate body, the second cut-off plate body, the cut-off plate turning part of the cut-off plate unit of the high-speed headlight module, the front cut-off edge of the cut-off plate unit of the high-speed headlight module and the rear cut-off edge of the cut-off plate unit of the high-speed headlight module are disposed corresponding to each other, and the top side surface of the cut-off plate unit of the high-speed headlight module is connected between the front cut-off edge of the cut-off plate unit of the high-speed headlight module and the rear cut-off edge of the cut-off plate unit of the high-speed headlight module; wherein the top side surface on the cut-off plate turning part of the cut-off plate unit of the high-speed headlight module is an inclined plane, and the top side surface on the cut-off plate turning part of the cut-off plate unit of the high-speed headlight module is tilted in a direction from the second cut-off plate body of the cut-off plate unit of the high-speed headlight module toward the first cut-off plate body of the cut-off plate unit of the high-speed headlight module; wherein a first predetermined distance between 0.02 mm and 0.3 mm is defined between the top side surface on the first cut-off plate body of the cut-off plate unit of the high-speed headlight module and the top side surface on the second cut-off plate body of the cut-off plate unit of the high-speed headlight module.

6. The headlight device according to claim 5, wherein the first cut-off plate body and the cut-off plate turning part of the cut-off plate unit of the high-speed headlight module are located on a first side of the optical axis of the high-speed headlight module, the second cut-off plate body of the cut-off plate unit of the high-speed headlight module is located on a second side of the optical axis of the high-speed headlight module, and the first side of the optical axis of the high-speed headlight module and the second side of the optical axis of the high-speed headlight module are respectively on opposite sides of the optical axis of the high-speed headlight module.

7. The headlight device according to claim 5, wherein in an effective shading range of the cut-off plate unit of the high-speed headlight module, a first predetermined width of the first cut-off plate body of the cut-off plate unit of the high-speed headlight module is smaller than a second predetermined width of the second cut-off plate body of the cut-off plate unit of the high-speed headlight module.

8. The headlight device according to claim 5, wherein the inclined plane on the cut-off plate turning part of the cut-off plate unit of the high-speed headlight module extends from the second cut-off plate body of the cut-off plate unit of the high-speed headlight module to the first cut-off plate body of the cut-off plate unit of the high-speed headlight module, so as to form a groove structure opposite to the first cut-off plate body of the cut-off plate unit of the high-speed headlight module and the second cut-off plate body of the cut-off plate unit of the high-speed headlight module.

9. The headlight device according to claim 5, wherein a predetermined included angle between 140 degrees and 160 degrees is defined between the top side surface on the cut-off plate turning part of the cut-off plate unit of the high-speed headlight module and the top side surface on the first cut-off plate body of the cut-off plate unit of the high-speed headlight module.

10. The headlight device according to claim 5, wherein a second predetermined distance is defined between the optical axis of the high-speed headlight module and an edge of the cut-off plate turning part of the cut-off plate unit of the high-speed headlight module that is adjacent to the optical axis, and the size of the second predetermined distance is between 2.2 times and 4.6 times the size of the first predetermined distance.

11. The headlight device according to claim 1, wherein the headlight device is a right headlight on a left-hand drive car, a lighting direction of the high-speed headlight module is toward the front left side and obliquely downward of the left-hand drive car, and the extension direction of the optical axis of the high-speed headlight module is toward the front left side and obliquely downward of the left-hand drive car.

12. The headlight device according to claim 11, wherein the cut-off plate unit of the high-speed headlight module includes a first cut-off plate body, a second cut-off plate body, a cut-off plate turning part connecting between the first cut-off plate body of the cut-off plate unit and the second cut-off plate body of the cut-off plate unit, a front cut-off edge, a rear cut-off edge, and a top side surface; wherein the front cut-off edge of the cut-off plate unit of the high-speed headlight module is formed on the first cut-off plate body, the second cut-off plate body, and the cut-off plate turning part of the cut-off plate unit of the high-speed headlight module, the rear cut-off edge of the cut-off plate unit of the high-speed headlight module is formed on the first cut-off plate body, the second cut-off plate body, the cut-off plate turning part of the cut-off plate unit of the high-speed headlight module, the front cut-off edge of the cut-off plate unit of the high-speed headlight module and the rear cut-off edge of the cut-off plate unit of the high-speed headlight module are disposed corresponding to each other, and the top side surface of the cut-off plate unit of the high-speed headlight module is connected between the front cut-off edge of the cut-off plate unit of the high-speed headlight module and the rear cut-off edge of the cut-off plate unit of the high-speed headlight module; wherein the top side surface on the cut-off plate turning part of the cut-off plate unit of the high-speed headlight module is an inclined plane and the top side surface on the cut-off plate turning part of the cut-off plate unit of the high-speed headlight module is tilted in a direction from the second cut-off plate body of the cut-off plate unit of the high-speed headlight module toward the first cut-off plate body of the cut-off plate unit of the high-speed headlight module; wherein a first predetermined distance between 0.02 mm and 0.3 mm is defined between the top side surface on the first cut-off plate body of the cut-off plate unit of the high-speed headlight module and the top side surface on the second cut-off plate body of the cut-off plate unit of the high-speed headlight module.

13. The headlight device according to claim 12, wherein a second predetermined distance is defined between the optical axis of the high-speed headlight module and an edge of the cut-off plate turning part of the cut-off plate unit of the high-speed headlight module that is adjacent to the optical axis, and the size of the second predetermined distance is between 1 times and 12 times the size of the first predetermined distance.

14. The headlight device according to claim 1, further comprising a turning headlight module being disposed close to the main headlight module, wherein the turning headlight module includes a reflecting unit, a lighting unit, a cut-off plate unit, and a lens unit; wherein the lighting unit of the turning headlight module is disposed corresponding to the reflecting unit of the turning headlight module, the cut-off plate unit of the turning headlight module is disposed corresponding to the reflecting unit of the turning headlight module, and the lens unit of the turning headlight module is disposed corresponding to the reflecting unit of the turning headlight module, and wherein the turning headlight module includes an optical axis, and a predetermined angle between 30 degrees and 70 degrees is defined between the normal projection of the optical axis of the turning headlight module on the horizontal plane and the normal projection of the main optical axis on the horizontal plane or is defined between the normal projection of the optical axis of the turning headlight module on the horizontal plane and the normal projection of the vertical plane on the horizontal plane.

15. The headlight device according to claim 14, wherein the reflecting unit of the turning headlight module includes a first focal point and a second focal point corresponding to the first focal point of the reflecting unit of the turning headlight module, the lighting unit of the turning headlight module is disposed corresponding to the first focal point of the reflecting unit of the turning headlight module, and the lens unit of the reflecting unit of the turning headlight module includes a first lens focal point, the first lens focal point of the reflecting unit of the turning headlight module corresponding to the second focal point of the reflecting unit of the turning headlight module and being located on the optical axis of the turning headlight module.

16. The headlight device according to claim 14, wherein the cut-off plate unit of the turning headlight module includes a front cut-off edge, a rear cut-off edge, and a top side surface, the front cut-off edge of the cut-off plate unit of the turning headlight module and the rear cut-off edge of the cut-off plate unit of the turning headlight module are disposed corresponding to each other, and the top side surface of the cut-off plate unit of the turning headlight module is connected between the front cut-off edge of the cut-off plate unit of the turning headlight module and the rear cut-off edge of the cut-off plate unit of the turning headlight module, wherein a predetermined inclined angle ranging between 20 degrees to 70 degrees is defined between the normal projection of the top side surface of the cut-off plate unit of the turning headlight module on the vertical plane and the normal projection of the optical axis of the cut-off plate unit of the turning headlight module on the vertical plane.

17. The headlight device according to claim 16, wherein the front cut-off edge of the cut-off plate unit of the turning headlight module is a flush edge.

18. A high-speed headlight module, comprising:
a reflecting unit;
a lighting unit being disposed corresponding to the reflecting unit;
a cut-off plate unit being disposed corresponding to the reflecting unit; and
a lens unit being disposed corresponding to the reflecting unit;
wherein the cut-off plate unit includes a first cut-off plate body, a second cut-off plate body, a cut-off plate turning part connecting between the first cut-off plate body of the cut-off plate unit and the second cut-off plate body of the cut-off plate unit, a front cut-off edge, a rear cut-off edge, and a top side surface;
wherein the front cut-off edge is formed on the first cut-off plate body, the second cut-off plate body, and the cut-off plate turning part of the cut-off plate unit, the rear cut-off edge is formed on the first cut-off plate body, the second cut-off plate body, the cut-off plate turning part of the cut-off plate unit, the front cut-off edge and the rear cut-off edge are disposed corresponding to each other, and the top side surface is connected between the front cut-off edge and the rear cut-off edge;
wherein the top side surface on the cut-off plate turning part of the cut-off plate unit is an inclined plane and the top side surface on the cut-off plate turning part of the cut-off plate unit is tilted in a direction from the second cut-off plate body of the cut-off plate unit toward the first cut-off plate body of the cut-off plate unit.

19. The high-speed headlight module according to claim 18, wherein the reflecting unit of the high-speed headlight module includes a first focal point and a second focal point corresponding to the first focal point of the reflecting unit of the high-speed headlight module, and wherein the lighting unit of the high-speed headlight module is disposed corresponding to the first focal point of the reflecting unit of the high-speed headlight module, the lens unit of the high-speed headlight module includes a first lens focal point, and the first lens focal point of the lens unit of the high-speed headlight module is disposed corresponding to the second focal point of the reflecting unit of the high-speed headlight module and is located on an optical axis of the high-speed headlight module.

20. The high-speed headlight module according to claim 18, wherein the cut-off plate unit of the high-speed headlight module includes a front cut-off edge, a rear cut-off edge, and a top side surface, the front cut-off edge of the cut-off plate unit of the high-speed headlight module and the rear cut-off edge of the cut-off plate unit of the high-speed headlight module are disposed corresponding to each other, and the top side surface of the cut-off plate unit of the high-speed headlight module is connected between the front cut-off edge of the cut-off plate unit of the high-speed headlight module and the rear cut-off edge of the cut-off plate unit of the high-speed headlight module, and wherein a predetermined inclined angle ranging between 20 degrees to 70 degrees is defined between the normal projection of the top side surface of the cut-off plate unit of the high-speed headlight module on the vertical plane and the normal projection of an optical axis of the cut-off plate unit of the high-speed headlight module on the vertical plane.

21. The high-speed headlight module according to claim 18, wherein the headlight device is a left headlight on a left-hand drive car, a lighting direction of the high-speed headlight module is toward the front left side and obliquely downward of the left-hand drive car, and the extension direction of an optical axis of the high-speed headlight module is toward the front left side and obliquely downward of the left-hand drive car.

22. The high-speed headlight module according to claim 21, wherein a first predetermined distance between 0.02 mm and 0.3 mm is defined between the top side surface on the first cut-off plate body of the cut-off plate unit of the high-speed headlight module and the top side surface on the second cut-off plate body of the cut-off plate unit of the high-speed headlight module.

23. The high-speed headlight module according to claim 22, wherein the first cut-off plate body and the cut-off plate turning part of the cut-off plate unit of the high-speed headlight module are located on a first side of the optical axis of the high-speed headlight module, the second cut-off plate body of the cut-off plate unit of the high-speed headlight module is located on a second side of the optical axis of the high-speed headlight module, and the first side of the optical axis of the high-speed headlight module and the second side of the optical axis of the high-speed headlight module are respectively on opposite sides of the optical axis of the high-speed headlight module.

24. The high-speed headlight module according to claim 22, wherein in an effective shading range of the cut-off plate unit of the high-speed headlight module, a first predetermined width of the first cut-off plate body of the cut-off plate unit of the high-speed headlight module is smaller than a second predetermined width of the second cut-off plate body of the cut-off plate unit of the high-speed headlight module.

25. The high-speed headlight module according to claim 22, wherein the inclined plane on the cut-off plate turning part of the cut-off plate unit of the high-speed headlight module extends from the second cut-off plate body of the cut-off plate unit of the high-speed headlight module to the first cut-off plate body of the cut-off plate unit of the high-speed headlight module, so as to form a groove structure opposite to the first cut-off plate body of the cut-off plate unit of the high-speed headlight module and the second cut-off plate body of the cut-off plate unit of the high-speed headlight module.

26. The high-speed headlight module according to claim 22, wherein a predetermined included angle between 140 degrees and 160 degrees is defined between the top side surface on the cut-off plate turning part of the cut-off plate unit of the high-speed headlight module and the top side surface on the first cut-off plate body of the cut-off plate unit of the high-speed headlight module.

27. The high-speed headlight module according to claim 22, wherein a second predetermined distance is defined between the optical axis of the high-speed headlight module and an edge of the cut-off plate turning part of the cut-off plate unit of the high-speed headlight module that is adjacent to the optical axis, and the size of the second predetermined distance is between 2.2 times and 4.6 times the size of the first predetermined distance.

28. The high-speed headlight module according to claim 18, wherein the headlight device is a right headlight on a left-hand drive car, a lighting direction of the high-speed headlight module is toward the front left side and obliquely downward of the left-hand drive car, and the extension direction of an optical axis of the high-speed headlight module is toward the front left side and obliquely downward of the left-hand drive car.

29. The high-speed headlight module according to claim 28, wherein a first predetermined distance between 0.02 mm and 0.3 mm is defined between the top side surface on the first cut-off plate body of the cut-off plate unit of the high-speed headlight module and the top side surface on the second cut-off plate body of the cut-off plate unit of the high-speed headlight module.

30. The high-speed headlight module according to claim 29, wherein a second predetermined distance is defined between the optical axis of the high-speed headlight module and an edge of the cut-off plate turning part of the cut-off plate unit of the high-speed headlight module that is adjacent to the optical axis, and the size of the second predetermined distance is between 1 times and 12 times the size of the first predetermined distance.

* * * * *